(12) United States Patent
Yu et al.

(10) Patent No.: US 12,379,508 B2
(45) Date of Patent: Aug. 5, 2025

(54) SATELLITE NAVIGATION RECEIVER WITH AGGREGATE CHANNEL DIGITAL BASEBAND PROCESSING

(71) Applicant: Deere & Company, Moline, IL (US)

(72) Inventors: Wei Yu, Torrance, CA (US); Richard G. Keegan, Irvine, CA (US); Mark P. Kaplan, Culver City, CA (US); Brian C. Goodrich, Torrance, CA (US); David M. Li, Harbor City, CA (US)

(73) Assignee: DEERE & COMPANY, Moline, IL (US)

( * ) Notice: Subject to any disclaimer, the term of this patent is extended or adjusted under 35 U.S.C. 154(b) by 578 days.

(21) Appl. No.: 17/661,488

(22) Filed: Apr. 29, 2022

(65) Prior Publication Data

US 2023/0228886 A1 Jul. 20, 2023

Related U.S. Application Data

(60) Provisional application No. 63/363,277, filed on Apr. 20, 2022, provisional application No. 63/268,221, (Continued)

(51) Int. Cl.
*G01S 19/30* (2010.01)
*G01S 19/21* (2010.01)
(Continued)

(52) U.S. Cl.
CPC .............. *G01S 19/37* (2013.01); *G01S 19/21* (2013.01); *G01S 19/29* (2013.01); *G01S 19/30* (2013.01); *G01S 19/32* (2013.01)

(58) Field of Classification Search
CPC .......... G01S 19/21; G01S 19/22; G01S 19/29; G01S 19/30; G01S 19/32; G01S 19/37; G01S 19/45
See application file for complete search history.

(56) References Cited

U.S. PATENT DOCUMENTS 5,099,494 A * 3/1992 Kingston ............... H04B 1/707
375/328
5,293,402 A 3/1994 Crespo et al.
(Continued)

FOREIGN PATENT DOCUMENTS

EP 3742201 A1 11/2020
WO WO2018019960 A1 2/2018
(Continued)

OTHER PUBLICATIONS

M.S. Braasch et al., GPS Receiver Architectures and Measurements, Proceedings of the IEEE, vol. 87(1), p. 48-64 (Year: 1999).*
(Continued)

*Primary Examiner* — William Kelleher
*Assistant Examiner* — Fred H Mull

(57) ABSTRACT

A demodulator comprises a first-stage carrier demodulator and a second-stage carrier demodulator. The first-stage carrier demodulator is configured to remove or compensate for the tracking error in the baseband signal, where the tracking error comprises aggregate, channel tracking error of carrier phase for the same received band, sub-band, (baseband) GNSS satellite channel, or set GNSS channels. The second stage carrier demodulator is configured to remove or strip a carrier signal component without any unwanted image or carrier-related frequency artifacts and to prepare for correlation-based decoding or demodulation of the encoded baseband signal by the correlators. First correlators are configured to determine correlations for code phase tracking loop, where the code phase tracking loop is configured to estimate a corresponding code error component of the tracking error for the code local oscillator for a respective channel. Secondary correlators are configured to determine correlations for a carrier phase tracking loop, where the carrier phase tracking loop configured to estimate a corresponding aggre-
(Continued)

gate feedback error for multiple channels or a set of channels.

24 Claims, 36 Drawing Sheets

Related U.S. Application Data filed on Feb. 18, 2022, provisional application No. 63/295,429, filed on Dec. 30, 2021.

(51) Int. Cl.
  *G01S 19/29* (2010.01)
  *G01S 19/32* (2010.01)
  *G01S 19/37* (2010.01)

(56) References Cited

U.S. PATENT DOCUMENTS

| | | | | |
|---|---|---|---|---|
| 5,452,327 A * | 9/1995 | Barham | | H04B 1/69 |
| | | | | 375/E1.001 |
| 5,663,733 A | 9/1997 | Lennen | | |
| 5,663,734 A * | 9/1997 | Krasner | | G01S 19/37 |
| | | | | 342/357.46 |
| 5,694,417 A * | 12/1997 | Andren | | H04B 1/7075 |
| | | | | 375/150 |
| 6,067,328 A * | 5/2000 | Lewellen | | G01S 19/30 |
| | | | | 455/12.1 |
| 6,516,021 B1 | 2/2003 | Abbott et al. | | |
| 7,724,846 B2 | 5/2010 | Abraham | | |
| 8,013,789 B2 | 9/2011 | Van Graas et al. | | |
| 9,063,224 B2 | 6/2015 | De Latour | | |
| 11,050,430 B1 * | 6/2021 | Feldhaus | | H03M 1/127 |
| 2003/0189975 A1 | 10/2003 | Fullerton | | |
| 2004/0095274 A1 | 5/2004 | Warloe et al. | | |
| 2004/0141549 A1 | 7/2004 | Abraham et al. | | |
| 2004/0176034 A1 | 9/2004 | Hunter et al. | | |
| 2005/0174284 A1 | 8/2005 | Abraham et al. | | |
| 2006/0133551 A1 | 6/2006 | Davidoff et al. | | |
| 2010/0118921 A1 | 5/2010 | Abdelmonem et al. | | |
| 2011/0216910 A1 | 9/2011 | Lee | | |
| 2017/0180160 A1 | 6/2017 | Moorti et al. | | |
| 2017/0343677 A1 * | 11/2017 | Capet | | G01S 19/22 |
| 2018/0011162 A1 * | 1/2018 | Bovard | | G01S 19/42 |
| 2020/0295849 A1 | 9/2020 | Li | | |
| 2020/0334542 A1 | 10/2020 | Hoydis | | |
| 2022/0035046 A1 | 2/2022 | Takanohashi et al. | | |
| 2022/0123770 A1 | 4/2022 | Yu et al. | | |
| 2022/0123828 A1 | 4/2022 | Yu et al. | | |
| 2022/0182088 A1 | 6/2022 | Yu et al. | | |
| 2022/0209805 A1 | 6/2022 | Yu et al. | | |

FOREIGN PATENT DOCUMENTS

| | | |
|---|---|---|
| WO | WO 2020059219 A1 | 8/2021 |
| WO | WO2022082202 A1 | 4/2022 |
| WO | WO2022082206 A1 | 4/2022 |
| WO | WO2022082211 A1 | 4/2022 |

OTHER PUBLICATIONS

M.S. Grewal et al., Global Positioning Systems, Inertial Navigation, and Integration, John Wiley & Sons, Inc., p. 30-79 (Year: 2001).*

M. Lashley et al., GNSS Solutions: What are vector tracking loops, and what are their benefits and drawbacks?, Inside GNSS, p. 16-21 (Year: 2009).*

V.U. Zavorotny et al., Tutorial on Remote Sensing Using GNSS Bistatic Radar of Opportunity, IEEE Geoscience and Remote Sensing Magazine, p. 8-45 (Year: 2014).*

Telcoma, What is NCO Numerically Controlled Oscillator, https://telcomatraining.com/what-is-nco-numerically-controlled-oscillator (Year: 2024).*

M.S. Grewal et al., Global Positioning Systems, Inertial Navigation, and Integration, Second Edition, John Wiley & Sons, Inc., p. 53-143 (Year: 2007).*

The International Search Report and the Written Opinion of the International Searching Authority issued in counterpart application No. PCT/US2022/076187, dated Dec. 20, 2022 (16 pages).

The International Search Report and the Written Opinion of the International Searching Authority issued in counterpart application No. PCT/US2022/076201, dated Jan. 4, 2023 (14 pages).

Jiang Changhui et al: "Research on a chip scale atomic clock aided vector tracking loop", IET Radar Sonar Navigation, the Institution of Engineering and Technology, UK, vol. 13, No. 7, Jul. 1, 2019, pp. 1101-1106, ISSN: 1751-8784, DOI: 10.1049/IET-RSN.2018.5523.

The International Search Report and the Written Opinion of the International Searching Authority issued in counterpart application No. PCT/US2022/076201, dated Feb. 7, 2023 (23 pages).

Shuai Jing et al., Weak and Dynamic GNSS Signal Tracking Strategies for Flight Missions in the Space Service Volume Sensors, Sep. 2, 2016, pp. 1-19, doi:10.3390/s16091412.

Frank Van Graas et al., Closed-Loop Sequential Signal Processing and Open-Loop Batch Processing Approaches for GNSS Receiver Design, IEEE Journal of Selected Topics in Signal Processing, vol. 3, No. 4, Aug. 2009, published on Jul. 17, 2009, pp. 571-586.

Frank Van Graas et al., Comparison of Two Approaches for GNSS Receiver Algorithms: Batch Processing and Sequential Processing Considerations, ION GNSS 18th International Technical Meeting of the Satellite Division, Sep. 13-16, 2005, pp. 200-211.

Davide Rovelli et al., Acquisition Speed-Up Engine for GNSS Signals, retrieved from internet on Mar. 24, 2022, pp. 1-8.

Yuheng Yang et al., A Novel VLSI Architecture for Multi-Constellation and Multi-Frequency GNSS Acquisition Engine, published on Dec. 19, 2018, pp. 655-665.

Hongyang Zhang et al., A 2-step GPS carrier tracking loop for urban vehicle applications, Journal of Systems Engineering and Electronics, vol. 28, No. 5, Oct. 2017, pp. 817-826, DOI: 10.21629/JSEE.2017.05.01.

Pablo E. Leibovich et al., Dedicated Hardware for FFT Based Fast Acquisition of GNSS Signals, retrieved from internet on Mar. 24, 2022, pp. 1-4.

Andrey Soloviev et al., Utilizing Batch Processing for GNSS Signal Tracking, ION Canada 2007 Batch Processing, Feb. 27, 2007, pp. 1-40, [online]. Retrieved from the Internet <URL: http://alberta.ion.org/wp-content/uploads/2007/02/07.02.27-Andrey-Soloviev-Batch-Processing-for-GNSS-Signal-Tracking.pdf>.

The International Search Report and the Written Opinion of the International Searching Authority issued in counterpart application No. PCT/US2022/076183, dated Jan. 9, 2023 (15 pages).

The International Search Report and the Written Opinion of the International Searching Authority issued in counterpart application No. PCT/US2022/076207, dated Apr. 12, 2023 (12 pages).

Di Cintio Andrea et al., The GREHDA Project: GALILEO Software Receiver for High Dynamic Applications, GNSS 2007-Proceedings of the 20th International Technical Meeting of the Satellite Division of the Institute of Navigation, Sep. 28, 2007, pp. 2376-2387.

* cited by examiner

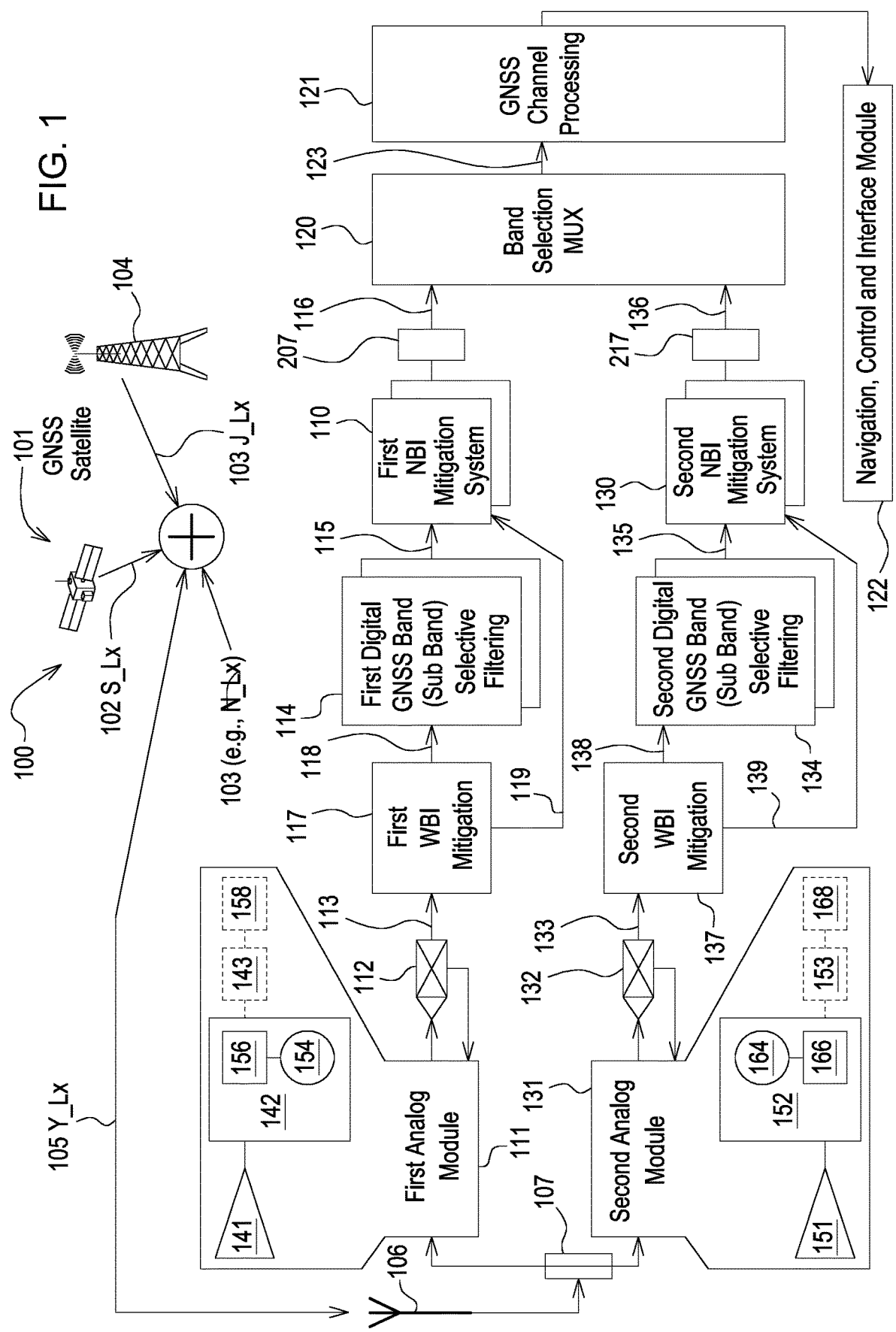

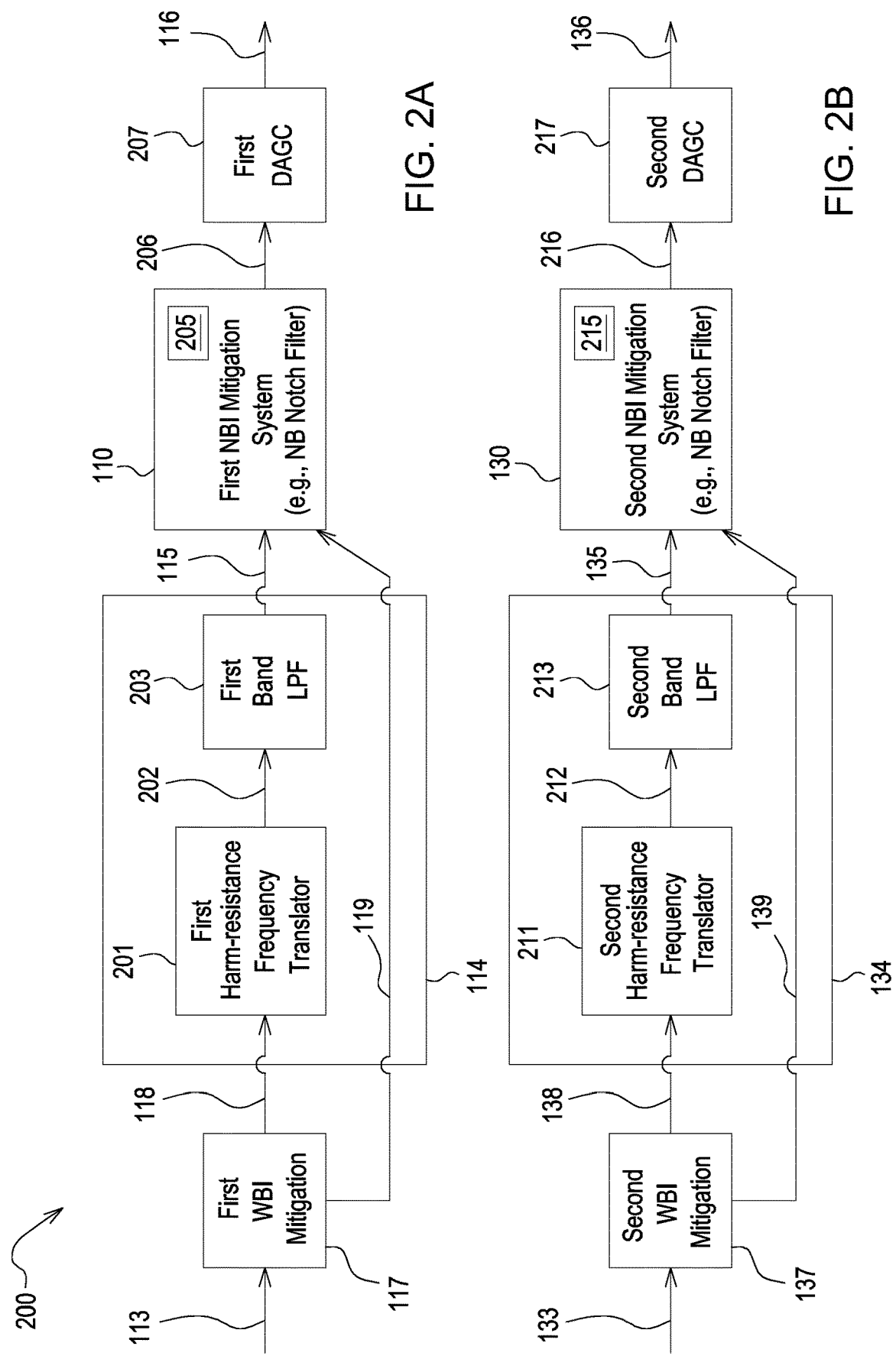

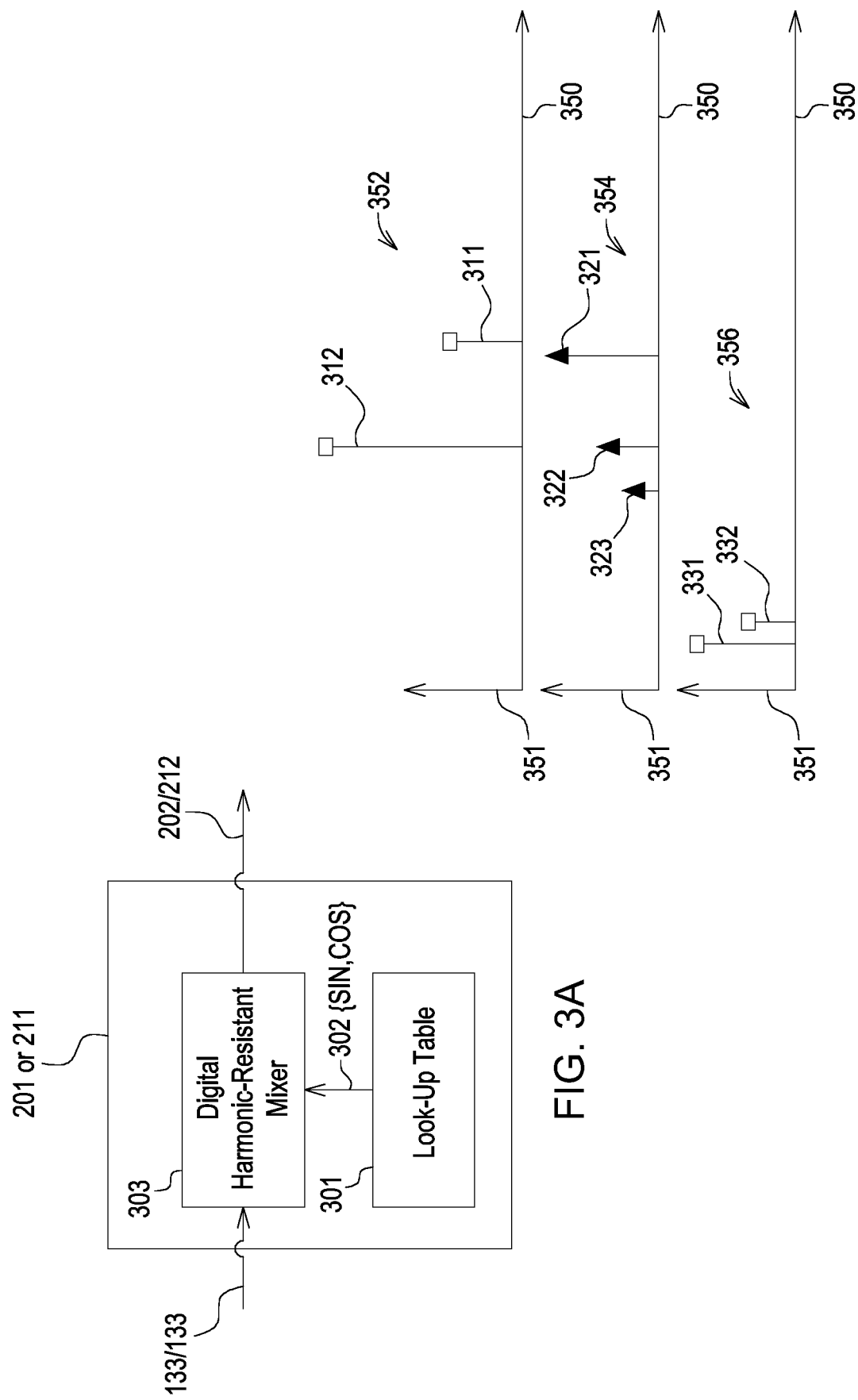

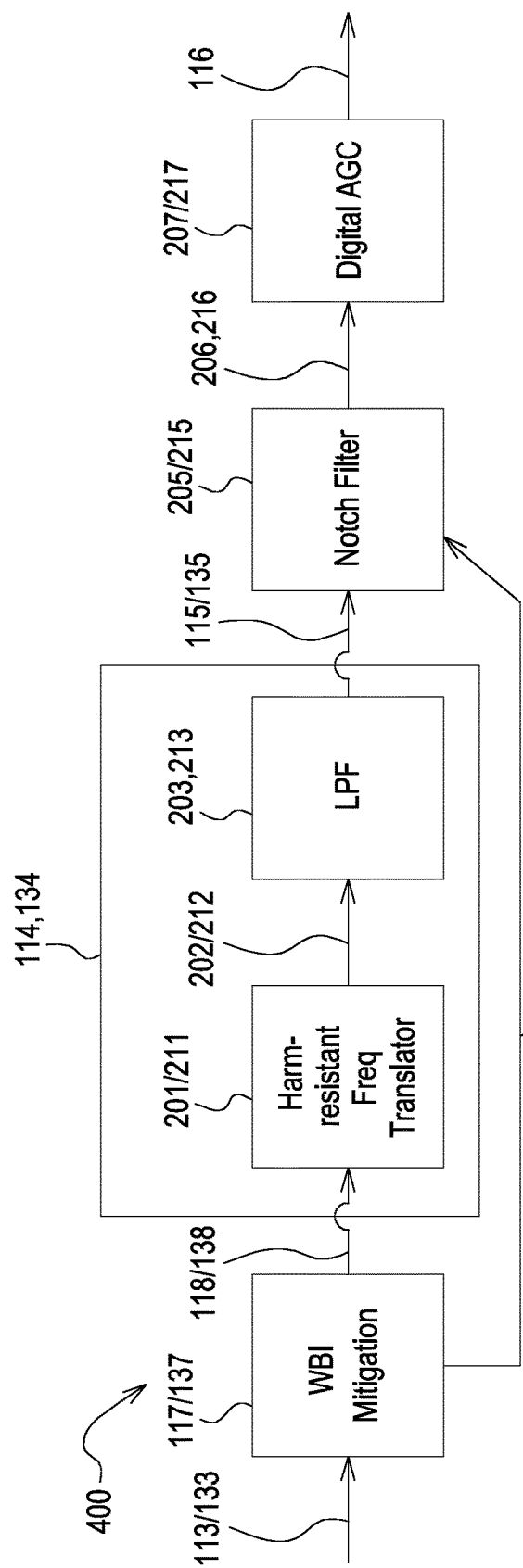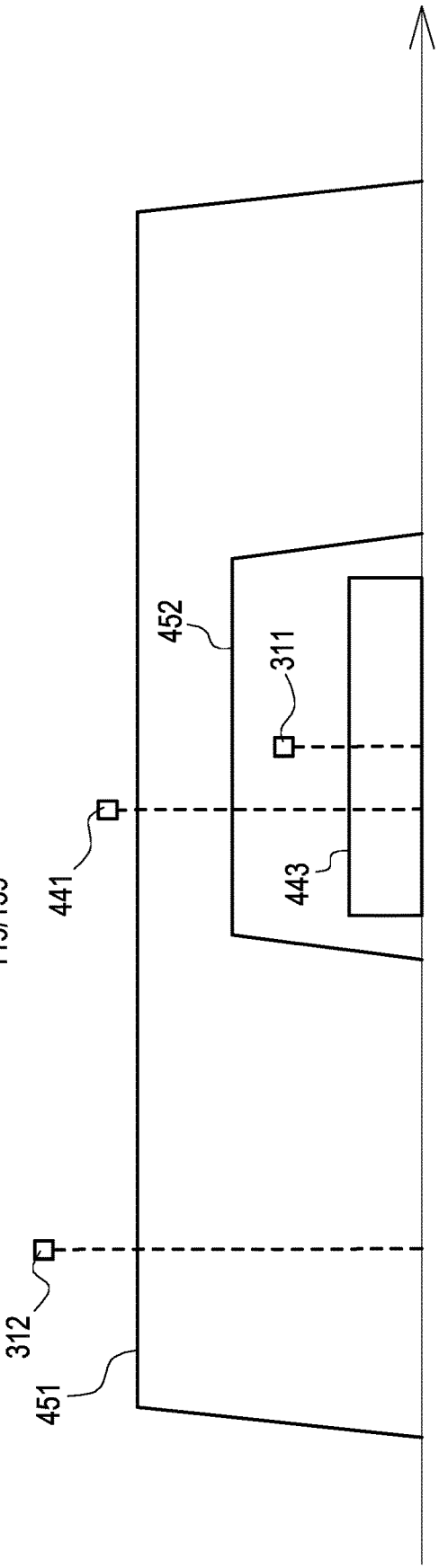
FIG. 5A
FIG. 5B

SATELLITE NAVIGATION RECEIVER WITH AGGREGATE CHANNEL DIGITAL BASEBAND PROCESSING

RELATED APPLICATIONS

This document (including the drawings) claims priority and the benefit of the filing date based on U.S. provisional application No. 63/363,277, filed Apr. 20, 2022; U.S. provisional application No. 63/268,221, filed Feb. 18, 2022; and U.S. provisional application No. 63/295,429, filed Dec. 30, 2021, under 35 U.S.C. § 119 (e), where the provisional applications are hereby incorporated by reference herein.

FIELD OF THE DISCLOSURE

This disclosure document relates at satellite navigation receiver with aggregate channel digital baseband processing.

BACKGROUND

The electromagnetic spectrum is limited for wireless communications. As wireless communications are engineered to support greater data transmission throughput for end users, the potential for interference to satellite navigation receivers tend to increase. Interference may be caused by various technical factors, such as inadequate frequency spacing or spatial separation between wireless transmitters, intermodulation distortion between wireless signals, receiver desensitization, or deviation from entirely orthogonal encoding of spread-spectrum signals, outdated radio or microwave frequency propagation modeling of government regulators, among other things. Accordingly, there is need to ameliorate interference through an interference mitigation system.

SUMMARY

In accordance with one aspect of the disclosure, a receiver system has a receiver front-end module that comprises an analog-to-digital converter for providing a digital intermediate frequency signal or baseband signal derived from a received satellite GNSSS signal. A baseband tracking loop module is configured to track carrier phase and code phase of a band, a sub-band, a channel or a set of channels. The baseband tracking loop module is configured to derive correction or control signals to control one or more local oscillators and to provide a code component and carrier component, or an aggregate code and carrier component, of the channel tracking error of the respective band, sub-band, channel or set of channels.

In accordance with another aspect of the disclosure, a clock tracking loop is configured to track clock error for the receiver system. The clock error has a clock error component comprising a clock bias between a GNSS receiver clock and a respective satellite clock associated with the baseband signal of the band, the sub-band, the channel, or the set of channels. A frequency scaler for adjusting the frequency of the clock error component with respect to the frequency of channel tracking error of the carrier phase, code phase or both of the baseband signal based on the band, the sub-band, the channel or the set of channels. A summer is configured to determine a tracking error based on the aggregate, channel code and carrier component and the clock error component.

In accordance with yet another aspect of the disclosure, a demodulator comprises a first-stage carrier demodulator and a second-stage carrier demodulator. The first-stage carrier demodulator is configured to remove or compensate for the tracking error in the baseband signal, where the tracking error comprises aggregate, channel tracking error of: (a) carrier phase, or (b) carrier phase and code phase for the same received band, sub-band, (baseband) GNSS satellite channel, or set GNSS channels. The second stage carrier demodulator is configured to remove or strip a carrier signal component without any unwanted image or carrier-related frequency artifacts and to prepare for correlation-based decoding or demodulation of the encoded baseband signal by the correlators.

First correlators are configured to determine correlations for: (a) code phase tracking loop, or (b) code phase and the carrier phase tracking loop, where the code phase tracking loop is configured to estimate a corresponding code error component of the tracking error for the code local oscillator for a channel on an individual channel-by-channel basis. However, in alternate embodiments, a common code NCO or code tracking may be applied to a complex code channel, a respective band, sub-band channel, or set of channels.

Secondary correlators are configured to determine correlations for a carrier phase tracking loop, where the carrier phase tracking loop configured to estimate a corresponding aggregate feedback error for multiple channels or a set of channels, such as a carrier phase error component of the tracking error for a carrier local oscillator for the same respective band, sub-band, channel or set of channels. Second correlators are configured to determine correlations for clock tracking loop and the clock error component of the tracking error.

BRIEF DESCRIPTION

FIG. 2A is a block diagram of the wide-band interference mitigation module and the selective filtering module in greater detail than in FIG. 1 for an upper band.

FIG. 2B is a block diagram of one embodiment of the wide-band interference mitigation module and the selective filtering module in greater detail than in FIG. 1 for a lower band.

FIG. 3A is a block diagram of the mixer (e.g., analog mixer or digital mixer) of the second downconverter.

FIG. 3B is graph or plot of a received signal at fundamental frequency and associated harmonics expressed as magnitude versus frequency in the frequency domain.

FIG. 5A is a block diagram of another embodiment of the wide-band interference mitigation module and the selective filtering module with GNSS band filter parameters (e.g., filter coefficients or target magnitude versus frequency response) to reject or attenuate electromagnetic interference.

FIG. 5B is graph or plot of a received signal at fundamental frequency and associated harmonics expressed as magnitude versus frequency in the frequency domain, which are superimposed over one or more filter responses (e.g., magnitude versus frequency response).

FIG. 12-1, FIG. 12-2 and FIG. 12-3 are collectively referred to as FIG. 12, which is a flow chart of one embodiment of a method for acquiring one or more GNSS signals.

Figures 1, 12:
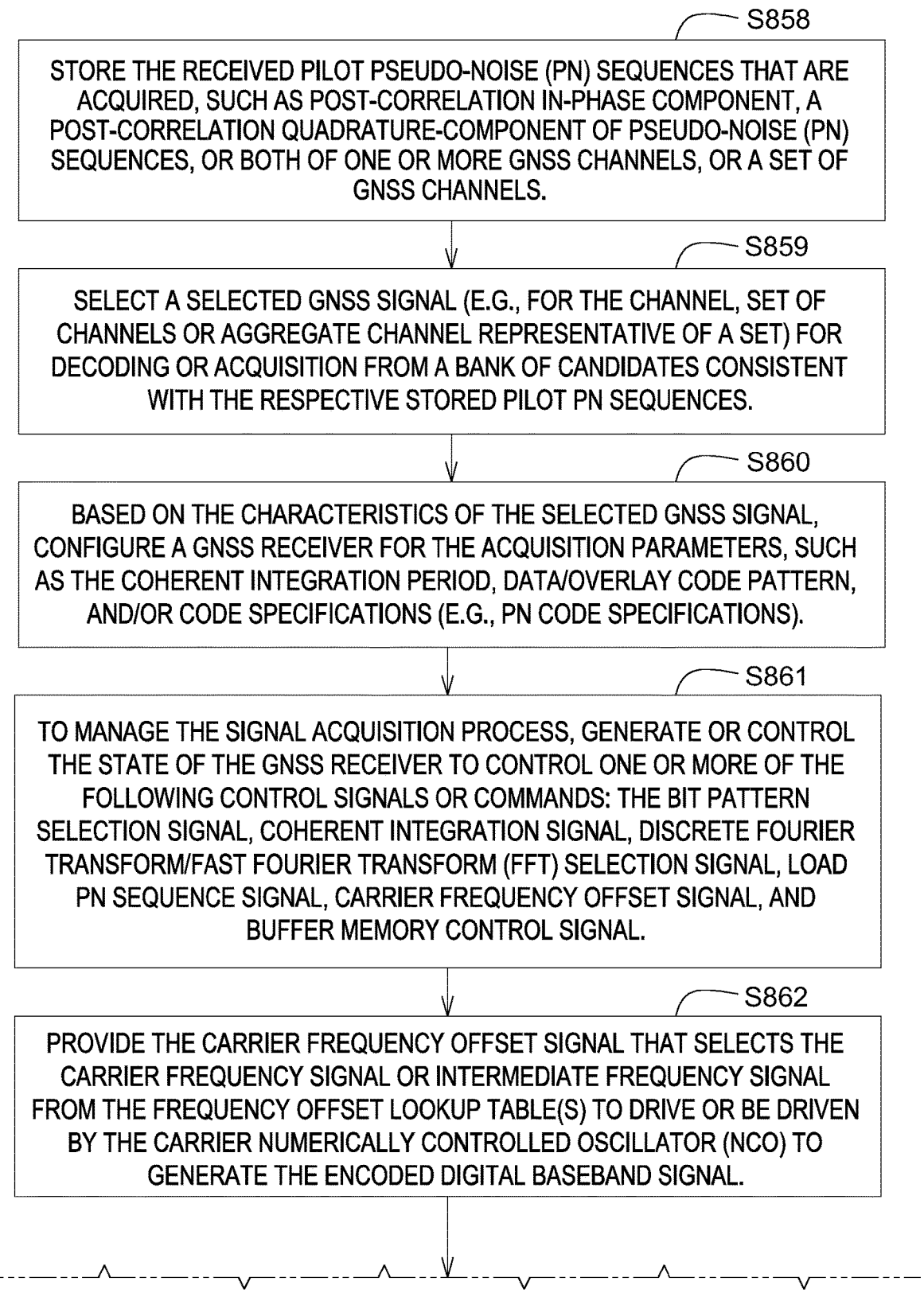
Figures 2, 12:
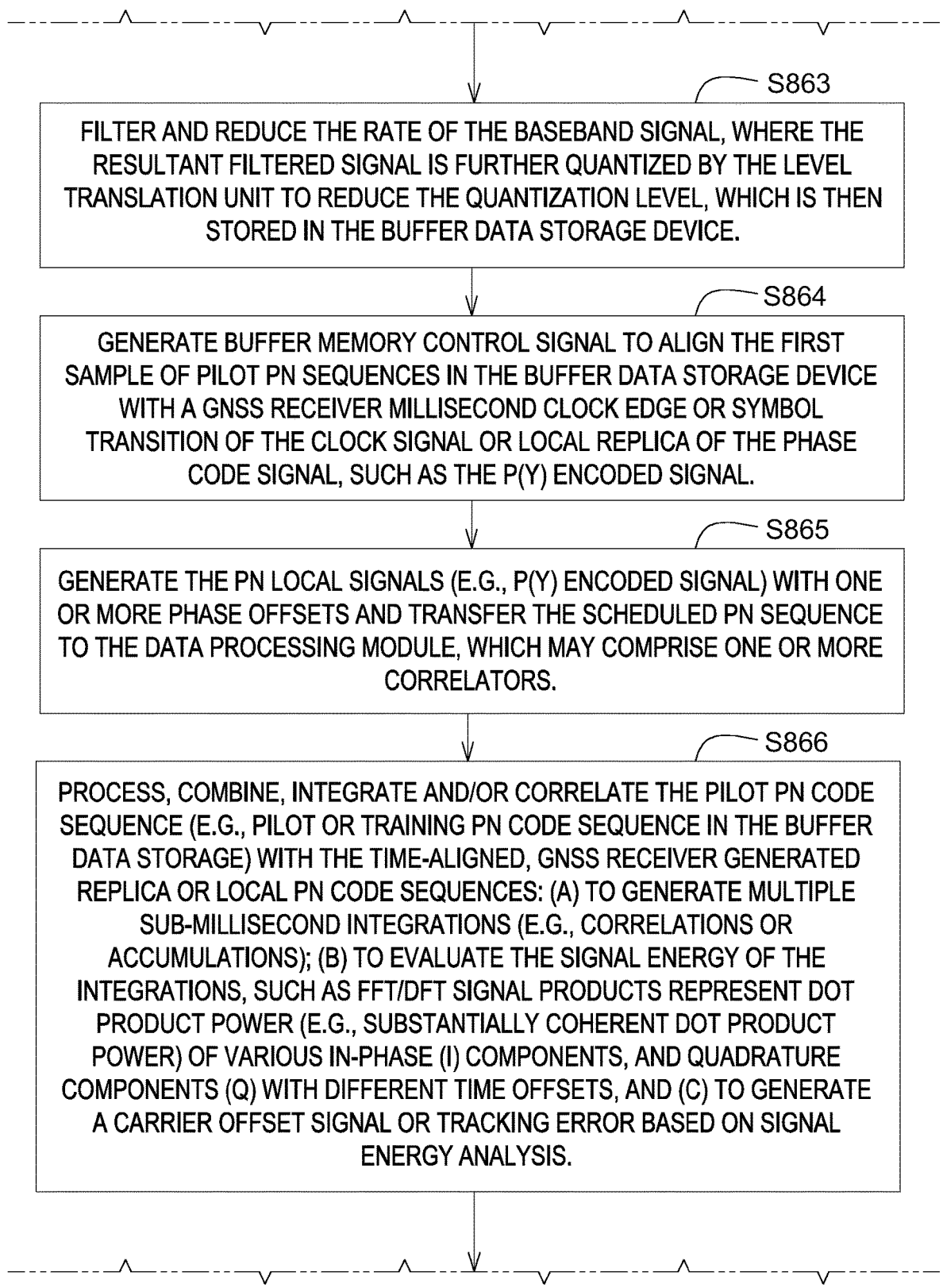
Figures 1, 13A:
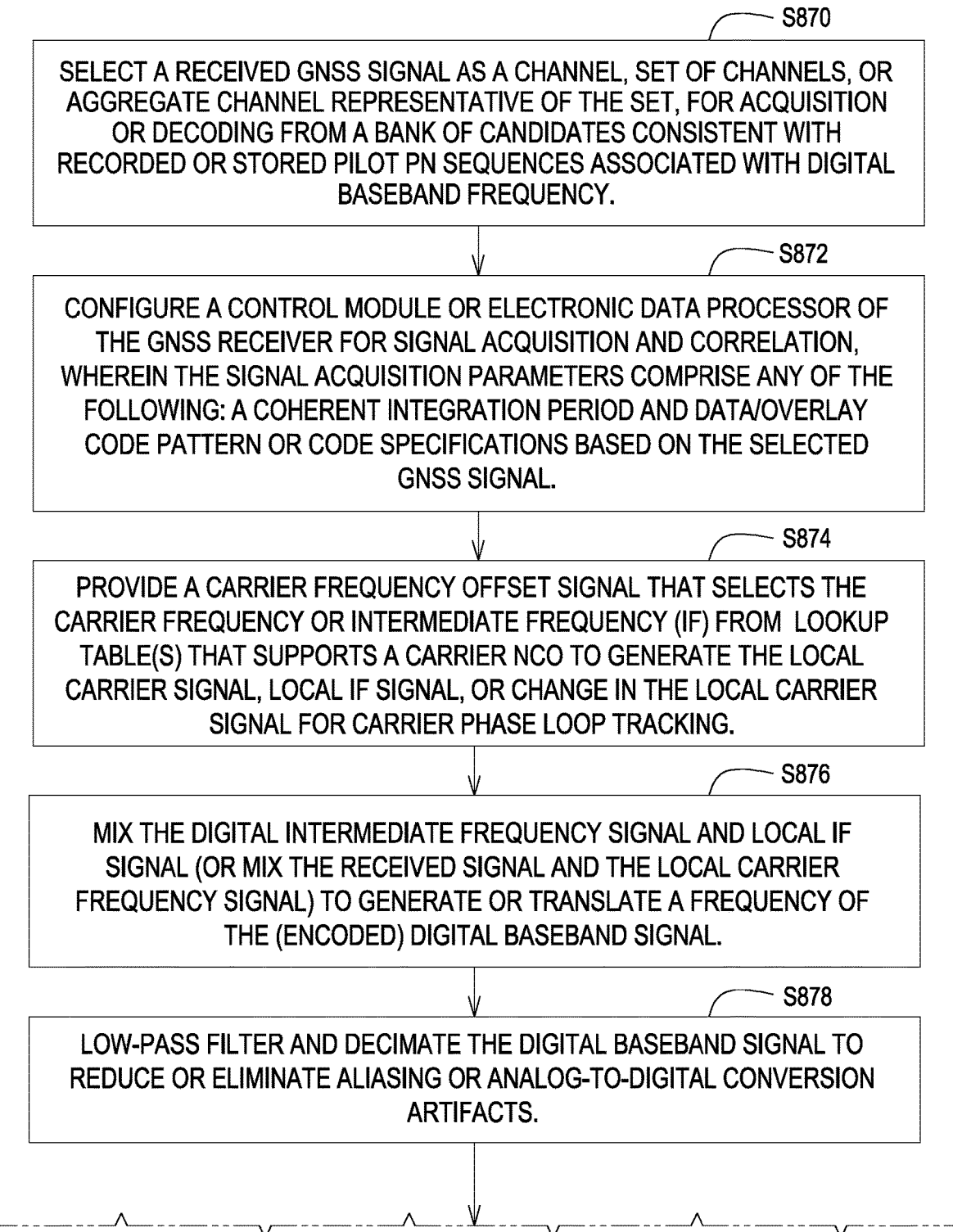
FIG. 1 is a block diagram of a receiver system with digital signal processing for adaptive interference mitigation for radio frequency signal, such as a microwave satellite signal.
Figures 2, 13A:
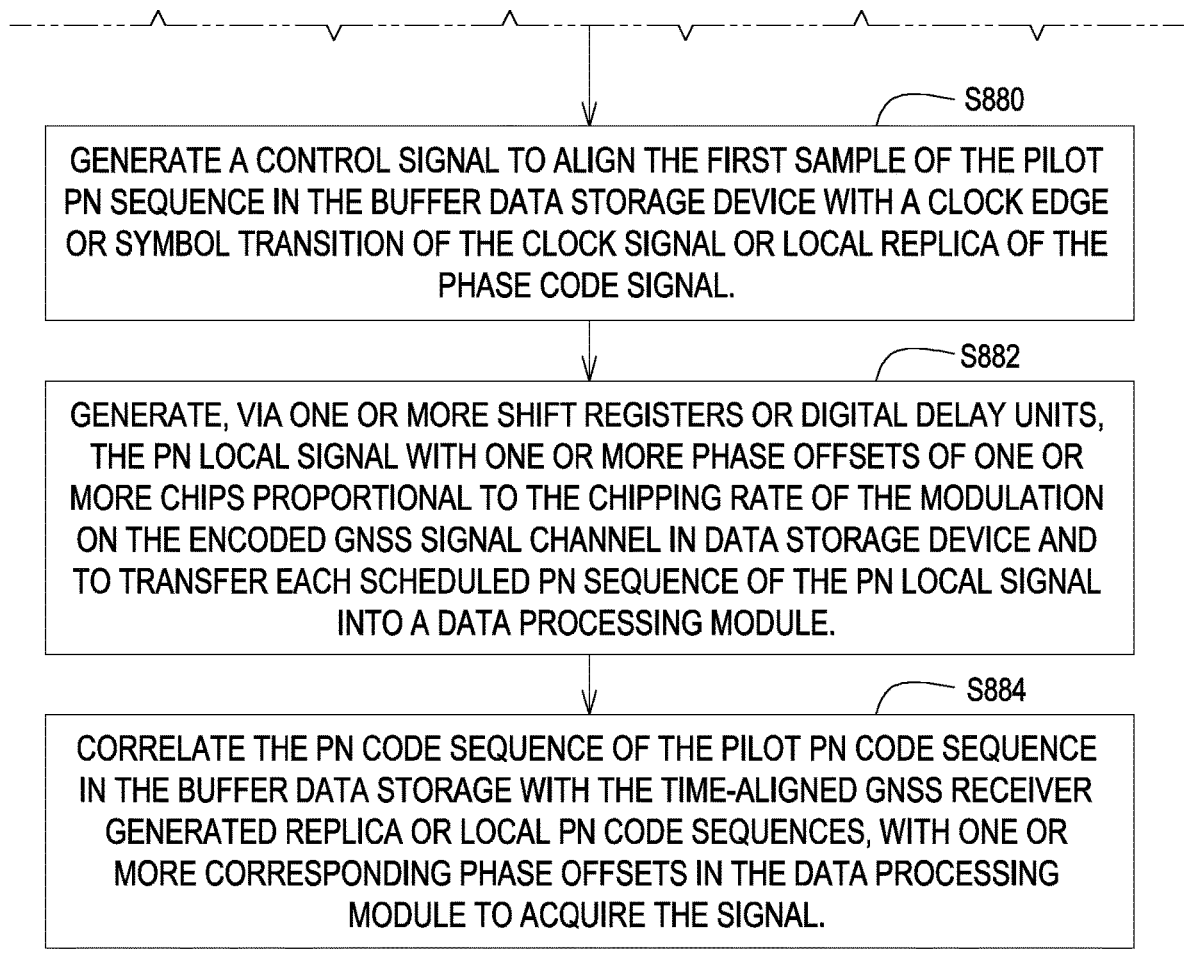

FIG. 13A, which includes FIG. 13A-1 and FIG. 13A-2, is a flow chart of a first embodiment of method for acquiring one or more GNSS signals.

Figures 1, 13B:
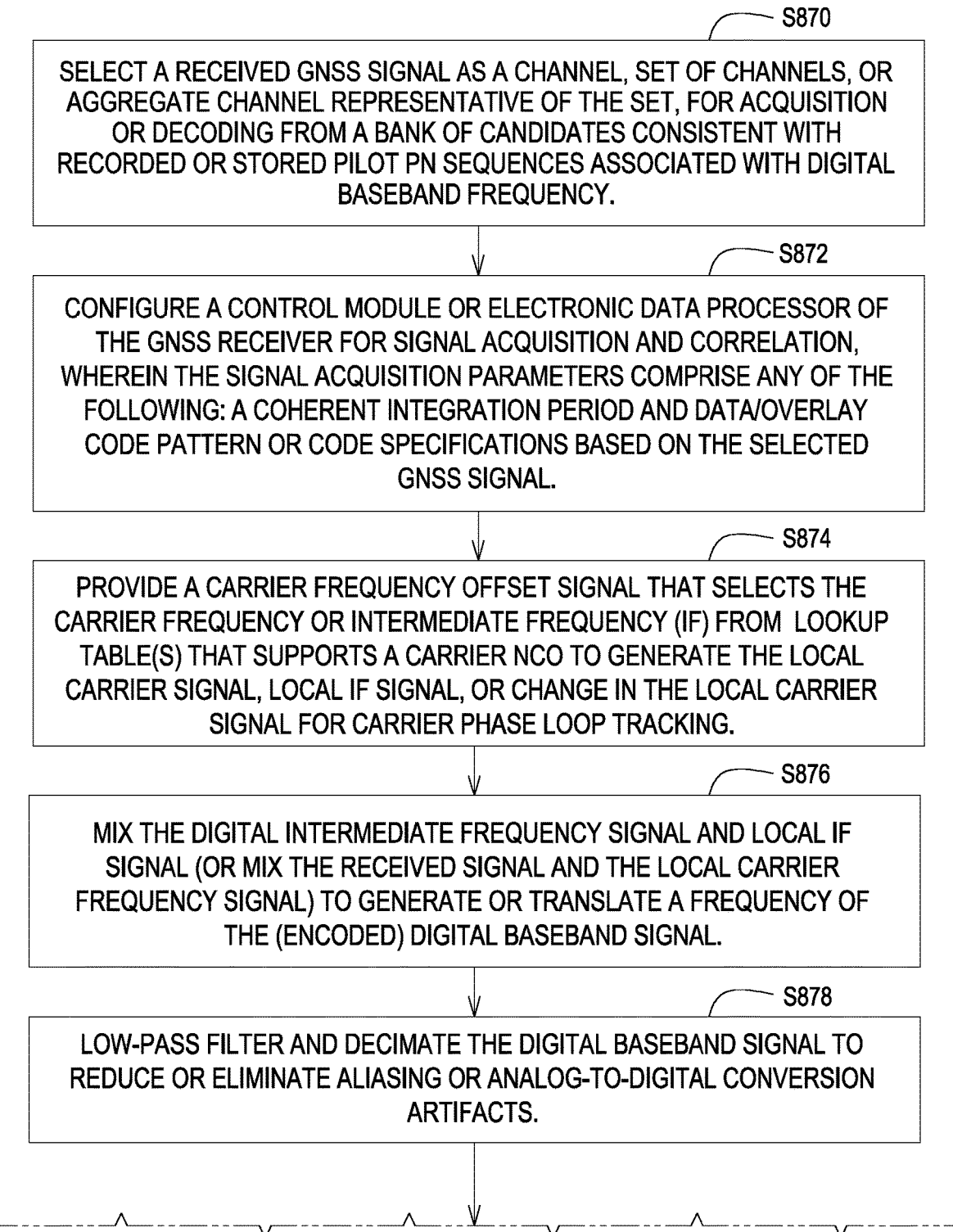
Figures 2, 13B:
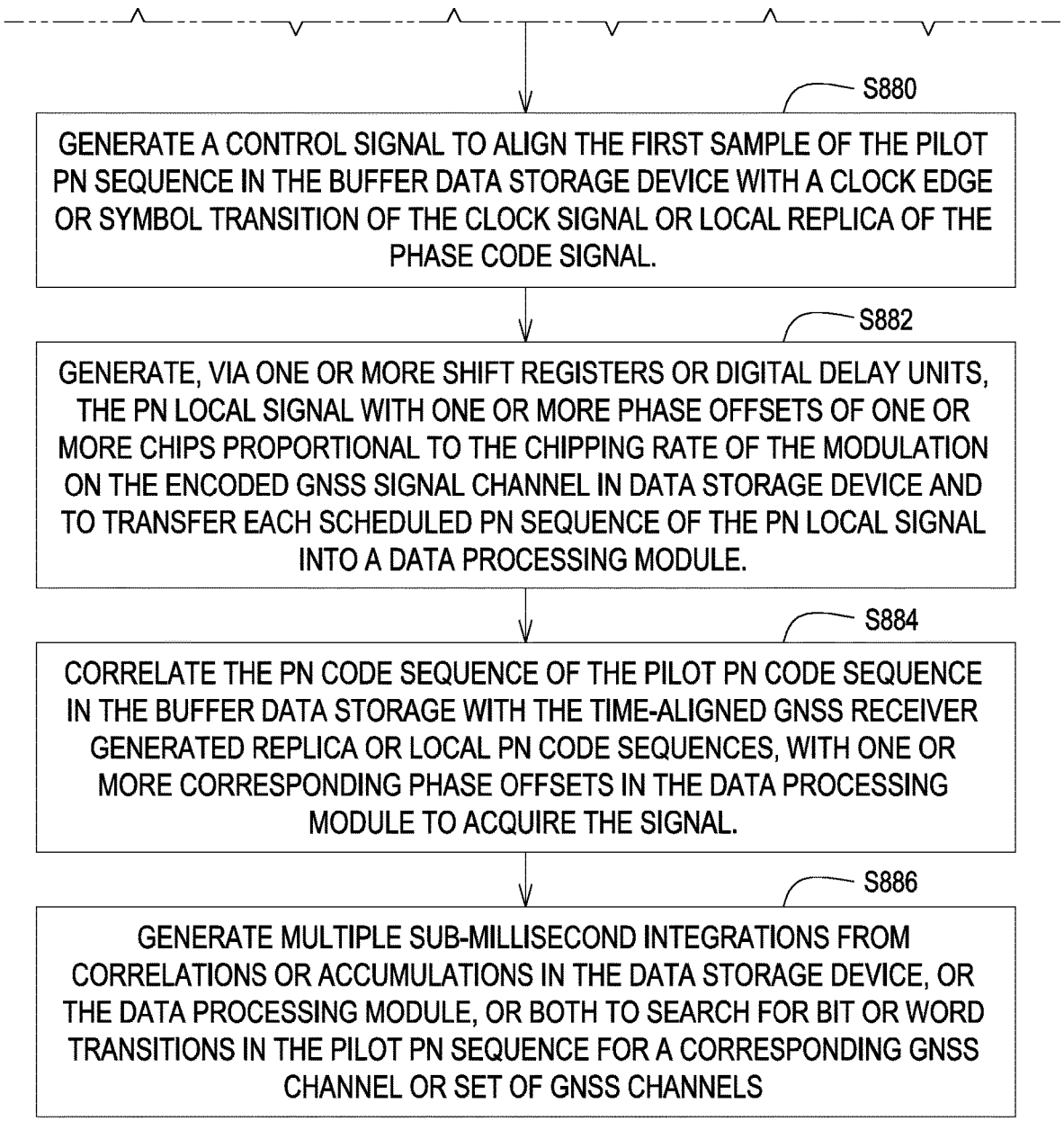

FIG. 13B, which includes FIG. 13B-1 and FIG. 13B-2, is a flow chart of a second embodiment of a method for acquiring one or more GNSS signals.

Figures 1, 13C:
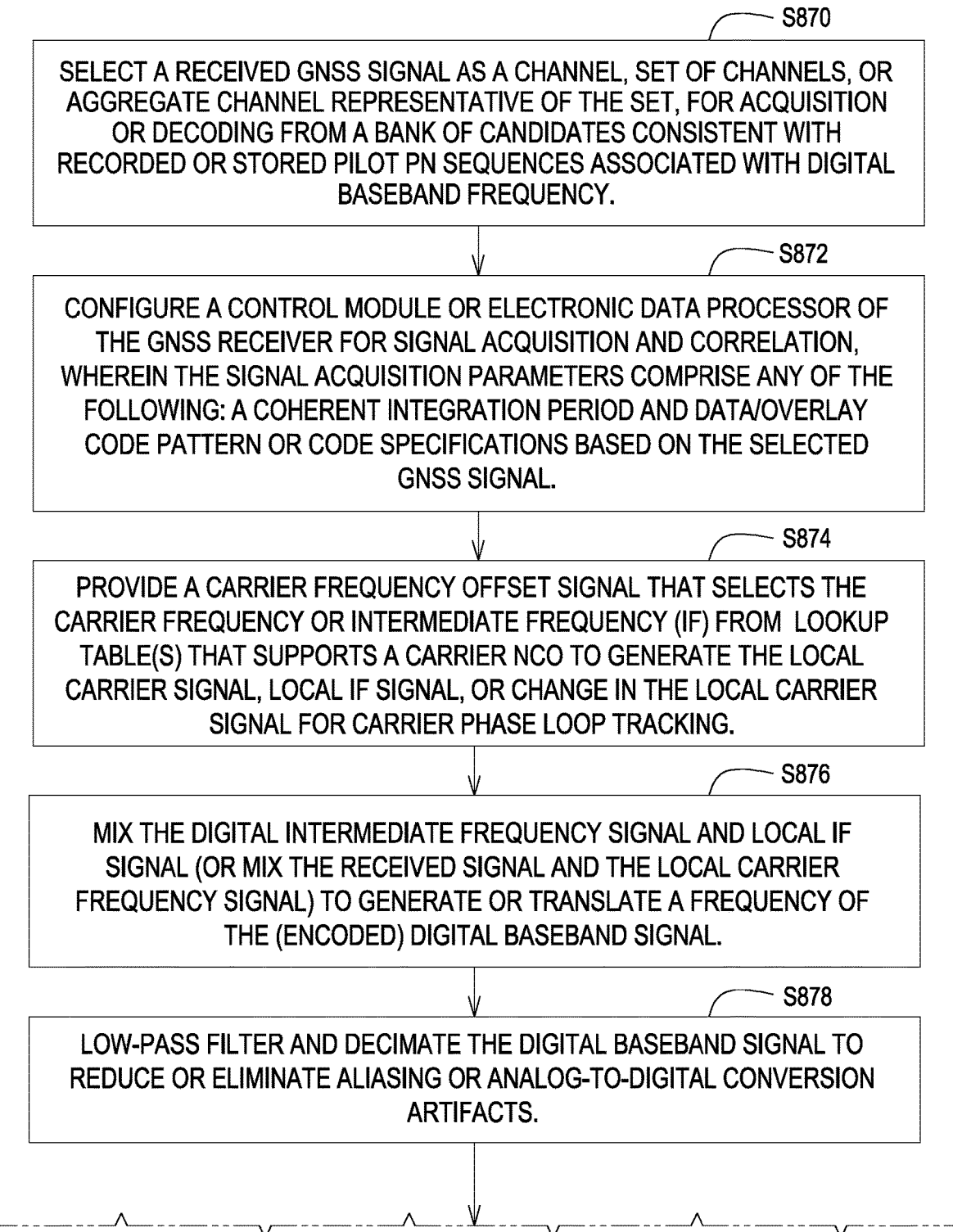
Figures 2, 13C:
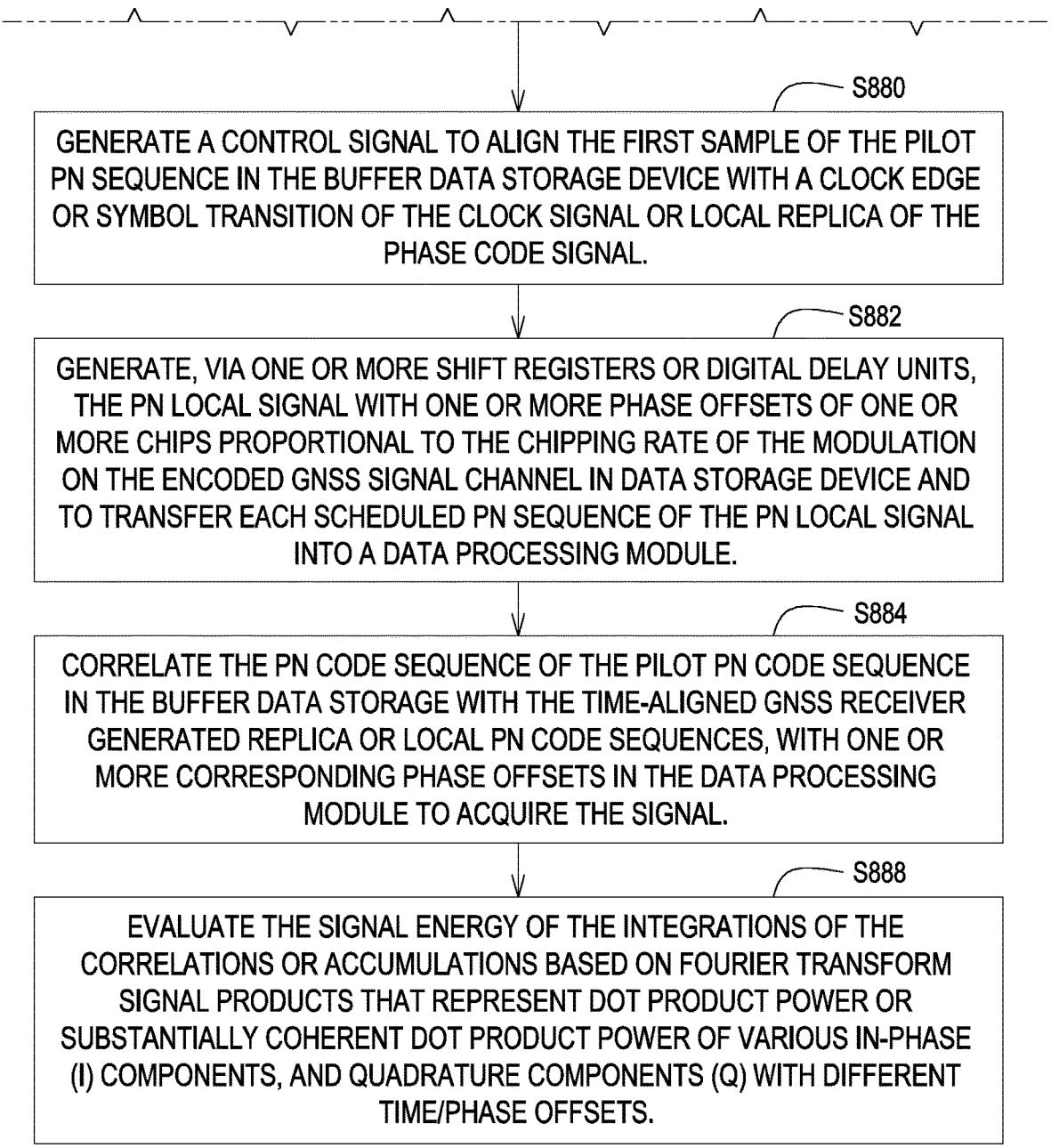

FIG. 13C, which includes FIG. 13C-1 and FIG. 13C-2, is a flow chart of a third embodiment of a method for acquiring one or more GNSS signals.

Figures 1, 13D:
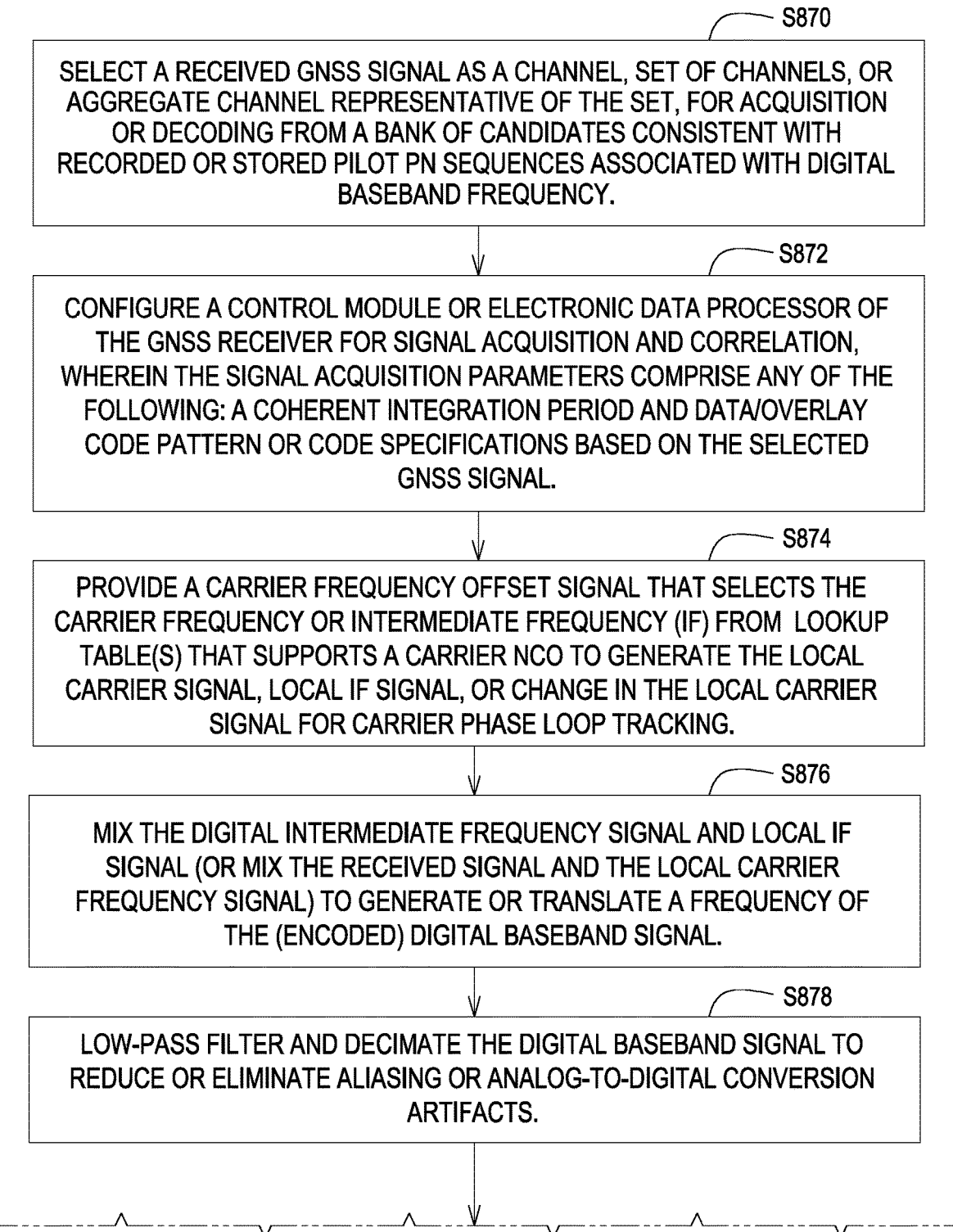
Figures 2, 13D:
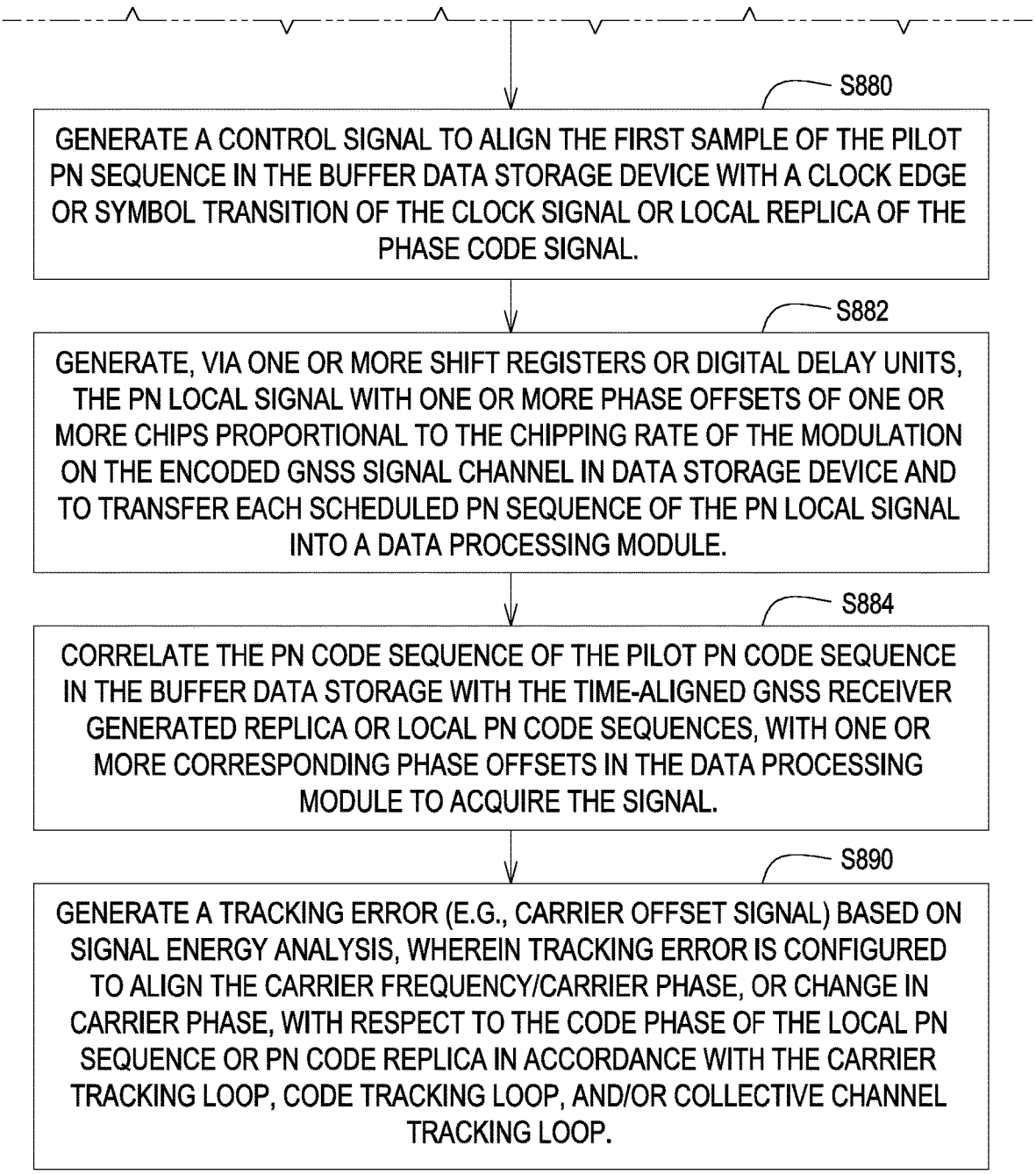

FIG. 13D, which includes FIG. 13D-1 and FIG. 13D-2, is a flow chart of a fourth embodiment of a method for acquiring one or more GNSS signals.

Figure 14:
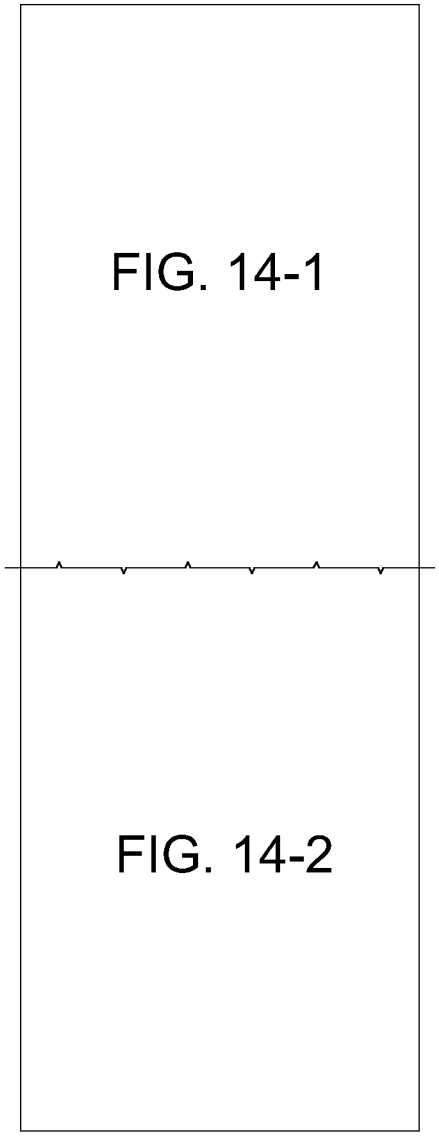
Figures 1, 14:
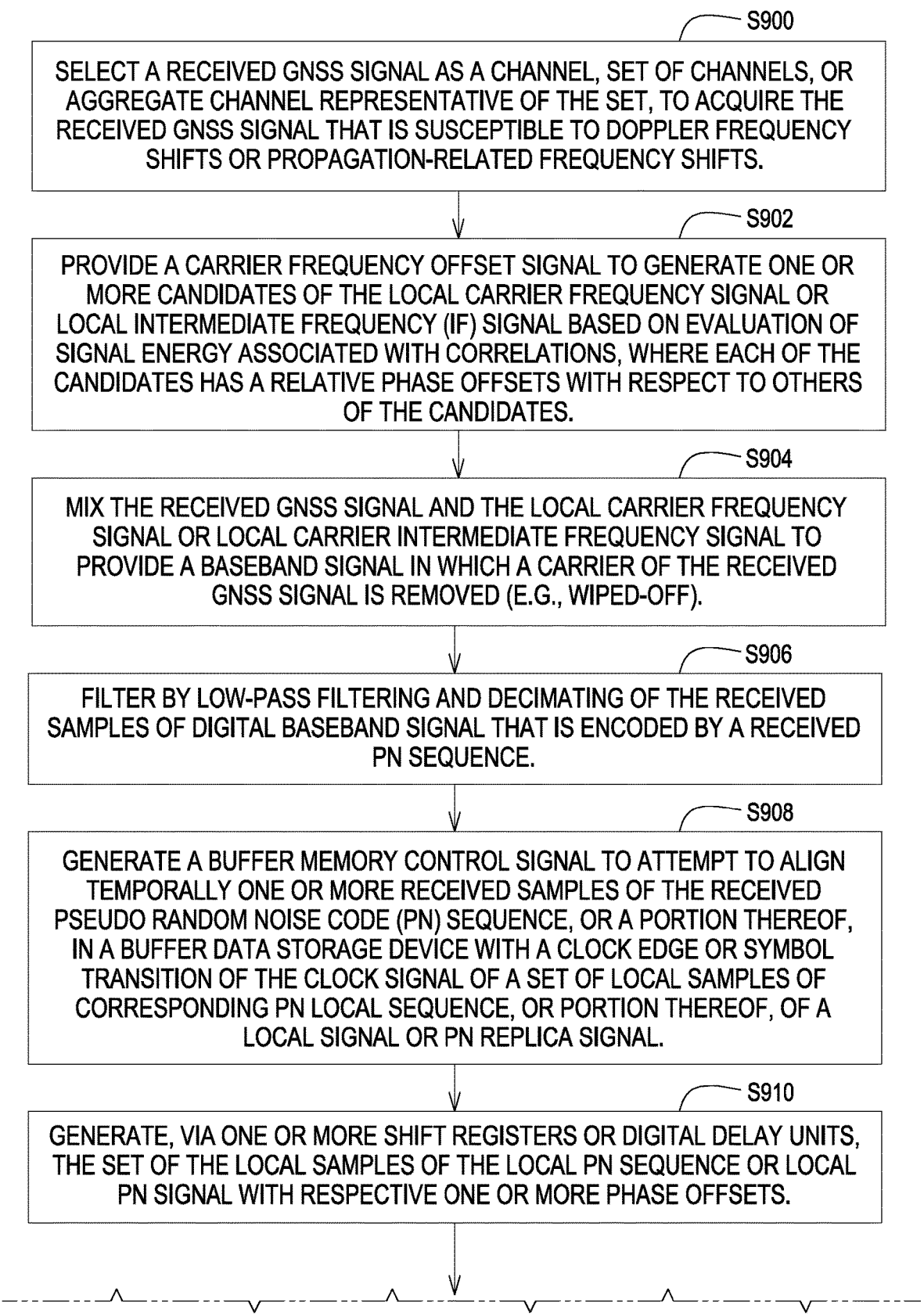
Figures 2, 14:
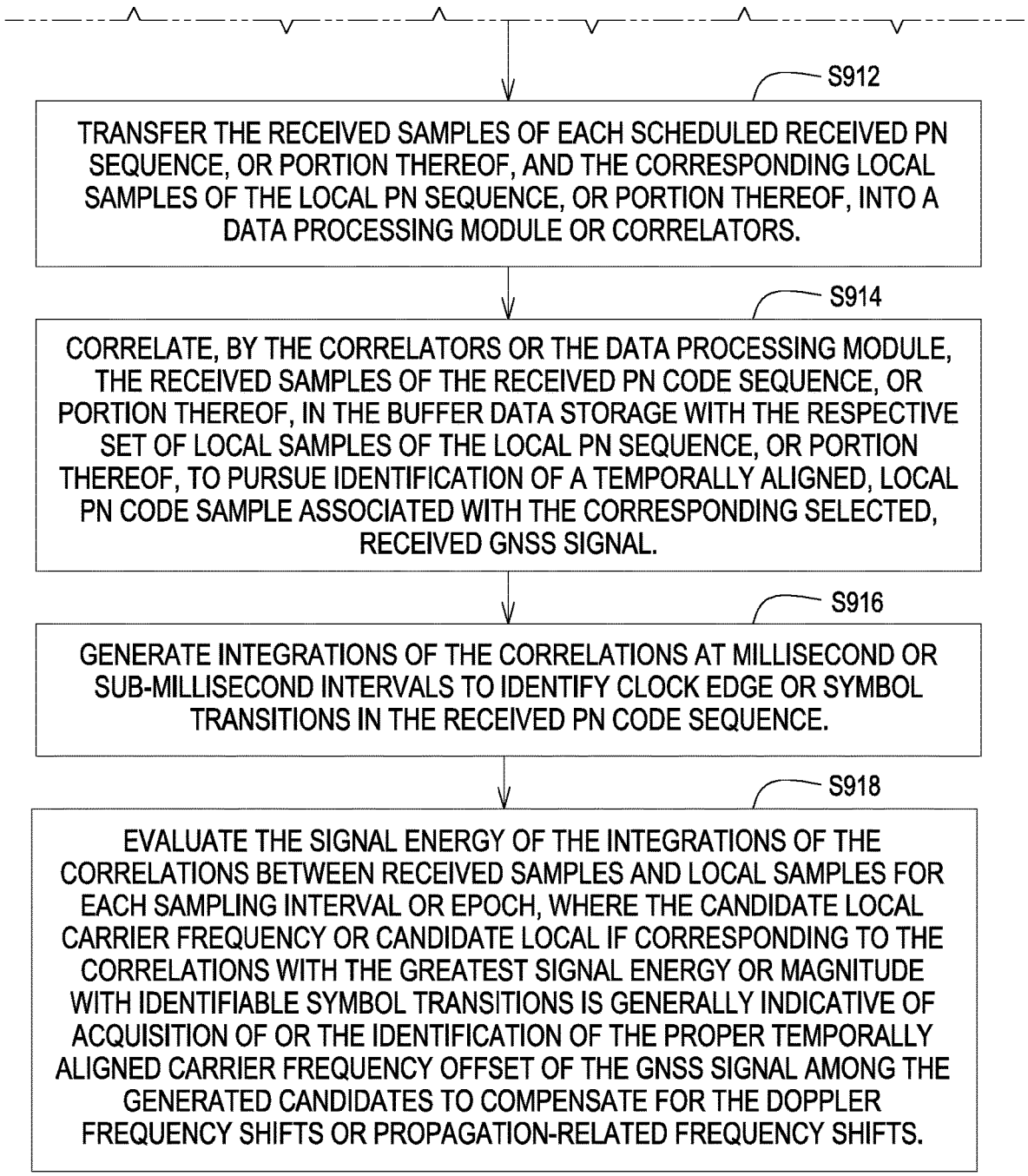

FIG. 14, which includes FIG. 14-1 and FIG. 14-2, discloses a flow chart of a first embodiment, and certain variants, of a method for acquiring a satellite signal or receiving a satellite signal with interference rejection.

Figure 15:
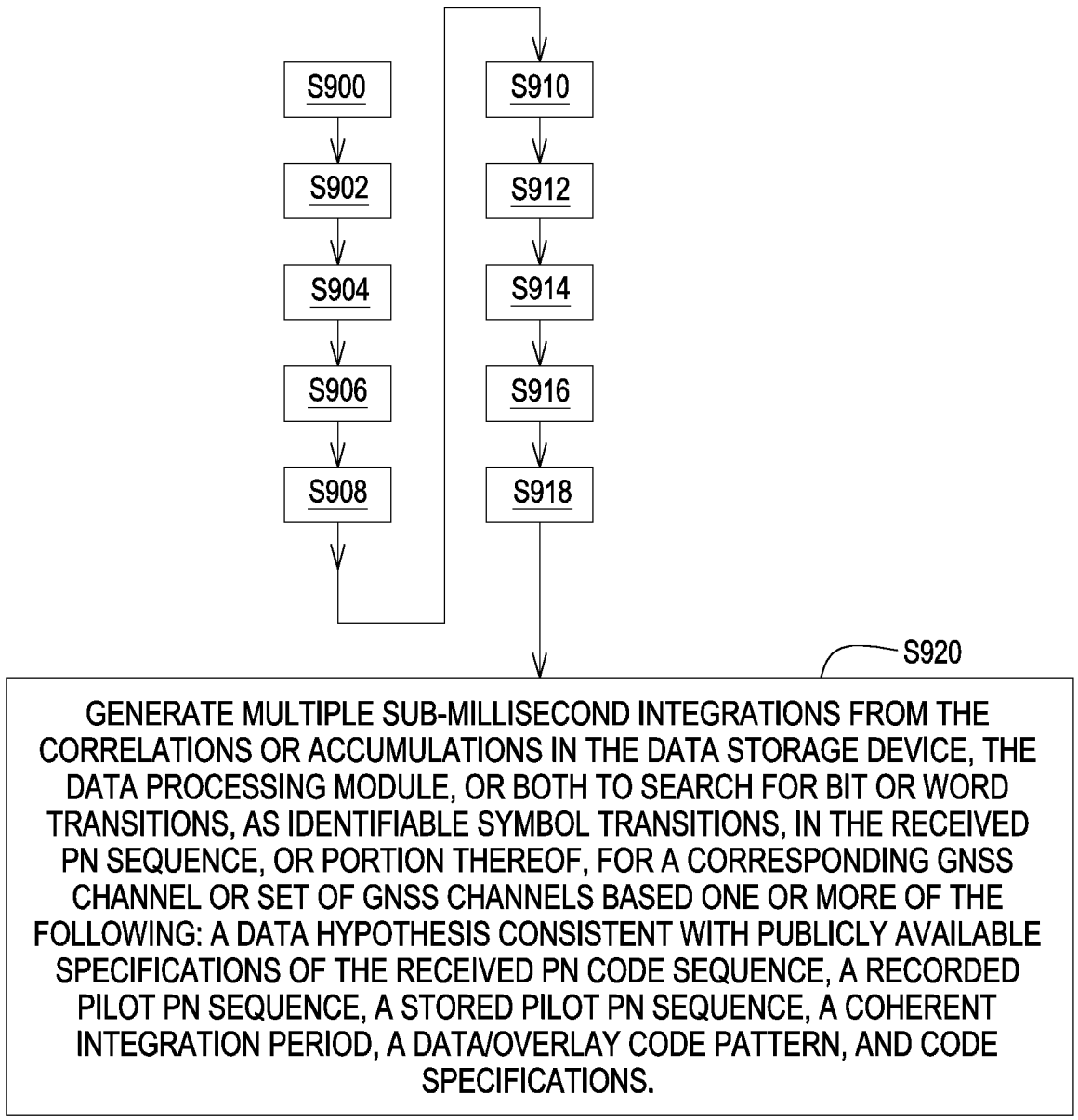

FIG. 15 discloses a flow chart of a second embodiment of a method for acquiring a satellite signal or receiving a satellite signal with interference rejection.

Figure 16:
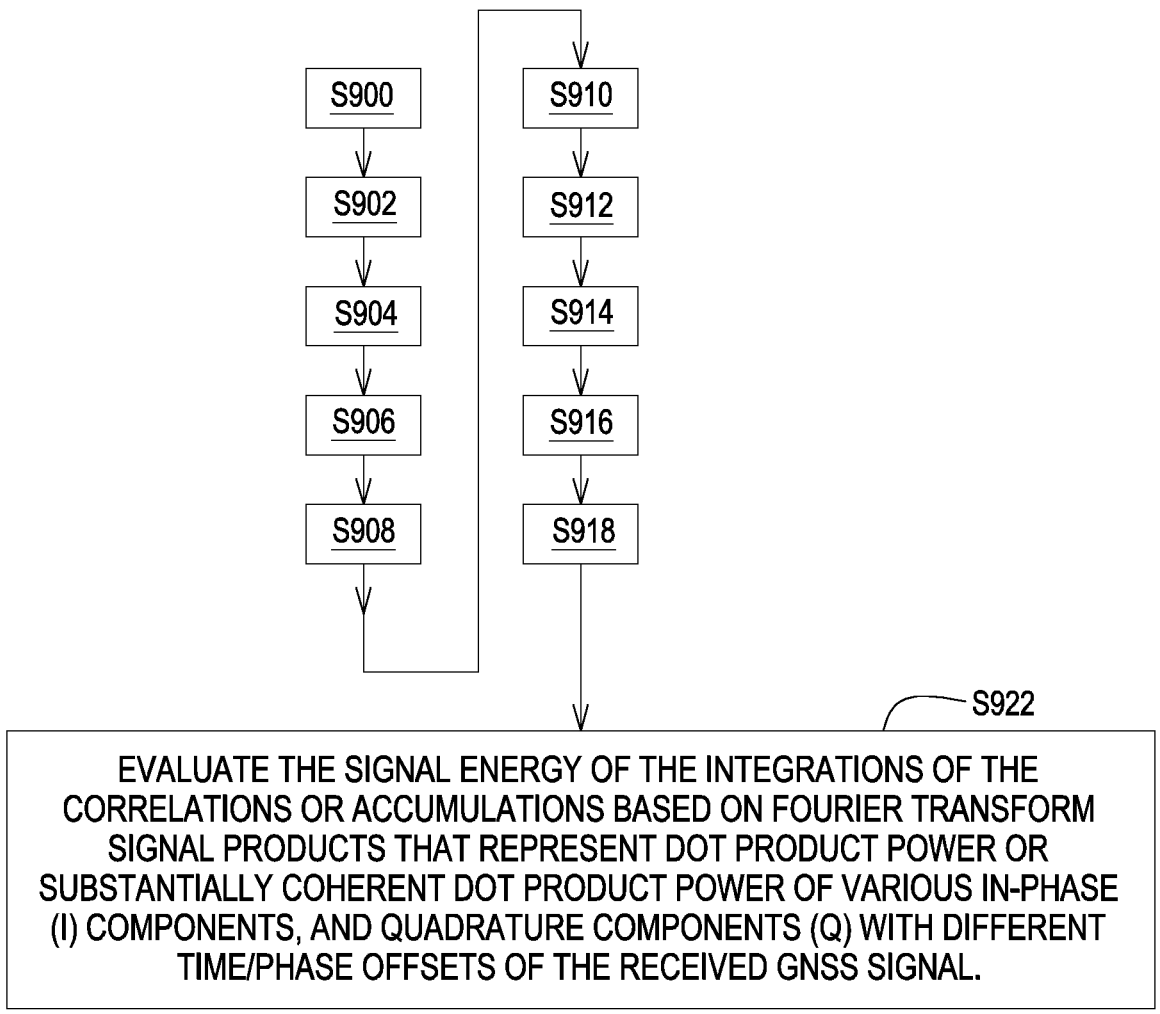

FIG. 16 discloses a flow chart of a third embodiment of a method for acquiring a satellite signal or receiving a satellite signal with interference rejection.

Figure 17:
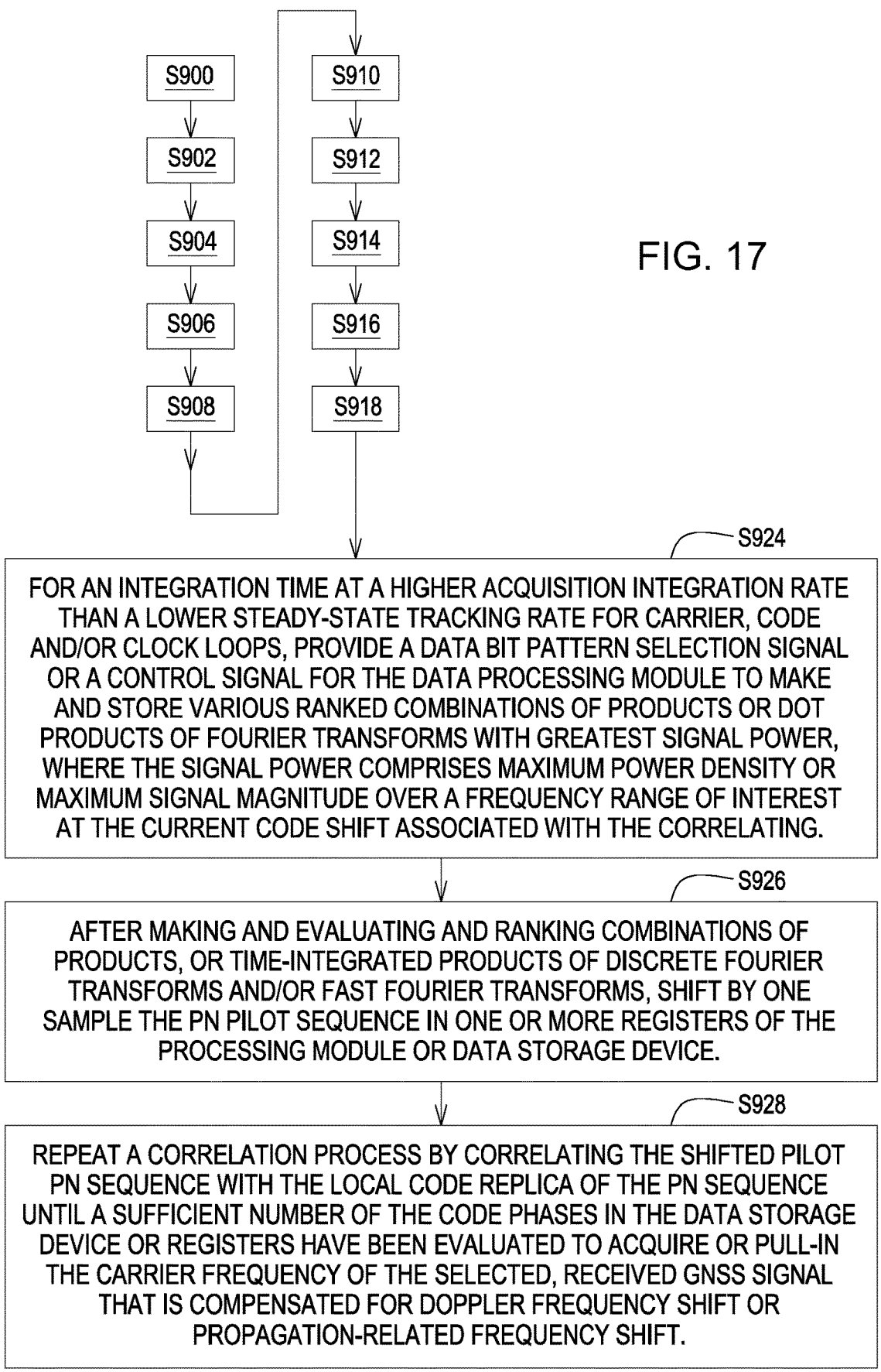

FIG. 17 discloses a flow chart of a fourth embodiment of a method for acquiring a satellite signal or receiving a satellite signal with interference rejection.

Figure 18:
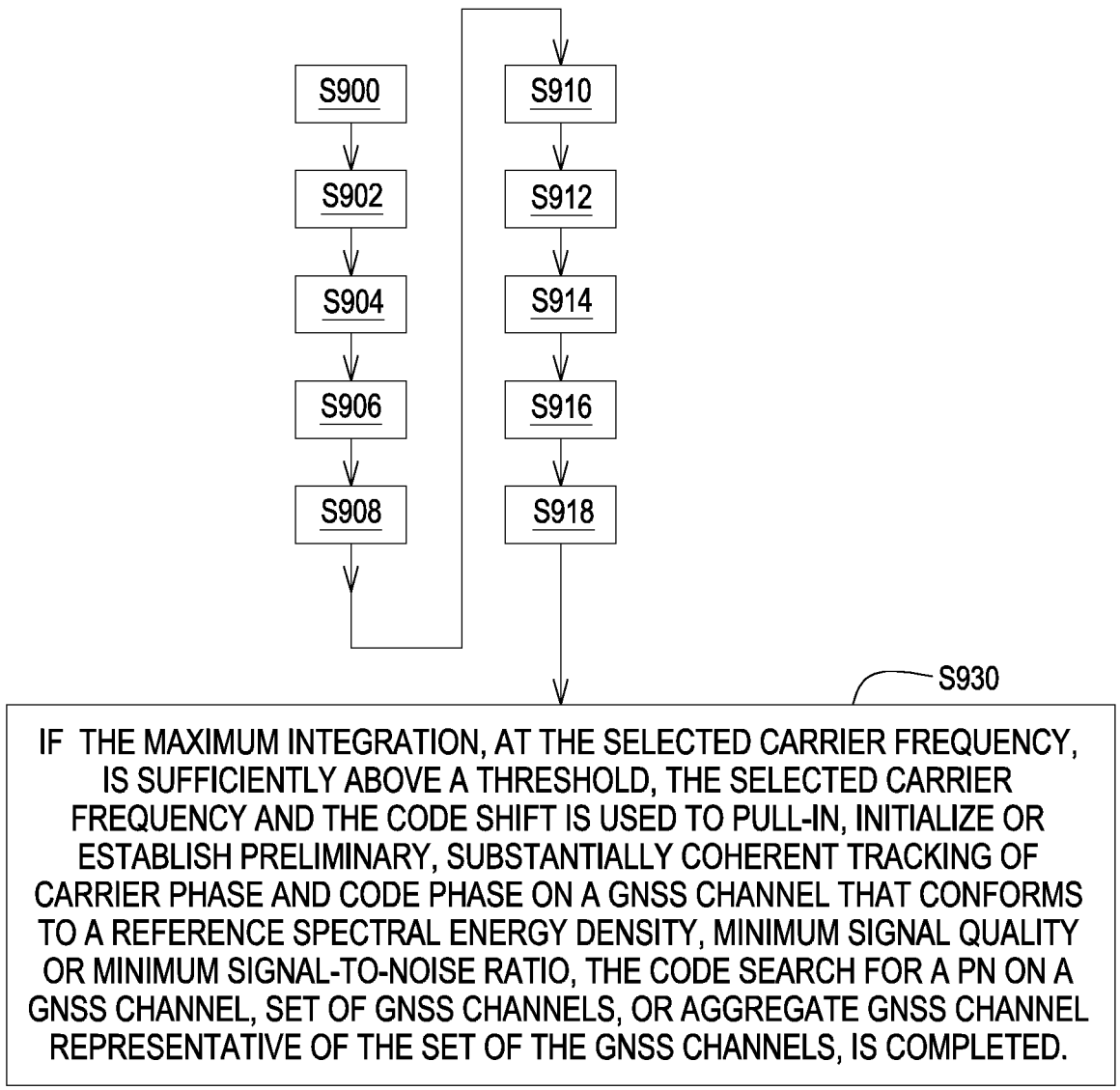

FIG. 18 discloses a flow chart of a fifth embodiment of a method for acquiring a satellite signal or receiving a satellite signal with interference rejection.

Figure 19:
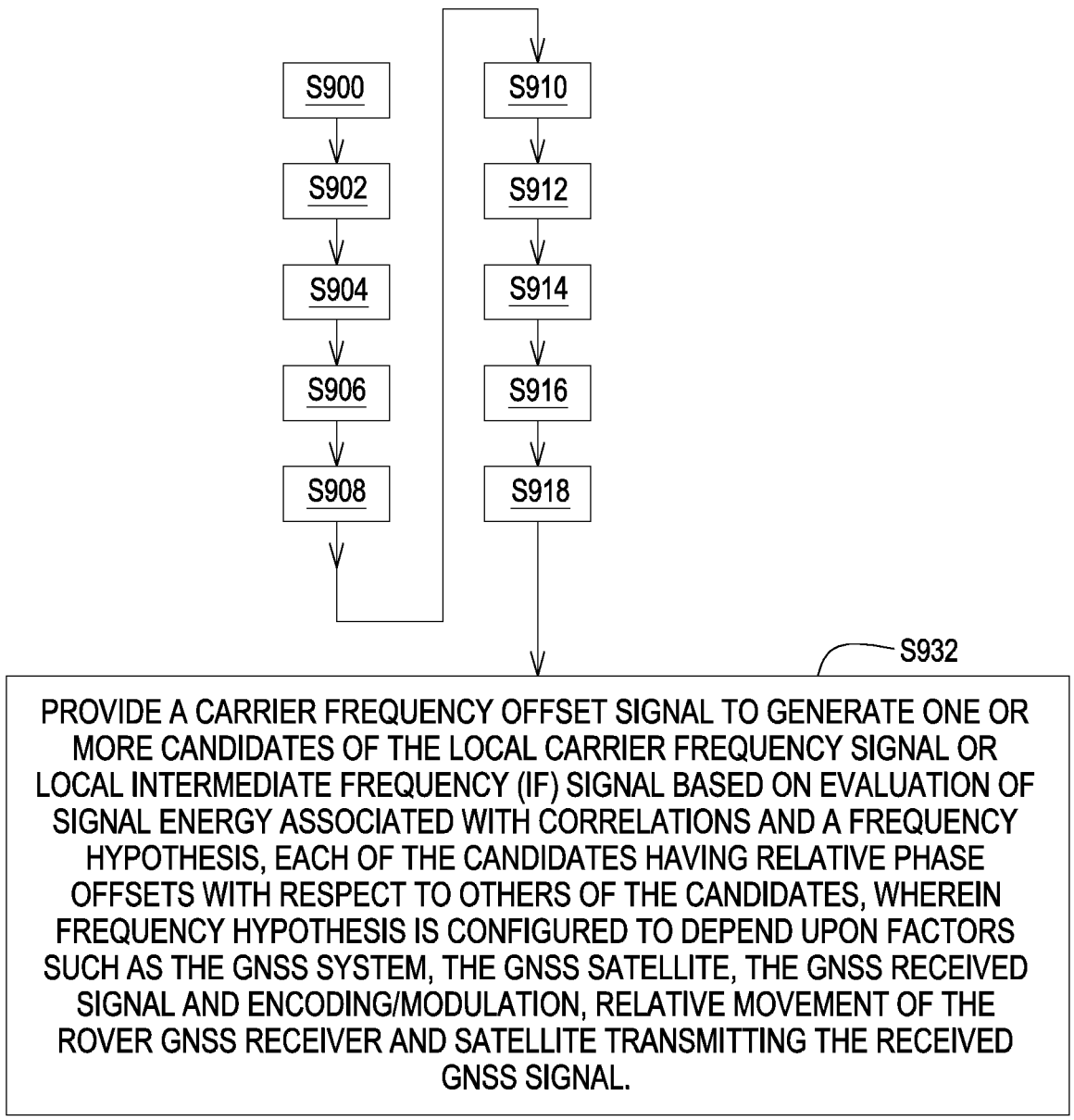

FIG. 19 discloses a flow chart of a sixth embodiment of a method for acquiring a satellite signal or receiving a satellite signal with interference rejection.

DETAILED DESCRIPTION

As used in this document, adapted to, arranged to or configured to means that one or more data processors, logic devices, digital electronic circuits, delay lines, or electronic devices are programmed with software instructions to be executed, or are provided with equivalent circuitry, to perform a task, calculation, estimation, communication, or other function set forth in this document.

An electronic data processor means a microcontroller, microprocessor, an arithmetic logic unit, a Boolean logic circuit, a digital signal processor (DSP), a programmable gate array, an application specific integrated circuit (ASIC), or another electronic data processor for executing software instructions, logic, code or modules that are storable in any data storage device.

As used in this document, a radio frequency signal comprises any electromagnetic signal or wireless communication signal in the millimeter frequency bands, microwave frequency bands, ultra-high-frequency bands, or other frequency bands that are used for wireless communications of data, voice, telemetry, navigation signals, and the like.

FIG. 1 is a block diagram of a receiver system 100 with digital signal processing for adaptive interference mitigation for radio frequency signal, such as a microwave satellite signal 102 (S_Lx). A global navigation satellite system (GNSS) comprises one or more constellations of satellites 101 orbiting around the Earth. Each satellite 101 (e.g., GNSS satellite) comprises a transmitter for transmitting a desired navigation satellite signal or radio frequency signal that can be received by a receiver system 100 (e.g., GNSS receiver system or satellite navigation receiver). Meanwhile, an interfering transmitter 104 may transmit an interference signal 103 (e.g., N_Lx and/or J_Lx) on a frequency and with a modulation that has the potential to interfere with the reception of the desired navigation satellite signal 102 of the GNSS receiver.

The receiver system 100 represents an illustrative example of one possible reception environment for a radio receiver such as a global navigation satellite system (GNSS) receiver. The satellite 101 (e.g., satellite vehicle) transmits the satellite signal 102 on multiple frequencies, such that the collective set of signals may be referred to as a composite signal. For example, in FIG. 1 the Lx can represent one or more satellite signals 102, such as L1, L2, and/or L5 signals, which are used in a Global Positioning System (GPS). The satellite signal 102 will be attenuated or disturbed by free space propagation, the ionosphere, and troposphere. In practice, the satellite signal 102 can be impacted by background noise and/or some potential interference signals 103 (e.g., narrowband interference signal). For example, at a terrestrial radio tower, an interfering transmitter 104 may transmit one or more interference signals 103 within the same or adjacent band to one or more transmitted satellite signals 102 from the satellite 101. The interference signal 103 can be classified as either wideband interference (WBI, e.g., a pulse-like signal) or narrowband interference (NBI, e.g., a continuous wave (CW) signal, which bandwidth is relatively narrower than the GNSS signal), or both. The scope of this disclosure will concentrate on mitigation, reduction or filtering of interference from one or more interference signals 103, such as WBI, NBI, or both. As used herein, the NBI may be synonymous with an NBI component or NBI components.

FIG. 1 shows a receiver system 100 capable of receiving signals transmitted by satellites 101 that include one or more carrier signals (e.g., a first carrier (L1), a second carrier (L2) and an additional third carrier (L5) of the Global Positioning System (GPS)) such that the receiver system 100 can determine position, velocity, and attitude (e.g., yaw, tilt and roll angles) with very high accuracy and precision based on the received signals. The received signals may be transmitted from one or more satellites 101, such as a GPS satellite, a Galileo-compatible satellite, or a Global Navigation Satellite System (GLONASS) satellite. The satellites 101 have approximately known orbital positions versus time that can be used to estimate the relative position between an antenna 106 of the receiver system 100 and each satellite 101, based on the propagation time of one or more received signals between four or more of the satellites 101 and the antenna 106 of the receiver system 100.

Precise point positioning (PPP) includes the use of precise satellite orbit and clock corrections provided wirelessly via correction data, rather than through normal satellite broadcast information (ephemeris and clock data) that is encoded on the received satellite signals, to determine a relative position or absolute position of a mobile receiver. PPP may use correction data that is applicable to a wide geographic area. Although the resulting positions can be accurate within a few centimeters using state-of-the-art algorithms, conventional precise point positioning can have a long convergence time of up to tens of minutes to stabilize and determine the float or integer ambiguity values necessary to achieve the purported (e.g., advertised) steady-state accuracy. Hence, such long convergence time is typically a limiting factor in the applicability of PPP.

In accordance with one embodiment, FIG. 1 illustrates a receiver system 100 with a dual-path receiver configuration. In a dual-path receiver configuration with interference rejection, the receiver system 100 comprises an antenna 106 for receiving a radio frequency signal, such as a microwave frequency satellite signal (e.g., one or more satellite carrier signals from multiple satellites, such as at least four orbiting satellites). The antenna 106 is coupled to a signal splitter 107 that splits the received radio frequency signal into a first radio frequency signal and a second radio frequency signal, where the first radio frequency signal and the second radio frequency signal are generally identical to each other. Further, the first radio frequency signal and the second radio frequency signal are essentially an attenuated version of the received radio frequency signal at an output port 105 of the antenna 106. The splitter 107 may comprise a diplexer, a hybrid splitter 107, a radio frequency transformer, or the like.

Here, a dual band system is described as an example with a first analog signal path within the first analog module 111 corresponding to the first radio frequency signal (e.g., a GNSS channel or set of GNSS channels) and a second analog signal path of a second analog module 131 associated with second radio frequency signal (e.g., a GNSS channel or set of GNSS channels), although in other configurations multiple parallel signal paths for corresponding different frequency bands may be used. For example, a dual band system includes a low-band and a high band, where the low-band has a lower frequency range than the high band does. For the Global Positioning System (GPS), the transmitted L1 frequency signal of a satellite 101 may comprise the high band; the transmitted L2 frequency signal may comprise the low band signal. Further, the L1 carrier is at 1,575.42 MHz, which is modulated with the P(Y) code (pseudo random noise code) and M code that occupies a target reception bandwidth on each side of the carrier. Meanwhile, the L2 carrier is at 1,227.6 MHz and modulated with the L2C code, P(Y) code (pseudo random noise code) and M code that occupies a target reception bandwidth on each side of the carrier. The splitter 107 (e.g., diplexer) splits the composite signal into the first signal path (e.g., upper signal path or high-band path) and the second signal path (e.g., lower path or low-band path).

In one embodiment, the signal splitter 107 or hybrid may split the received signal into two received radio frequency signals for processing by a first analog module 111 and a second analog module 131. Each analog module (111, 131) converts the received radio frequency (RF) or microwave frequency signal to an intermediate frequency (IF) signal or a quasi-baseband signal, which means a baseband signal that is equal to or greater than the zero frequency or direct current (DC) signal in the frequency domain. For example, the intermediate frequency (IF) signal or a quasi-baseband signal may fall within a certain frequency range that excludes zero frequency or direct current DC signal, such as a certain frequency range that has a lower limit that is equal to or greater than approximately 1 Megahertz (MHz).

The first analog module 111 may comprise an optional first pre-amplifier 141 or a low-noise amplifier (LNA) for amplifying the received signal. Similarly, the second analog module 131 may comprise an optional second pre-amplifier 151 or a low-noise amplifier (LNA) for amplifying the received signal. To simplify the receiver analog filtering design, the front-end of a typical modern GNSS receiver uses a wideband front-end design to receive multiple GNSS signals using two/three wideband filters (not shown), where each band targets a target bandwidth (e.g., 140-300 MHz).

In the first analog module 111, a first downconverter 142 is configured to convert the (amplified) first radio frequency signal to an analog intermediate frequency signal. For example, the first analog module 111 comprises a first downconverter 142, such as the combination of a mixer 156 and a local oscillator 154, which moves or shifts the high band (L1, G1, B1, or similar frequency associated with a GNSS) radio frequency (RF) into the analog intermediate frequency (IF). The first downconverter 142 is coupled to the first analog-to-digital (ADC) converter 112. For example, the first downconverter 142 may be coupled to the first ADC 112 via an optional first automatic gain control 143 and an optional first anti-aliasing filter 158, such as an analog low pass filter. Further, the optional first anti-aliasing filter 158 may be configured as an analog low pass filter or analog bandpass filter (BPF) that rejects the image band of the mixer output from the first downconverter 142.

In the first analog module 111, an optional first automatic gain control (AGC) 143 is coupled to the first ADC 112 and the first downconverter 142. The optional first AGC 143 is illustrated in dashed lines to indicate that it is optional and can be deleted in certain embodiments. For example, in one configuration of the first signal path, an optional first automatic gain control (AGC) 143 is coupled to the first ADC 112, the first downconverter 142, and the first pre-amplifier 141. The optional first automatic gain control (AGC) 143 may control the gain (e.g., root mean square (RMS) amplitude) of an input signal to the corresponding first analog-to-digital converter (ADC) 112 to be constant or within a target range (e.g., despite fluctuations in ambient radio frequency noise and the interference signal 103). The first AGC 143 receives gain-related feedback (as indicated by the dashed arrow) from the first ADC 112 to adjust the gain setting of first downconverter 142 (and/or the first pre-amplifier 141).

In the second analog signal path 157, a second downconverter 152 is configured to convert the (amplified) second radio frequency signal to an analog intermediate frequency signal. For example, the second analog module 131 comprises a second downconverter 152, such as the combination of a mixer 166 and a local oscillator 164, which moves the low band (L2, or similar frequency associated with a GNSS) radio frequency (RF) into the intermediate frequency (IF). In one configuration, the second downconverter 152 may be coupled to the second ADC converter 132 via an optional second automatic gain control 153 and an optional second anti-aliasing filter 168, such as an analog low pass filter. Further, the optional second anti-aliasing filter 168 may be configured as an analog low pass filter or analog bandpass filter (BPF) that rejects the image band of the mixer output from the second downconverter 152.

As used in this document, each of the first downconverter 142 and the second downconverter 152 is individually referred to as a primary downconverter; the first downconverter 142 and second downconverter 152 are collectively referred to as primary downconverters. Meanwhile, as used in this document, each of the first harm resistant frequency translator 201 (FIG. 2) and the second harm resistant frequency translator 211 is individual referred to as secondary downconverter; the first harm resistant frequency translator 201 and the second harm resistant frequency translator 211 are collectively referred to as secondary downconverters. Each primary downconverter downconverts the received GNSS signal channel, set of channels or aggregate channel (e.g., super channel) representative of the set of channels to an intermediate frequency (IF) signal (e.g., associated with an encoded/modulated IF signal) or directly to a near-baseband frequency signal. Each secondary downconverter downconverts the IF signal (e.g., encoded/modulated IF signal) or near baseband frequency signal to a baseband frequency signal, where the baseband frequency signal is generally still modulated or encoded with information (e.g., prior to code wipe-off).

In the second analog signal path 157, an optional second automatic gain control (AGC) 153 is coupled to the second analog-to-digital converter (ADC) 132 and the second downconverter 152. As indicated by the dashed lines in FIG. 1, the second ADC 132 is optional and can be deleted in certain embodiments. For example, in one configuration of the second signal path, an optional second automatic gain control (AGC) 153 is coupled to the second ADC 132, the second downconverter 152, and the second pre-amplifier 151. The optional second automatic gain control (AGC) 153 may control the gain (e.g., root mean square (RMS) amplitude) of an input signal to the corresponding second analog-to-digital converter (ADC) 132 to be constant or within a target range (e.g., despite fluctuations in ambient radio frequency noise and the interference signal 103). The optional second AGC 153 receives gain-related feedback (as indicated by the dashed arrow) from the second ADC 132 to adjust the gain setting of second downconverter 152 (and/or the second pre-amplifier 151).

Each analog-to-digital converter (ADC) (112, 132) may be coupled to its optional corresponding automatic gain control (AGC) (143, 153) that provides variable gain amplification. In turn, each optional AGC is coupled to its corresponding downconverter (142, 152). In one embodiment, the automatic gain control AGC provides a feedback signal to the downconverter (142, 152) or intermediate frequency (IF) filter (e.g., analog IF filter) that is associated with the downconverter. The downconverter (142, 152) or its analog IF filter adapts the signal voltage (pea-to-peak) within the first ADC 112 to be commensurate with its operational range.

In one embodiment, each ADC (112, 132) samples the analog received signal (from the corresponding downconverter (142, 152)) using a predefined sampling rate, which, per Nyquist theorem, should be equal to or greater than two times the bandwidth (e.g., target reception bandwidth) for the practical sampling design. In an alternate embodiment, each ADC (112, 132) samples the analog signal using a predefined sampling rate, which, per Nyquist theorem, should be greater than the one times bandwidth for complex signal sampling and two times bandwidth for the real signal sampling. The bandwidth of the ADC determines maximum tolerable interference at a given quantization loss. The resulting digital sequence or filter input of digital signal (113, 133) (e.g., intermediate frequency (IF) signal) reconstructs the received signal, such as the first signal (e.g., high-band RF signal) and the second signal (e.g., low-band RF signal) to the digital intermediate frequency signal (or alternately a quasi-digital baseband signal or digital baseband signal) with a corresponding baseband bandwidth or range.

Quantization refers to the sampling of an analog signal, such as a received satellite signal, by an analog-to-digital converter to produce a number of finite or discrete digital values (e.g., quantum level) per unit time. Interference or aliasing from electromagnetic interference can cause quantization distortion or quantization noise, where quantization distortion can represent a sampling error during the analog to digital conversion and where quantization noise can represent a difference between the digital values (e.g., quantum level) and the actual amplitude, phase or both of sampled analog signal (e.g., for analog signals of weak amplitude or in the presence of multipath or electromagnetic interference).

Aliasing sometimes refers to a false signal, misleading signal, or processing artifact of an ADC (112, 132) or RF-sampling ADC that uses a sampling rate that is too low relative to the frequency of the received signal, such as received satellite signal at a carrier frequency or fundamental frequency. The sampling rate should be selected in accordance with Nyquist theorem and/or Shannon's sampling theorem to avoid aliasing (e.g., in the absence of electromagnetic interference signals). For example, Shannon's sampling theorem provides that the analog signal must be sampled at a rate or frequency that is at least twice the frequency of the highest components contained within received signal, such as the carrier frequency and the full modulation bandwidth (e.g., at least half power bandwidth or minimum percent (e.g., 95 percent) of transmitted energy or mean transmitted power for spread spectrum signals transmitted between a lower frequency limit and an upper frequency limit) with respect to the carrier frequency.

In general, an alias signal is a false digital signal that represents a subharmonic or harmonic component of the true digital signal. In addition to improper selection of the sampling frequency, aliasing can result from an interference signal that is processed by an analog to digital converter, particularly in the absence of proper interference mitigation filtering.

The ADC (112, 132) inherently produces aliasing based on the following factors: the received frequency of the received satellite signal (e.g., with a corresponding fundamental frequency or carrier frequency), one or more harmonics of frequency of analog received satellite signal (e.g., second harmonic representing two multiplied by the fundamental frequency and the third harmonic representing three multiplied by the fundamental frequency), the sampling frequency (e.g., greater than two times the received satellite frequency or fundamental frequency) of the analog to digital converter, the reference frequency of the mixer, the modulation and bandwidth (e.g., half-power bandwidth) of the received satellite signal, and filter attenuation of filters or decimating filters that filter the analog received satellite signal and its harmonics. Prior to the ADC (112, 132), an optional analog anti-aliasing filter or low pass filter (158, 168) may be tuned or configured to attenuate the alias signals, such as one or more harmonics of analog received satellite signal, or the reference frequency of the mixer.

In terms of the AGC feedback control from its respective ADC (112, 132), the AGC feedback control can be done either in analog or digital domain. For example, an envelope detector is typically used for AGC and variable gain control if analog control is used. Because of advances in digital processing theory and practice, the digital processing for the AGC feedback control, can be based on a statistical processes, such as digital analysis of a histogram of the sample digital stream or filter inputs of digital signal (113, 133) at the output of the corresponding analog-to-digital converter, ADC (112, 132) to generate a feedback signal to control the AGC (143, 153), such as the first AGC 143 associated with the corresponding first analog signal module 111 and the second AGC 153 associated with the second analog signal path 157. Each AGC is coupled to the downconverter (142, 152), which in practice may comprise the downconverter and IF filter module with inherent gain/amplification adjustments.

In an alternate embodiments, the analog-to-digital converter (ADC) (e.g., first ADC, second ADC, or both) may comprise a radio frequency ADC or RF-sampling ADC that replaces some components of the analog module, such as the local oscillator (e.g. numerically controller oscillator), mixer, any analog intermediate frequency amplifier, and analog band pass filter. Further, in certain alternate embodiments, the analog ADC may comprise an RF ADC followed by an integral digital-downconverter (DDC) with a digital local oscillator (NCO), digital mixer and digital baseband filter. For example, the DDC comprises a tuning NCO that provides a reference signal to one or more digital mixers, which can be filtered by a digital low pass filter, a digital bandpass filter, or both, such as one or more finite-impulse response filters (e.g., for low pass, bandpass, each filter having decimation rate by n), amplified (optional) and down-sampled).

WBI Mitigation Module

A first analog-to-digital converter 112 is configured to convert the analog intermediate frequency signal to a digital intermediate frequency signal, or to convert an analog baseband signal to a digital quasi-baseband signal. A first wide band interference mitigation module 117 is coupled to a digital output of the first analog-to-digital filter 112. The first WBI mitigation module 117 is configured to mitigate or attenuate WBI in the digital baseband signal or quasi-baseband signal. The first WBI mitigation module 117 detects the short period ADC saturation resulting from the WBI and processes or blanks those saturation period to mitigate its impact. Blanking refers to a process of disabling a signal, data stream or channel for one or more sampling intervals, such as any of the following: (a) retaining (e.g., storing and holding) a previous value of the disabled signal for a corresponding sampling interval; (b) discarding or rejecting a sampled value for a sampling interval; (c) discarding and averaging a sampled value over discarded and adjacent sampling time intervals, and/or (d) assigning a null value or predefined logic value to digital signal for a discarded sampling interval.

A second analog-to-digital converter 132 is configured to convert the analog intermediate frequency signal to a digital intermediate frequency signal, or to convert an analog baseband signal to a digital quasi-baseband signal. A second wide band interference mitigation module 137 is coupled to a digital output of the second analog-to-digital filter 132. The second WBI mitigation module 137 is configured to mitigate or attenuate WBI in the digital baseband signal or quasi-baseband signal. The second WBI mitigation module 137 detects the short period ADC saturation resulting from the WBI and processes or blanks those saturation period to mitigate its impact.

Selective Filtering Module

The first selective filtering module 114 extracts a targeted component, such as selected band, an upper band, a high band or a sub-band, from the inputted digital intermediate frequency signal, or digital (upper band spectrum) signal 113. For example, the first selective filtering module 114 may comprise a bandpass filter for a band component or sub-band component of the received satellite GNSS signal in its derivative form of the digital intermediate frequency signal or quasi-base band signal. The first selective filtering module 114 outputs a resultant digital baseband signal, which in one configuration comprises a GNSS signal at a band of interest (e.g. L1 or G1 or B1), the in-GNSS-band NBI, and the noise.

In one embodiment, as illustrated in FIG. 1 and FIG. 2A, the first selective filtering module 114 comprises a harmonic-resistant frequency translator or secondary downconverter, and a digital low pass filter.

The first harmonic-resistant frequency translator 201 or secondary downconverter represents a digital downconverter, which can operate in the digital frequency domain, to process, mix or shift an inputted digital intermediate frequency signal (e.g., quasi baseband signal) to a digital baseband signal. The output of the first harm resistant frequency translator is inputted to a first digital low pass filter such as a band low pass filter or bandpass low pass filter that passes the upper band or high band of the received satellite signal (e.g., received GNSS signal). The first digital low pass filter or bandpass filter (BPF) is configured to reject the image band (e.g., to reduce or attenuate aliased signal components) of the output or mixer output component from the secondary downconverter.

The second selective filtering module 134 extracts a targeted component, such as selected band, an low band, a low band or a sub-band, from the inputted digital intermediate frequency signal, from the inputted digital intermediate frequency signal, or digital (lower band spectrum) signal 113. For example, the second selective filtering module 134 may comprise a bandpass filter for a band component or sub-band component of the received satellite GNSS signal in its derivative form of the digital intermediate frequency signal or quasi-base band signal. The second selective filtering module 134 outputs a resultant digital baseband signal, which in one configuration comprises a GNSS signal at a band of interest (e.g. L2 or G2 or B2), the in-GNSS-band NBI, and the noise.

In one embodiment, as illustrated in FIG. 1 and FIG. 2B, the second selective filtering module 134 comprises a harmonic-resistant frequency translator or secondary downconverter, and a digital low pass filter.

The second harmonic-resistant frequency translator 211 or secondary downconverter represents a digital downconverter, which can operate in the digital frequency domain, to process, mix or shift an inputted digital intermediate frequency signal (e.g., quasi baseband signal) to a digital baseband signal. The output of the second harm resistant frequency translator 211 is inputted to a second digital low pass filter 213 such as a band low pass filter or bandpass low pass filter that passes the lower band or low band of the received satellite signal (e.g., received GNSS signal). The second digital low pass filter 213 or bandpass filter (BPF) is configured to reject the image band (e.g., to reduce or attenuate aliased signal components) of the output or mixer output component from the secondary downconverter.

Narrowband Interference Mitigation Module

The output of the first selective filtering module 114 is coupled to the input of the first narrowband interference (NBI) mitigation module 110. The first NBI system 110 is configured to reject an interference component that interferes with the received radio frequency signal (e.g., associated with a first sub-band or set of channels). For example, in one embodiment the first NBI mitigation system 110 comprises a first narrow band notch filter 205, such as a first adaptive narrow band notch filter that has a dynamically adjustable attenuation versus frequency response, a selectable attenuation versus frequency response (e.g., notch depth, notch width), or a library of preset frequency responses to dynamically select from. The first narrow band notch filter 205 can be selectively controlled by a controller or the output of the first wide band interference mitigation module 117 to temporarily disable the notch filter for sampling intervals or samples that correspond to blanked digital intermediate frequency signal components.

The output of the second selective filtering module 134 is coupled to the input of the second narrowband interference (NBI) mitigation system 130. The second NBI system 130 is configured to reject an interference component that interferes with the received radio frequency signal (e.g., associated with a first sub-band or set of channels). For example, in one embodiment the second NBI mitigation system 130 comprises a second narrow band notch filter 215, such as a first adaptive narrow band notch filter that has a dynamically adjustable attenuation versus frequency response, a selectable attenuation versus frequency response, or a library of preset frequency responses to dynamically select from. The second narrow band notch filter 215 can be selectively controlled by a controller or the output of the second wide band interference mitigation module 137 to temporarily disable the notch filter for sampling intervals or samples that correspond to blanked digital intermediate frequency signal components.

Digital Automatic Gain Control

The first digital automatic gain control (DAGC) 207 is configured to adjust the gain to compensate for attenuation or amplification of the magnitude of received signal components, or corresponding samples, of the satellite signal. The second digital automatic gain control (DAGC) 217 is configured to adjust the gain to compensate for attenuation or amplification of the magnitude of received signal components, or corresponding samples, of the satellite signal.

To the extent a relatively strong in-GNSS-band NBI component is present in digital baseband signal 115, the GNSS receiver will tend to experience signal to noise ratio (SNR) degradation; such degradation is significantly determined by the relative location of NBI reference to the pseudorandom noise (PN) like signal in the frequency domain and the de-spreading gain that a specific PN sequence provides. For a GNSS satellite that transmits a spread spectrum signal (e.g., like code division multiple access modulation) the de-spreading gain or spread spectrum processing gain is the ratio of the spread bandwidth or total bandwidth of the electromagnetic signal (e.g., frequency spectrum of modulated radio frequency or microwave signal that contains approximately 95 percent of the transmitted energy) to the baseband bandwidth. To mitigate the impact of the in-GNSS-band NBI on the PN sequence demodulation performance, the NBI mitigation system (110, 130) is configured to adaptively reject the NBI in the received signal or digital baseband. The residual or resultant signal (116, 136) ideally, contains only the PN signal and the noise.

In one embodiment, the blanking process in WBI mitigation module (117, 137) introduces the phase discontinuity which negatively impact the stability and accuracy of the NBI mitigation system (110, 130); therefore the blanking enable signal (119, 139 (passes onto the NBI mitigation system (110, 130) to make it pause the adaptive updating during the blanking period.

In FIG. 1 and FIG. 2B shows the lower signal path from the splitter 107 (e.g., diplexer), which is similar to the upper signal path from the splitter of FIG. 1 and FIG. 2A. In lower signal path of FIG. 1, the second analog module 131, which includes second anti-aliasing filter 168 input the second ADC 132, processes the analog received satellite signal. From the second ADC 132, resultant digital stream 133 represents the low band RF spectrum at an intermediate frequency or quasi-baseband range. The second WBI mitigation module 137 detects the pulse-like interference and mitigates its impact. The resultant signal 138 is processed by the second selective filter module 134 (e.g., with bandpass filtering) to extract the signal from a targeted band (e.g., L2, L5 etc.). The NBI rejection system (110, 130) is configured to mitigate the PN demodulation degradation on the targeted band.

As shown in FIG. 1 for each channel, band or sub-band, a selection multiplexor (MUX) 120 (e.g., band selection multiplexor) selects the sample stream from a channel, a set of channels (e.g., super channel), band or sub-band that carries the targeted PN sequence. For example, the selection multiplexor 120 needs to select L1 band as the output or output channel if the targeted PN sequence type is GPS L1 C/A. The selection multiplexor 120 allows common receiver software and hardware to be used for different channels to minimize interchannel bias in the digital hardware (e.g., electronic data processor or application specific integrated circuit) and associated software that is used.

The selected channel or appropriate sample stream will be further processed by the GNSS channel processing module 121, which typically comprises one or multiple carrier phase demodulators, the PN code generator sampled at multiple delayed phase/time offsets (e.g., or at taps of shift registers), the binary offset sub-carrier (BOC) modulator (used for modern GNSS signal such as GPS L1C, Bei Dou B1C, Galileo E1 signals etc.), and multiple accumulators, to create a bank or accumulations of in-phase (I) and quadrature (Q) measurements at an interval (e.g., of millisecond (ms) or multiple milliseconds) to drive the baseband tracking loop (e.g., to support timely, reliable, precise carrier phase and/or code phase measurements).

In one embodiment, the GNSS channel processing module 121 may comprise a baseband tracking loop module (e.g., 711 in FIG. 10A) for tracking carrier phase, or for tracking both carrier phase and code phase. For example, the baseband tracking loop module derives correction or control signals to control one or more local oscillators, such as numerically controlled oscillators (NCOs) (e.g., one or more carrier NCOs, one or more code NCOs, and optional clock NCOs) in the GNSS channel processing module 121 to maintain the synchronization between the received signal in the channel and the local replica of that channel with respect to code phase, carrier phase, or both. For example, the PN code generator generates a replica or local PN code at the GNSS receiver A GNSS channel processing module 121 is coupled to a navigation control and interface module 122. Further, in some embodiments, GNSS channel processing module 121 may further comprise one or more clock tracking loops 730 for tracking the clock bias (or a corresponding clock compensating offset) of a corresponding GNSS satellite, a clock bias of a rover or mobile GNSS receiver, or both (e.g., to adjust code phase or a local replica of the code phase).

In one embodiment, the navigation, control and interface module 122 takes a pseudo-range measurements and carrier phase measurements and other related information from the satellites 101 to generate the positioning solution, which is used as a feedback to align the receiver crystal-grade clock (e.g., of lower temporal precision) with the satellite-based atomic grade clock (e.g., of higher temporal precision); the solution also, combined with other information, generates the in-view satellites 101 list to control the appropriate receiver resource allocation.

As used in this document, accumulators refer to registers, flip-flops, electronic memory, or other electronic data storage devices that are used to store the results of computations of an electronic data processor, such as a microprocessor, microcontroller, application specific integrated circuit (ASIC), system on chip (SOC), programmable logic array (PLA), field programmable gate array (FPGA), an arithmetic logic unit (ALU), a Boolean logic unit (BLU), digital logic circuits, a digital signal processor or another data processing device. The correction signals derived from the baseband tracking loops control the numerically controlled oscillators (NCOs) in the GNSS channel processing module 121 to maintain the synchronization between the received signal in the channel and the local replica of that channel (e.g., for decoding or demodulation of certain signal components and/or precise, pseudorange measurements, code phase measurements and/or carrier phase measurements).

As used in this document, pseudorange measurements or pseudorange estimates are based on code phase measurements and/or carrier phase measurements between a given GNSS satellite and GNSS receiver. For example, by evaluating a reference symbol or edge (e.g., leading edge, trailing edge or pulse) of received code phase signal with respect to the replica code phase signal, the GNSS rover receiver can estimate the difference between a transmit time (e.g., consistent with GNSS time standard and any available correction for clock bias) at the given GNSS satellite, a reception time (e.g., consistent with GNSS time standard and any available correction for clock bias) at the GNSS receiver, where the difference is multiplied by the speed of light (e.g., approximately $3 \times 10^8$ m/s).

In one embodiment, the navigation, control and interface module 122 takes the pseudorange and carrier phase measurements and other related information from the satellites to generate a positioning solution. In certain configurations, the position solution of the GNSS receiver, or its antenna, can be used as a feedback to align the GNSS receiver crystal-grade clock with the satellite-based atomic grade clock; the solution also, combined with other information, generates the in-view satellites list to control the appropriate GNSS receiver resource allocation.

FIG. 2A and FIG. 2B, collectively, illustrate the subsystem of a GNSS band processing, including digital down conversion, GNSS band filtering, NBI mitigation system using notch filter, and digital automatic gain control (DAGC). In FIG. 2A, the high band ADC samples or digital signal 113 passes through the WBI mitigation module 117, where the magnitude of the samples are counted to produce the statistical metrics. The metrics generates the blanking command to mitigate the impact of the WBI on the received satellite signal at the GNSS receiver. The output signal 118 passes through the GNSS band processing to eliminate the adjacent-GNSS-band interference, minimize the in-GNSS-band NBI, and adjust resultant signal 116 to an appropriate level for channel processing.

To produce or operate a reliable interference resistant receiver system, the low pass filtering module (203, 213) is configured to address the potential limitations of the harm-resistant frequency translator, or to minimize the potential deleterious effects of aliasing in the processing (e.g., rotating or mixing of) digital baseband signal. After the analog-to-digital converter (112, 132) in the digital filtering, one or more digital filters, such as low pass filters (203, 213), can attenuate alias signal components, such as the second harmonic and the third harmonic, and the shifted second harmonic and shifted third harmonic which are shifted by the reference frequency of the mixer (e.g., in translator 201, 211), to the extent that the digital intermediate frequency approaches a zero frequency or DC or is spaced apart from the shifted second harmonic and shifted third harmonic. Ideally, the digital low pass filter (203, 213) such as a decimation filter or decimation filters do not affect the target or desired signal components of digital intermediate frequency or baseband, but can a attenuate one or more harmonics. Further, the decimation filter can shift an image or artifact of the received analog frequency to the negative frequency or complex frequency for attenuation, to the extent that the shifted image or artifact lies within (or wraps around to the real frequency domain to support) the attenuation or rejection band of the LPF. If interference is present, the interference can add to the inherent aliasing of the fundamental frequency or its harmonics, or provide narrowband or wide-band components adjacent or near the fundamental frequency or its harmonics that can be addressed at proper time periods by the filtering. For example, the receiver is configured to apply adaptive and dynamic filtering to corresponding sampling intervals (e.g., epochs) of the received GNSS signal, and its derived digital baseband signal to mitigate certain WBI, NBI, or both.

The order or filter order of a digital filter, such as LPF (203, 213) may represent the maximum delay (e.g., of sampling intervals) that are used to create the filtered output from a digital input, such as the maximum number of samples (e.g., higher number of maximum sampling interval M or N) used in the difference equation in the time domain. The anti-jamming capability of the receiver tends to increase of the ADC bit width (e.g., such as from 32 bit data blocks to 64 bit data blocks for faster or greater data processing throughput) of the ADC (112, 132) which consequently increases the logic complexity of the digital processing.

In one example, the low pass filter (203, 213) or other anti-aliasing filter is used at the output of the harmonic-resistant frequency translator (201, 211) to attenuate, reduce or ameliorate aliasing, mixing images, and mixing artifacts that might otherwise degrade performance. In one embodiment, the band low-pass filter (203, 213) comprises an anti-aliasing digital filter that ideally provides a substantially flat or substantially uniform amplitude response versus frequency for baseband signal frequency components within the passband and complete attenuation or greater than a minimum threshold attenuation (relative to passband) of the baseband signal frequency components outside of the passband with a linear phase response over the entire passband.

Figures 3, 12:
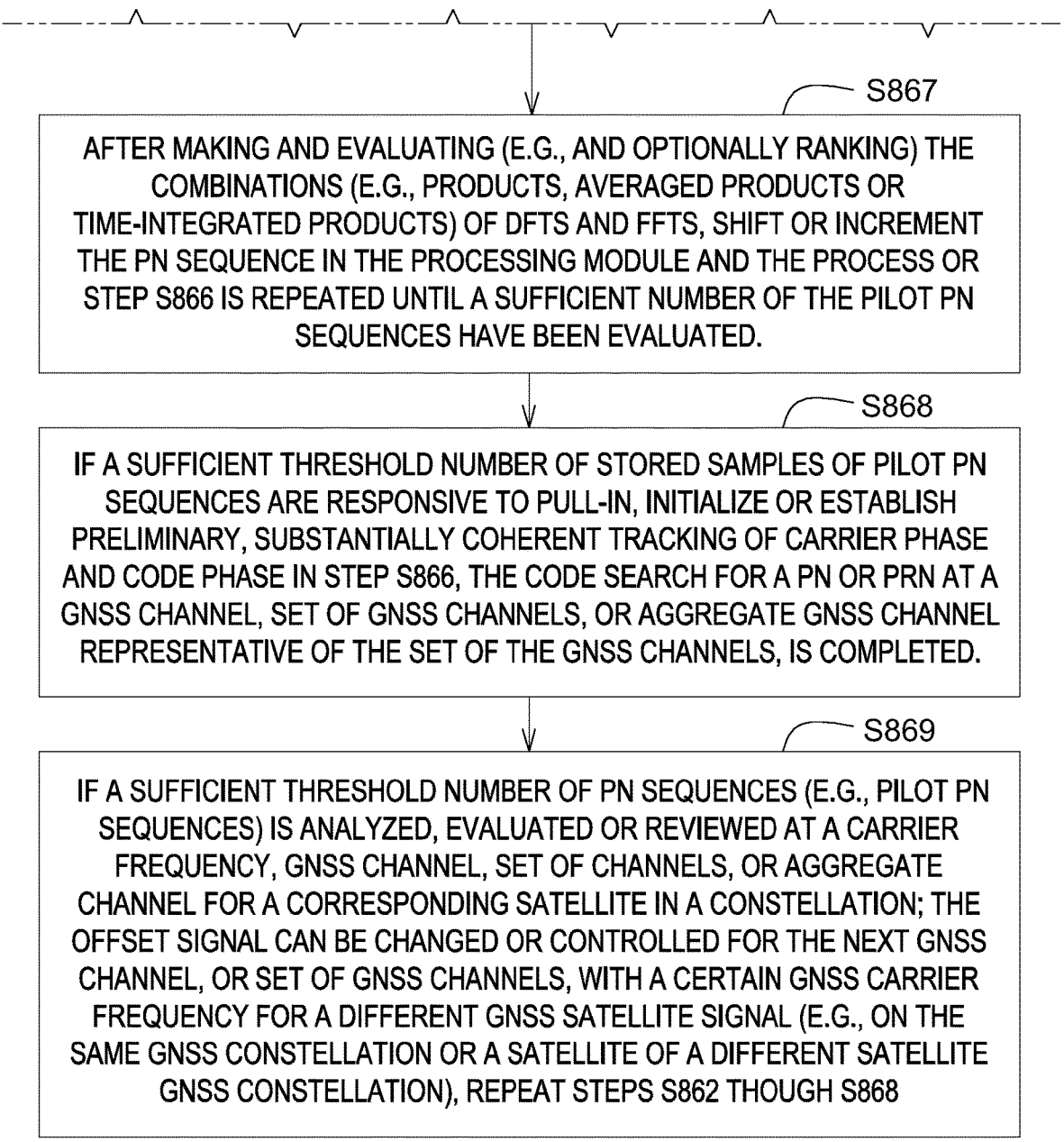

For example, the anti-aliasing filter at the output of the harmonic-resistant frequency translator (201, 211) could be configured as an Nth order digital bandpass filter (BPF), which would require 2N+2 coefficients. However, the anti-aliasing filter at the output of the harmonic-resistant frequency translator (201, 211) is generally configured as the low pass filter (LPF) with equivalent bandwidth to the above BPF that only requires N/2 coefficients due to its symmetric property. To utilize this symmetric property, the harmonic-resistant frequency translator (201, 211) is configured to translate the digital intermediate frequency signal of interest into a digital baseband signal. However, within the harmonic-resistant frequency translator (201, 211), the digital mixer (rotation) is imperfect; the imperfection introduces the harmonics around its fundamental frequency (e.g., frequency of local oscillator input to the digital mixer). Further, the harmonics can introduce alias components from the interference around the harmonics into GNSS processing bandwidth. In order to reduce the logic complexity and processing burden, a harmonic-resistant translator (201, 211) may comprise a harmonic-resistant mixer (201, 211) that is designed to translate the GNSS signal to near zero frequency with sufficient suppression of the harmonic aliasing. The detailed design of the harmonic-resistant mixer is described in conjunction with the block diagram of FIG. 3.

After the digital mixing by the harmonic-resistant frequency translator (201, 211), the digital baseband signal (202, 212) is at baseband or quasi-baseband (e.g., at, near, or approaching zero frequency). Therefore, any adjacent-GNSS-band interferences can be attenuated or mitigated using the LPF (203, 213). The resultant digital baseband signal (115, 135) that is outputted by the LPF (203, 213) comprises the in-GNSS-band interference, the GNSS signal, and the accompanying noise.

In one embodiment, a notch filter (205, 215) or another narrow band rejection filter is configured to attenuate an interference component of the baseband or digital intermediate frequency signal, wherein the narrow band rejection filter comprises: an adaptive notch filter and a controller for controlling the magnitude versus frequency response of the adaptive notch filter, where the controller has an estimator to estimate filter coefficients of the adaptive notch filter. For example, each NBI mitigation system (110, 130) comprises a corresponding narrow band notch filter (205, 215). The digital notch filter (205, 215) is configured with appropriate coefficients to produce a filter magnitude versus frequency response to mitigate the impact of the in-GNSS-band NBIs. The notch filter (205, 215) is commonly controlled or driven by an adaptive algorithm in either frequency domain or time domain. Theoretically, an Nth order notch filter (205, 215) can reject up to N interferences. However, the mismatch between the order of the notch filter (205, 215) and the number of the interference components (e.g., at different frequencies and associated interference bandwidths at those frequencies) negatively impact the accuracy.

In one embodiment, the WBI mitigation module (117, 137) uses the blanking (e.g., a blanking method), which can introduce a discontinuity or phase jump in the signal 118 or waveform. Such phase jump can reduce the stability and accuracy of the notch filter (205, 215). Therefore, in practice on a band-by-band basis (e.g., for lower band or higher band, independently) each NBI mitigation system (110, 130) or its notch filter (205, 215) uses a corresponding blanking enable signal (119, 139) to disable the adaptive updates during the period that phase jump is detected for the respective band or sub-band (e.g., lower band or higher band).

For each band or sub-band, the output signal or digital filtered baseband signal (206, 216) from the notch filter (205, 215) comprises the GNSS signal, the noise, and the residual of the interference (e.g., which is supposed to be at minimal strength). Because the filtered baseband signal (206, 216) comprises the GNSS signal and the noise, a low bit-width quantization of the ADC (112, 132) would be sufficient to ensure or promote the quantization loss less than a design threshold (e.g., 0.1 dB for low-bit width, where such design threshold may increase for a greater bit-width quantization). A lesser quantization level tends to reduce the logic complexity for the channel processing. However, the dynamic range of the filtered baseband signal (206, 216) tends to be dramatically different based on the interference signal(s) that are present at any time. For example, the digital signal (113, 133) may comprise strong NBIs at some times, whereas at other times the digital signal (113, 133) is noise-like or has the general characteristics of spread-spectrum modulated signal with PN code. For each band or sub-band, the respective digital AGC (DAGC) (207, 217) can adaptively adjust the magnitude of the respective filtered baseband signal (206, 216) which is susceptible to changes from interference, to yield resultant signal (116, 136) for a band or sub-band at a constant magnitude.

In FIG. 1, the GNSS band processing path of upper band (e.g., high band or high sub-band) or upper digital signal path is similar to (but can be independent of) the GNSS band processing path of the lower band (e.g., low band or low sub-band) or lower digital signal path. For the upper band, the first ADC 112 outputs a digital (intermediate frequency) signal 113 that is processed by the first WBI mitigation module 117. In the first selective filtering module 114, the processed, mitigated signal 118 is translated into the digital baseband signal by the first harmonic-resistant frequency translator 201. The first LPF 203 suppresses the adjacent-GNSS-band interference in the first digital baseband signal 202. The NBI component of digital baseband signal 115 at the first path is mitigated through the first notch filter 205. The first notch filter 205 uses the first blanking enable signal 119, to disable the updates during the period of phase jump. The first DAGC 207 adaptively adjust the magnitude of the resultant signal 116 to a constant level, a target level or within a target range.

With respect to the lower band, similar to the above upper band operation, the second ADC 132 outputs a digital intermediate frequency signal 133 that is processed by the second WBI mitigation system 137. In the selective filtering module 134, the processed, mitigated signal 138 is translated into the digital baseband signal by the second harmonic-resistant frequency translator 211. The second LPF 213 suppress the adjacent-GNSS-band interference in the second digital baseband signal 212. The NBI component of signal 214 at the second path is mitigated through the second notch filter 215. The second notch filter 215 uses the second blanking enable signal 139, to disable the updates during the period of phase jump. The second DAGC 217 adaptively adjust the magnitude of the signal 216 to a constant level, a target level or within a target range.

In FIG. 3A and FIG. 3B, for each channel, set of channels, or super channel, the harmonic-resistant frequency translator (201, 211) is illustrated in greater detail.

Each harmonic-resistant frequency translator (201, 211) comprises one or more digital harmonic-resistant mixers 303 or digital rotators that receives one or more corresponding digital mixing signals 302, such as a sine or in-phase digitally generated signal and cosine or quadrature digitally generated signal from a look-up table 301. For example, the digital harmonic resistant mixer may comprise a first digital mixer and a second digital mixer, where the first digital mixer is configured to generate an in-phase component (I) of the baseband signal or near-baseband signal and where the second digital mixer is configured to generate an quadrature (Q) component of the (encoded/modulated) baseband frequency signal, where the I component and Q component collectively for a channel, set of channels, or aggregate channel (e.g., super channel) representative of the set of channels for a received GNSS signal or GNSS composite signal contains all, or a majority of, the electromagnetic signal energy.

The first mixer receives a digital (intermediate frequency) signal (113, 133), derived from the received GNSS signal, and a local reference intermediate frequency signal, derived from local carrier signal or carrier replica, and generates the I component of the (encoded/modulate) baseband frequency or near-baseband frequency signal. Similarly, the second mixer receives a digital (intermediate frequency) signal (113, 133), derived from the received GNSS signal, and a local reference intermediate frequency signal, derived from local carrier signal or carrier replica, and generates the I component of the (encoded/modulate) baseband frequency or near-baseband frequency signal.

In one embodiment, the look-up table comprises a first look-up table for generation of a corresponding sine or in-phase local reference intermediate frequency signal and a second look-up table for generation of a cosine or quadrature-phase (e.g., offset 90 degrees from the in-phase component) local reference intermediate frequency signal. Further, in one configuration, the look-up table 301, which comprises the first look-up table and the second look-up table, is configured to generate one or more high precision, low resolution digital mixing signals 302 whose harmonic content is sufficiently suppressed. For example, the look-up table 301 may model or store the signal in terms of sine component, or a cosine component, or both at one or more fundamental frequencies for one or more integer number of cycles. In the look-up table 301, the stored or modeled signal may be stored as magnitude and phase values in the look-up table, for instance.

In one embodiment, a local intermediate frequency (IF) signal generator, such as a carrier numerically controlled oscillator (NCO) with a frequency scaler, or an IF NCO provides an local IF signal or local reference signal as an input to the digital harmonic resistant mixer 303. Further, local IF frequency generator, IF NCO or carrier NCO (e.g., as well as the code NCO for the same channel, set of channels or aggregate set of channels), may be driven by a clock signal with a frequency that is precisely controlled by a phase locked loop or the clock tracking loop module (e.g., 730 in FIG. 10A). The IF NCO or carrier NCO may typically output a repeating stair-case function of discrete phase states versus time, which the look-up table 301 uses to generate the precise quadrature and in-phase signals.

In one configuration, a phase accumulator or accumulations for correlation data processing of encoded signal components may be used as an input to the clock tracking loop module (e.g., 730 in FIG. 10A), or to the channel baseband tracking module (e.g., 711 in FIG. 10A), or any applicable carrier NCO, code NCO or clock NCO, to the look-up table 301 to address the data storage locations of the appropriate sine or cosine values in the lookup table to produce a target waveform (e.g., compensated waveform to reduce tracking error of carrier phase, code phase and clock phase) of a high precision, low resolution digital mixing signal 302, whose harmonic content is sufficiently suppressed. The phase accumulator would receive the digital (intermediate frequency) signal (113, 133) for processing.

Referring to the charts (352, 354, 356) of FIG. 3B, each horizontal axis (350) indicates frequency of the signal, which increases to the right, and each vertical axis (351) represents magnitude of each corresponding signal, where the frequencies of each horizontal axis are aligned to represent common frequencies throughout the three charts of FIG. 3B.

In the uppermost chart 352 of FIG. 3B, digital harmonic-resistant mixer 303 processes or mixes the input signal or digital signal (113, 133) with the harmonic-resistant mixing signal to generate the baseband signal 202/212. To highlight the importance of the look-up table 301, the illustrative scenario of FIG. 3B assumes the digital signal (113, 133) comprises a strong adjacent-GNSS-band NBI component 312 and the GNSS signal component 311, which can be encoded by a code, such as PN code or PRN code (e.g., Gold code for L1 (C/A), Weil code for L1C and P code for L1 and L2). In the middle chart 354 because of the finite quantization, the fast Fourier Transform (FFT) of the signal 302 comprises a fundamental (line) spectrum signal components 321 and two harmonic (line) spectrum signals components 322 and 323. In the lower chart 356, the fundamental signal 321 translates the desired GNSS signal component 311 into digital baseband, as shown by the digital baseband signal 331.

Here in the example, the strong adjacent-GNSS-band NBI component 312 is too close to the harmonic signal 322 which tends to translate the interference signal of NBI component 312 into or with the digital baseband signal 332. As a result, the demodulation of the GNSS signal in the digital baseband 331 will be disturbed by the baseband interference signal 332. This illustrative scenario exemplifies the importance to suppress the harmonic signal 322 and 323, which in turn suppresses the baseband interference signal 332.

In one configuration, the critical factors to suppress the undesired harmonic component are the length of one cycle (e.g., corresponding to the local oscillator frequency of the carrier offset frequency, intermediate frequency signal of the local oscillator or NCO for digital mixing) and the precision of each element in the look-up table (LUT) 301. The ideal phase rotation with only fundamental line spectrum can be represented by a float format vector $Ae^{j\omega n}$, where A is the magnitude of the phasor, ω is the normalized frequency, and n is the index of the sample.

Figure 4:
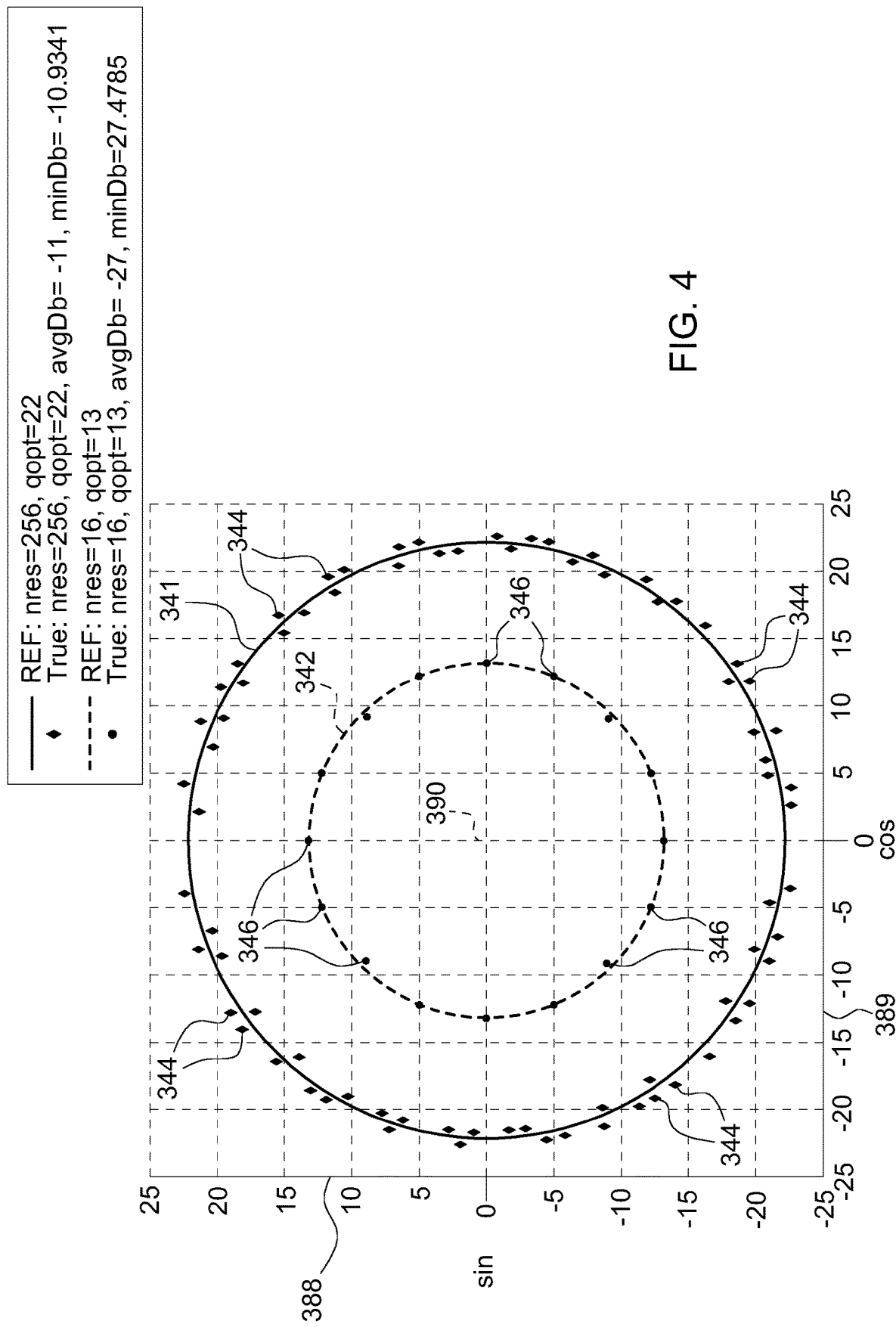
FIG. 4 is a graph of parameter selection for harmonic-resistant, digital mixing.

Referring to FIG. 4, the elements of the LUT 301 in accordance with the above equation can be plotted with respect to the vertical axis 388 and horizontal axis 389 with a horizontal-axis zero and a vertical-axis zero being centrally located a center point 390. In FIG. 4, the above vector, in float format, depicts a circle or generally circular shape as shown by the signal of the outer circle 341 and signal 342 of the inner circle. By fixing the length of the cycle of the mixing signal 302 from the look-up table 301, the precision can be increased as suggested by greater conformity (or less deviation) of the scatter plots of respective points (344, 346) of FIG. 4 to a true circle. By fixing the precision of the mixing signal 302, a shorter cycle is better fit of the scatter plot of respective points (344, 346) of the circle as a conical fitting algorithm is subject to less constraints.

In a first example of FIG. 4, as illustrated, the vector signal of the outer circle 341 is fitted to, or is representative of, points (344), which are diamond shaped. Further, the above vector equation forms a vector signal of the outer circle 341 that is defined by points (344) based on an exemplary 256 bit entry lookup table with a higher precision level (e.g., of 22), where the undesired harmonic is attenuated to be 10 dB below the magnitude of the mixing signal 302 at the fundamental frequency.

In a second example of FIG. 4, as illustrated, the vector signal of the inner circle 342 is fitted to, or is representative of, points (346), which are dot shaped. Further, the above vector equation forms a vector signal of the inner circle 342 that is defined by points (346) based on an exemplary 16 bit entry lookup table with a lower bits precision level (e.g., of 13), where the undesired harmonic is attenuated to be 27 dB below the magnitude of the mixing signal 302 at the fundamental frequency. As a result, the design of harmonic-resistant mixer 303 is configured provide a high precision, low resolution signal that balances the frequency resolution and the bits precision level.

In one embodiment, the receiver may use a multi-stage down-conversion process, even within the secondary down-converter. In the secondary downconverter, the digital harmonic-resistant mixer can implement a first-stage mixer process and a second stage filtering process. First, the digital harmonic-resistant mixer can use the coarse resolution (shorter cycle), high precision approach to translate the GNSS signal into the near digital baseband or quasi-baseband (e.g., near rather than at Ideal 0 frequency) that is located within the passband of LPF (203, 213). As long as the interference aliasing is prevented by the harmonic-resistant frequency translator (201, 211) (e.g., to prevent aliasing that falls outside the bandwidth of the low pass filter, such as the negative frequency or imaginary frequency domain), in the second stage filtering process the LPF (203, 213) is able to reject the adjacent-GNSS-band interference. Following the LPF (203, 213), the notch filter (205, 215) can further take out the in-band, GNSS-band interference. Therefore, it is possible that during certain time periods, the resultant filtered baseband signal (206, 216) doesn't comprise any strong interference relative to the digital baseband signal; during such time periods the harmonic constraint is less strict, where in the first-stage mixer process, the harmonic-resistant frequency translator (201, 211) can operate (e.g., temporarily) with a long cycle (high resolution), such that the mixing can allow relative high harmonic components during such time periods.

In an alternate embodiment, an additional or supplemental digital mixer may follow the LPF (203, 213) to shift or translate any digital quasi-baseband signal to a true digital baseband signal at zero frequency or over a bandwidth of the baseband that is inclusive of a zero frequency component.

FIG. 5A illustrates an architecture of a system 400 for integrating multiple interference resistance technologies.

In FIG. 5B, each received digital (intermediate frequency) signal (113, 133) comprises the desired GNSS signal component 311, the adjacent-GNSS-band interference signal 312, the in-GNSS-band interference signal 441, and the wideband interference signal 443. The filter shape 451 represents the combination of the low-noise amplifier (LNA) (141, 151) and front-end filtering of analog anti-aliasing filters (158, 168) of the first analog module (111, 313). The filter shape 452 represents the digital GNSS band filtering (e.g., upper band, lower band, high band, low band or corresponding sub-bands, such as channels L1, L2, L5) of the selective filtering module (114, 134). Because the wideband architecture makes the analog filter not able to mitigate adjacent-GNSS-band interferences or NBI component 312, the digital processing and digital filtering after the ADC (112, 132) is responsible to deal address and mitigate the NBI, WBI, or both.

In FIG. 5A, the WBI mitigation module (117, 137) detects the ADC saturation of the ADC (112, 132) based upon the presence of the pulse signal interference 443. To detect ADC saturation when the pulse signal interference 443 is present, a special AGC algorithm of the digital AGC (207, 217) is configured to classify, identify or distinguish: (a) the pulsed wideband clipping that is caused by the pulse signal interference 443, (b) the ADC response of narrow-band clipping (e.g., continuous or discontinuous) that is caused by the NBI signals 312 and 441. Upon detection of the clipping during one or more sampling intervals, the digital AGC (207, 217) blanks the WBI signal 443 during the clipped sampling intervals in which ADC saturation indicates the WBI in the form of pulse signal interference 443, resulting in the resultant signal (116, 136).

in FIG. 5A, the harmonic-resistant frequency translator (201, 211 convert the desired GNSS band 452 to the near zero frequency or digital quasi-baseband signal so that the simple LPF (e.g., within selective filtering module, 114, 134) is able to reject the adjacent-GNSS-band NBI 312. The resultant digital baseband signal (115, 135) comprises the desired GNSS signal component 311 and the in-GNSS-band NBI 441.

Following the low pass filtering of the LPF or bandpass filtering of selective filtering module (114, 134), the notch filter (205, 215) either in finite impulse response (FIR), an infinite impulse response (IIR), or hybrid of both the FIR and IIR, is used to mitigate the impact of in-GNSS-band NBI 441. Because of the spectrum overlap between the in-GNSS-band NBI 441 and the desired GNSS signal component 311, the mitigation of the NBI signal 441 is susceptible to distortion (e.g., typically, inevitably distorts) the waveform of the desired GNSS signal component 311, which adversely impact the tracking accuracy. Therefore, a notch filter control module is configured to control the notch filter (205, 215) to facilitate advantageously enabling notch filter for sampling intervals that overweigh the disadvantage from the potential distortion. The blanking algorithm in WBI mitigation module (117, 137) provides a control signal or data message indicative of phase discontinuity which negatively affect the tracking performance of the notch filter (205, 215) for one or more sampling intervals to control, disable and enable the notch filter (205, 215). If a disable notch-filter signal or blanking enable signal (119, 139) is provided to notch filter (205, 215), the adaptive updates of notch filter are delayed, stayed or held off over the period (e.g., series of successive sampling intervals or epochs, which is a measurement time unit within the GNSS receiver) that phase discontinuity happens.

At the output of the notch filter (205, 215), the digital filtered baseband signal (206, 216) only comprises the desired GNSS signal component 311 and the noise. However, the magnitude of signal (206, 216) can be dramatically diversified between the case that in-GNSS-band interference signal 441 is present and the case that interference signal 441 is absent. The two-bit quantization loss to noise-like signal desired GNSS signal component 311 is negligible; therefore to simplify the channel processing logic, the digital AGC (DAGC) (207, 217) is configured to adaptively scale the signal (206, 216 in FIG. 5A or 512, 532 in FIG. 6) to a constant level, a target signal level, or within a target signal range (e.g., digital compression). The resultant signal (116, 136), whose spectrum can be distorted from interference without proper or reliable interference mitigation, drives the channel tracking loops to produce the navigation solution.

Figure 6:
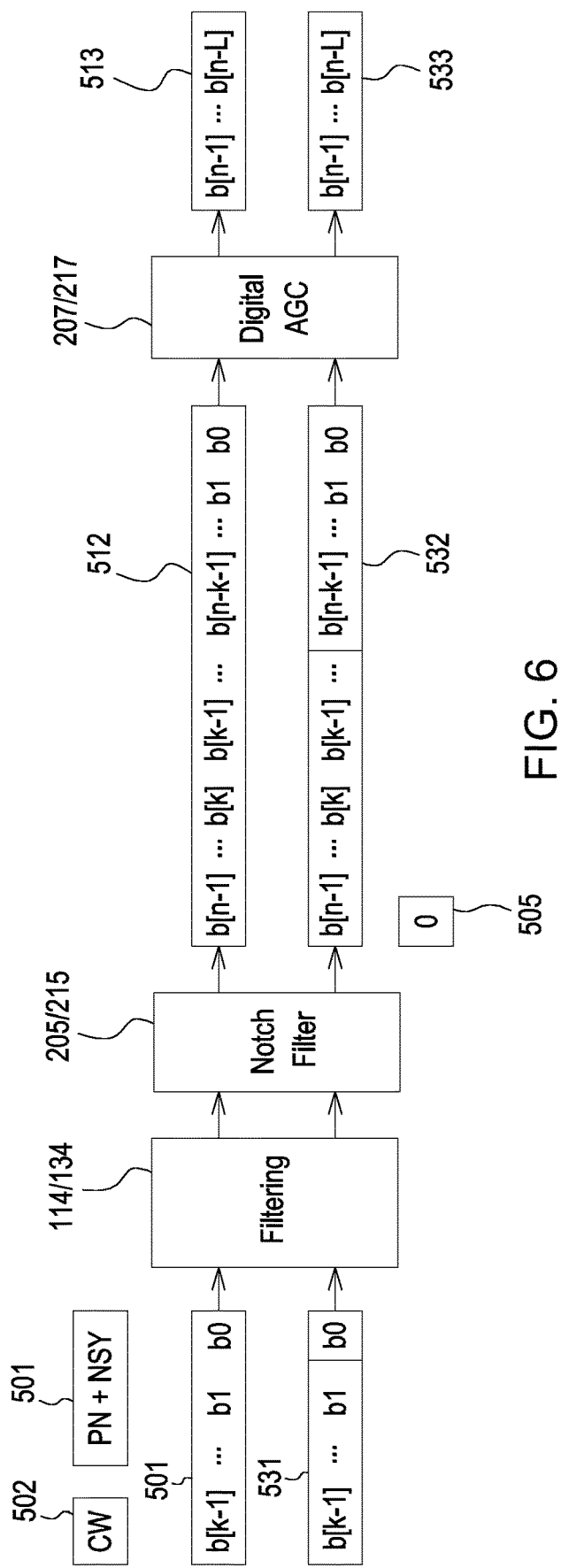
FIG. 6 is a block diagram of one embodiment of a digital automatic gain control module and associated filters.

FIG. 6 clarifies the necessity of the DAGC system (207, 217) to complement the digital filtering of the GNSS receiver, such as the selective filtering module (114, 134), the notch filter (205, 215), or both. Two typical cases are discussed in FIG. 6. The first case starts with the input signal 501 (for digital filtering), which comprises the desired, encoded pseudo-random noise code (PN) signal 311 that modulates the carrier of the received satellite signal and accompanying noise (NSY). The most significant bits (MSB) of the signal 501 contains the information of the desired GNSS signal component 311, such as the encoded PN signal. Under this circumstance, the selective filtering module (114, 134) mitigates the power of the adjacent- GNSS-band noise (e.g., continuous wave (CW) interference or noise), and the notch filter (205, 215) is or can be unnecessary. As a result, the MSB of the signal 512 contains the information of the desired GNSS signal component 311. Under this first case, the DAGC (207, 217) is anticipated to provide unity gain, or a default scaled gain.

The second case starts with the input signal 531 (for digital filtering), which comprises the GNSS signal (e.g., 311) encoded with the desired PN signal, either the adjacent-GNSS-band NBI signal (e.g., NBI component 312 in FIG. 5B) or the in-GNSS-band NBI signal 441 (in FIG. 5B) or both, and the noise. Due to the presence of the strong NBIs, the MSB of ADC data 531 represents the NBI components 312 and 441. Under such circumstance, the selective filtering module (114, 134) comprises a bandpass filter (e.g., for a lower band, an upper band, a high band, a low band or a selected GNSS channel, such as L1, L2, L5) to reject or attenuate the power of the adjacent-GNSS-band NBI signal 312, and the notch filter (205, 215) mitigate the power of the in-GNSS-band NBI signal 441. As a result, the MSB of the signal 532 becomes or is filled with "0" for one or more relevant sampling intervals as shown by the signal 505. Therefore, the DAGC (207, 217) is expected to amplify or increase the gain to scale the desired signal (e.g., 311) from: (a) the least significant bit (LSB) of the signal 532 to the MSB of the signal 533; and from the LSB of signal 512 to the MSB of signal 533.

Figure 7:
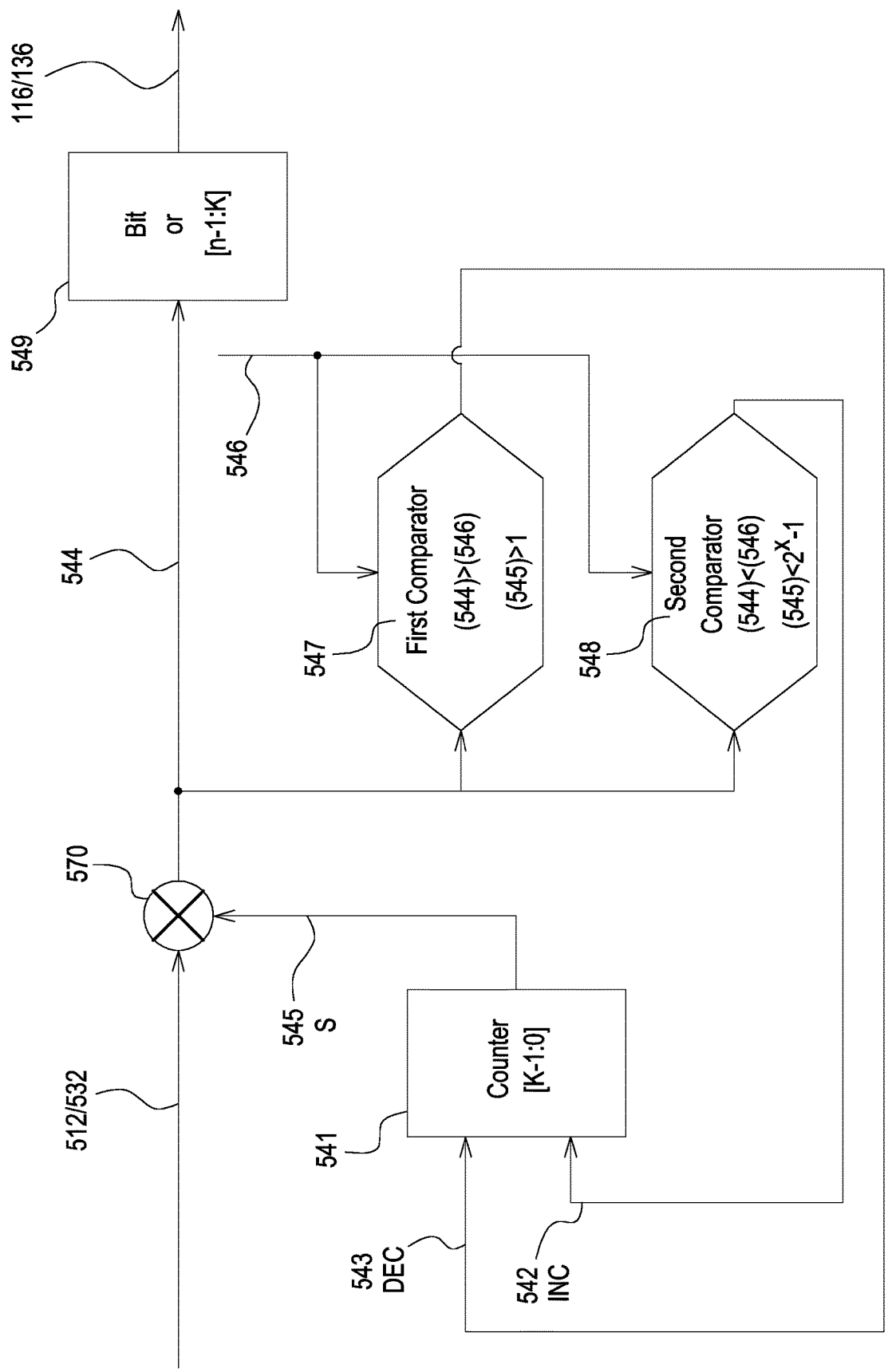
FIG. 7 is a block diagram of one embodiment of a digital automatic gain control module in more detail than FIG. 6.

In order to achieve the target gain control goal of DAGC system (207, 217), FIG. 7 provides an example of a block diagram that can be used to implement the DAGC (207, 217). At the input, a multiplier 570 multiples signal (512, 532) by the scale signal(S) 545 to yield the product of the resultant signal 544.

A first comparator 547 compares the resultant signal 544 with a desired threshold signal 546. If the first comparator 547 determines that signal 544 is greater than the signal 546 and that the signal 545 is greater than 1, the counter 541 decrements or decreases the scale signal(S) 545 in response to the decrement enable input 543 that is provided by the first comparator 547.

The second comparator 548 compares resultant signal 544 with desired signal 546. If the second comparator 548 determines that the signal 544 is less than the signal 546 and if the scale signal(S) 545 does not exceeds the maximum value (e.g., 2-1) of the counter 541, the second comparator 548 generates an increment signal 542, which enables the counter 541 to increase or increment the scale signal 545. Otherwise, the signal 545 maintained constant and the signal 544 stays at the corresponding desirable level that is associated with the then-constant scale signal(S) 545.

The bit extractor 549 takes the appropriate bits with sufficiently small quantization loss to produce the resultant signal (116, 136) for the GNSS channel processing.

Figure 8:
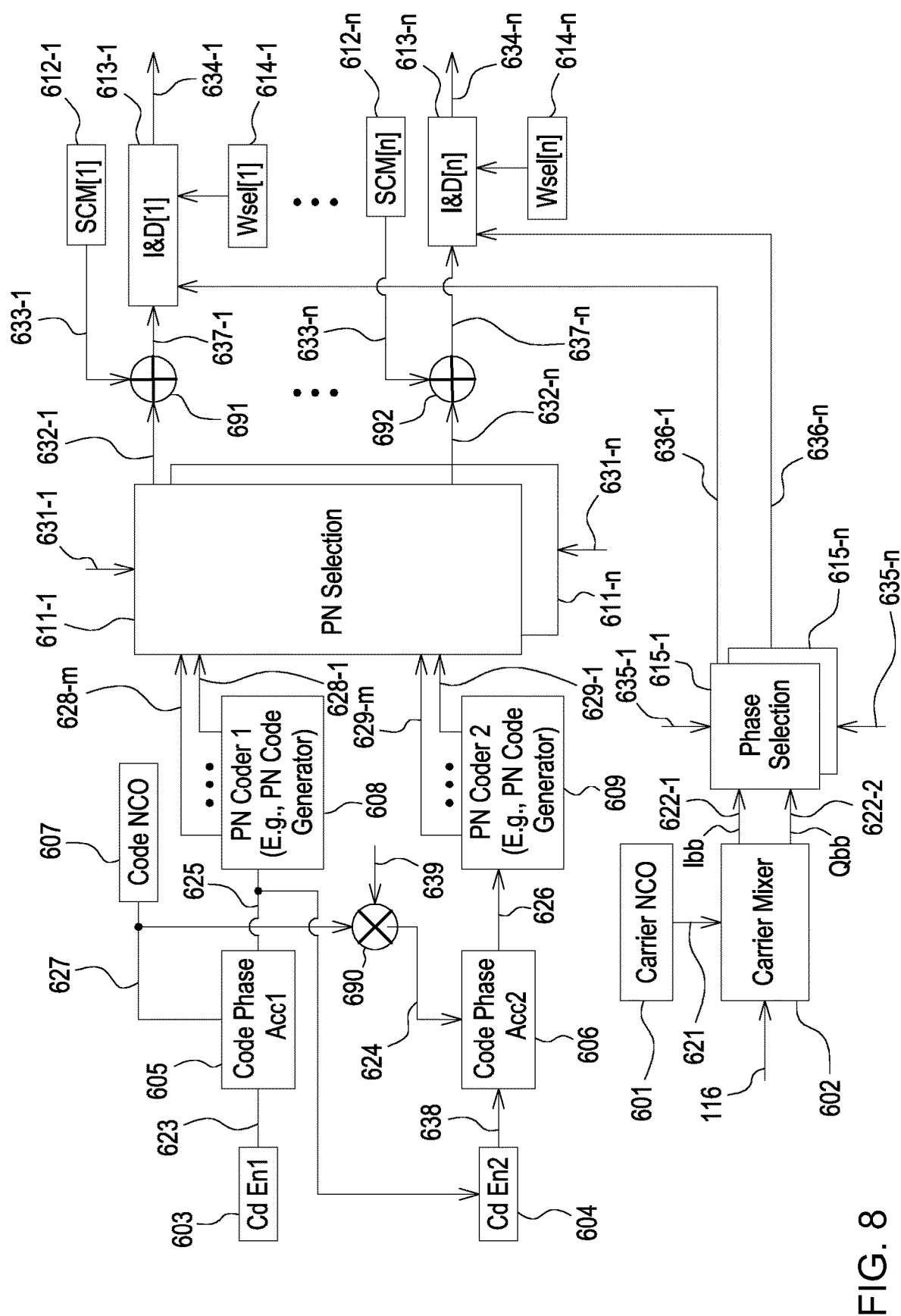
FIG. 8 is a block diagram of one embodiment of a band selection multiplexer for complex channel of the code phase tracking module and carrier phase tracking module.

In FIG. 8, the modernized signal comprises at least two components on each transmission frequency. Combining those components together can improve the tracking performance by approximately 3 decibels (dB). Compared with the aggregated tracking through combining the multiple channels in software, the complex channel architecture saves the software efforts of channel grouping management, the phase synchronization between channels, and handover synchronization between channels.

FIG. 8 illustrates one embodiment of a block diagram of implementation of a complex channel and associated selection multiplexer 120 and/or GNSS channel processing module 121 which supports tracking of a dual PN sequence transmitted on a single frequency. For example, a complex channel (e.g., L1C channel on GPS, where L1C is multiplexed with L1C/A for backwards compatibility of L1C/A) may be modulated or encoded with Alternate BOC (Binary Offset Carrier) or Multiplexed Binary Offset Carrier (MBOC) spread signal that is a complex code, where upper and lower lobes about the carrier frequency of the spread spectrum signal can be modulated with different navigation information or messages. Because all of the PN sequences are modulated on a single carrier frequency, each PN sequence requires a single carrier demodulation. The carrier numerically controlled oscillator (NCO) 601 generates the local demodulation signal 621 or reference signal that is applied to the complex carrier mixer 602.

In an alternate embodiment, the complex channel of FIG. 8 may comprise an aggregate channel or channel combination/permutation of any of the following: L1C/A, L1C, L1P, L2P signals (e.g., for GPS, as authorized under applicable law and regulations), and equivalent signals or counterpart compatible signals for international GNSS constellations (e.g., compatible Galileo, GLONASS, Quasi-Zenith, and BeiDou satellite signals), where different carrier frequencies can potentially be supported by multiple carrier NCOs 601, carrier mixers 602 and phase selection modules (615-1 . . . 615-n).

In FIG. 8, the complex carrier mixer 602 combines each received GNSS satellite signal (116) with the local oscillator reference signal 621 to generate the in-phase (I-component) baseband signal 622-1 and the quadrature-phase (Q-component) baseband signal 622-2 for each corresponding carrier of the received GNSS satellite signal (e.g., for one or more successive sampling intervals or measurement times, such as an epoch of a GPS or GNSS system). The first phase selection signal 635-1 is inputted into the first phase selection multiplexer 615-1. The first phase selection signal 635-1 controls the first phase selection multiplexer (MUX) 615-1 to select either the in-phase (I-component) baseband signal 622-1 or quadrature-phase (Q-component) baseband signal 622-2 (or alternately a pair of I-component and Q-components, IQ components), for the first PN accumulation in the first integration and dump module 613-1 for later discrimination or demodulation. Similarly, the nth phase selection signal 635-n controls the nth phase selection MUX 615-n either the in-phase baseband signal 622-1 or the quadrature-phase baseband signal 622-2 (or alternately a pair of I-component) and for the nth PN accumulation in the nth integration and dump module 613-n for later discrimination or demodulation, were n equals any positive integer greater than or equal to two in a series n to N. Although the I-component and Q-components of signals (e.g., 622-1, 622-2) are referenced with respect to the baseband signal, in alternate configurations the I-component and Q-component may refer to a demodulated I-component and demodulated Q-component.

To support dual PN demodulation (e.g., of L1C signal or an alternate BOC signal), the channel comprises two code demodulation paths. The first code enable unit 603 provides the first code enable signal 623 (e.g., first clock signal) to drive the first code phase accumulator 605. At each code enable signal 623 (e.g., first clock signal) the first code rate signal 627, generated by the code NCO 607, is accumulated by the first accumulator 605 (e.g., first code phase accumulator). If the first accumulator detects an overflow, the first accumulator 605 generates a first code advance signal 625. The first code advance signal 625 moves the PN coder 608 (e.g., first PN code generator) from the current state (e.g., current chip) to the next state (e.g., next chip) to generate the first PN sequence (e.g., which can be unique to each GPS satellite or channel on such GPS satellite).

The chip refers the unit of clock cycle in the GPS receiver that uses spread spectrum modulation, where the chipping rate of the code or PN sequence on each GNSS channel is generally known or published. If or when the received PN sequence is aligned with a replica of the PN code sequence, the code phase; hence, the associated pseudo-range between the receiver and corresponding satellite that transmitted the received PN sequence, can be precisely measured to about one chip resolution.

Because all the PN sequences on a given satellite are coherent (e.g., substantially coherent), and the frequency-dependent and frequency-independent channel perturbation is the identical for all the PN signal on the same frequency (e.g., same carrier frequency or same power spectral density function with encoded sideband components), the second code path is associated with the first code path to reflect such coherency. The first code advance signal 625 also drives the second code enable module 604 to generate the second code enable signal 638 (e.g., second clock signal), which further drives the second code phase accumulator 606.

A multiplier 690 scales the first code rate signal 627 (from the code NCO) by a multiple signal 639 to generate the second code rate signal 624. For some frequencies, the two PN code rates differ by a multiple of 1/10, for example, the combination of GPS L2CM versus GPS L2CL, the combination of GPS L1-C/A versus GPS L1-P as complex channel for the system FIG. 8, or the combination of GLONASS L1-C/A versus GLONASS L1-P for the complex channel of FIG. 8, or the like. Because the second code rate 624 is a multiple of or derivative of the first code rate 627, they can be perfectly synchronized (e.g., or substantially synchronized within a margin of trivial error or clock error approaching one chip resolution). The second code accumulator 606 adds the second code rate 624 at every other or every second clock signal 638. The resultant second code advance signal 626 drives the second PN coder 609 (e.g., second code generator) to generate the second PN sequence (e.g., 629-1) through a mth PN sequence (e.g., 629-$m$).

The first coder 608 generates the first set of the PN sequences with different delays, such as generating the signal 628-1 to the signal 628-$m$, where m is the mth signal in the first set of PN sequences. The second coder 609 generates the second set of the PN sequences with different delays, such as the generation of the signal 629-1 to the signal 629-$m$. The different delays may be structured as early, prompt and late delays for use (e.g., dual-use) in the system of FIG. 8 and a correlation process, for example.

Each complex channel supports n accumulators, where n is a positive integer. The first PN selection unit 611-1 may comprise a multiplexor, for example. The first PN selection unit 611-1 selects or picks one PN sequence from either the first set of PN sequences 628-1 to 628-$m$, or from the second set of PN sequences 629-1 to 629-$m$ based on the first selection signal 631-1 through the nth selection signal 631-$n$, which may be based on feedback from detection of a correlation peak and/or discriminator/envelope detector output. In one possible example, the first PN selection unit 611-1 outputs the first selected PN sequence 632-1, which the summer 691 (e.g., adder) combines or sums with the first overlay code (signal) 633-1, provided by the first code unit 612-1 (e.g., SCM[1]), to generate the first local code signal 637-1.

The first-integration-and-dump module 613-1 receives the first carrier baseband signal 636-1 (e.g., first carrier demodulated signal), the first local code signal 637-1, and the first window-size selection signal 614-1 (e.g., Wsel[1]). The first-integration-and-dump module 613-1 is configured to generate the first in-phase (e.g., I component) and quadrature-phase accumulation signal (Q-component) 634-1 of the P-code signal (e.g., P-code phase) based on the first local code signal 637-1 based on the first carrier baseband signal 636-1 (e.g., first carrier demodulated signal), the first local code signal 637-1, and the first window-size selection signal 614-1 (e.g., Wsel[1]). In one illustrative configuration, the first-integration-and-dump module 613-1 stores and makes available the first in-phase (e.g., I component) and quadrature-phase accumulation signal (Q-component) 634-1 of the P-code signal (e.g., P-code phase) for later application to a discriminator, envelope detector, or dot product evaluation of correlated signal amplitude or power spectral density to generate an error signal for code phase tracking and/or code NCO adjustment. In some configurations, data overlayed on the GNSS signal may result from encoding of the GNSS carrier signal with data, such as navigation-related data, encryption data, P(Y) codes and/or W-codes.

Similarly, the nth PN selection unit 611-$n$ may comprise a multiplexor, for example. The nth PN section unit selects or picks one PN sequence from either the first set of PN sequences 628-1 to 628-$m$, or from the second set of PN sequences 629-1 to 629-$m$, based on the nth selection signal 631-$n$. In one possible example, the nth PN selection unit 611-$n$ outputs the nth selected PN sequence 632-$n$, which the summer 692 (e.g., adder) combines or sums with the nth overlay code (signal) 633-$n$ provided by the nth second code unit 612-$n$ (e.g., SCM(n)) to generate the nth local code signal 637-$n$.

The nth-integration-and-dump module 613-$n$ receives the nth carrier baseband signal 636-$n$ (e.g., nth carrier demodulated signal), the nth local code signal 637-$n$, and the nth W-code selection signal 614-$n$ (e.g., Wsel[n]). The nth-integration-and-dump module 613-$n$ is configured to generate the first in-phase (e.g., I component) and quadrature-phase accumulation signal (Q-component) 634-$n$ of the P-code signal (e.g., P-code phase) based on the nth local code signal 637-$n$ based on the nth carrier baseband signal 636-$n$ (e.g., nth carrier demodulated signal), the nth local code signal 637-$n$, and the nth window-size selection signal 614-$n$ (e.g., Wsel[n]). In one illustrative configuration, the nth-integration-and-dump module 613-$n$ stores and makes available the nth in-phase (e.g., I component) and quadrature-phase accumulation signal (Q-component) 634-$n$ of the P-code signal (e.g., P-code phase) for later application to a discriminator, envelope detector, or dot product evaluation of correlated signal amplitude or power spectral density to generate an error signal for code phase tracking and/or code NCO adjustment. In some configurations, data overlayed on the GNSS signal may result from encoding of the GNSS carrier signal with data, such as navigation-related data, encryption data, P(Y) codes and/or W-codes.

Figure 9A:
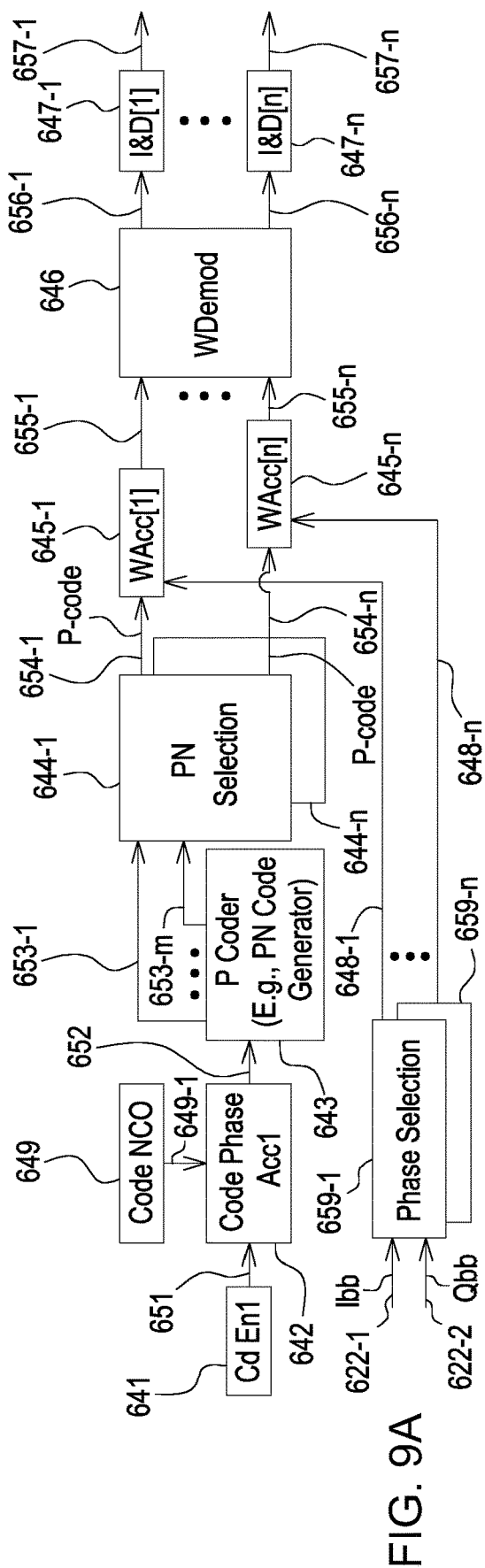
FIG. 9A is a block diagram of one embodiment of a system for code phase tracking module for a first super channel or first set of channels (e.g., L1P).
Figure 9B:
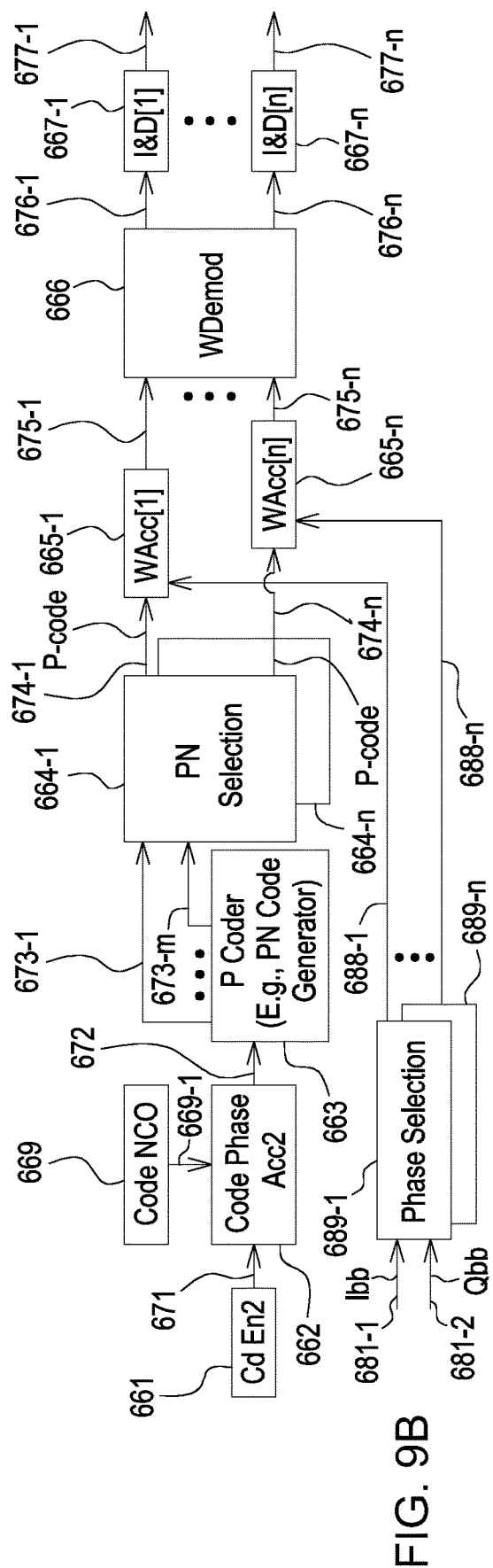
FIG. 9B is a block diagram of one embodiment of a system for code phase tracking module for a second super channel or second set of channels (e.g., L2P), alone or in conjunction with the system of FIG. 9A.

FIG. 9A and FIG. 9B collectively illustrates the GNSS channel processing module 121, such as the super-channel structure designed to aggregate GPS encrypted signal processing with the civilian signal processing. The GPS modernization adds the L1C signal which synchronizes with the legacy L1-C/A and L1P signal on the L1 frequency; adds the L2C signal which synchronizes with the legacy L2P signal on the L2 frequency.

The new L1C signal is designed for interoperability with the Galileo GNSS system and is also backward compatible with the current civil signal on L1 GPS. L1C signal will be transmitted at a higher power level and include some advanced design features associated with Galileo Binary Offset Carrier (BOC) modulation for enhanced performance.

The L2C signal is formed by multiplexing a first PN code (e.g., civil moderate code) and a second PN code (civil long code) and modulating the carrier with (e.g., by bipolar phase shift keying (BPSK)), where the civil moderate code is modulated by a navigation message that can be demodulated by civilian receivers in addition to the L1C/A navigation messages. The L2C civil long code signal can be used as a pilot, but is not representative of pilot PN sequence or pilot PRN sequence. The L2C signal supports dual-frequency civilian GPS receivers to correct the ionospheric group delay and to provide potentially faster signal acquisition. Further, the L2C signal provides enhanced reliability or greater operating range (e.g., from terrain attenuation, vegetation shading or multipath) because L2C can provide better cross-correlation suppression (e.g., compared to L1C/A) and can avoid nonlinear processing loss (e.g., compared to GPS L2P).

In FIG. 9A, because of the coherency (e.g., substantial synchronization of carrier phase) between L1P (e.g., the pseudo-noise (PN) encoded L1P(Y) signal) and L1-C/A and L1C for the same satellite at the same epoch or measurement interval of GNSS system time, the carrier baseband signal 622-1 and 622-2 (e.g. carrier demodulated signal) from the first L1C complex channel (e.g., associated with the system of FIG. 8) are fed into the first L1P channel. As illustrated the carrier baseband signal (622-1, 622-2) has an I-component and Q-component.

The first phase selection module 659-1 selects the GNSS received signal aligning with the L1P phase (plane) (as opposed to L1C or L1-C/A phase plane of the received GNSS signals for a given satellite) to generate the signal 648-1 for the first code demodulation processing; the nth phase selection 659-n selects the signal aligning with the L1P phase (plane) to generate the signal 648-n for the nth code demodulation processing. In one embodiment, each first phase selection module, 659-1 through 659-n, comprises a multiplexer that is controlled by a selection signal from a channel baseband tracking loop module (e.g., code tracking loop, carrier tracking loop). Further, in FIG. 9A the channel baseband tracking loop(s) within the GNSS receiver (e.g., channel baseband tracking module 711 of FIG. 10A) comprise: (a1) for each aggregate or multi-channel, carrier phase tracking loop, a (shared) carrier NCO (e.g., 771) for the L1-C/A channel or the L1C channel of a given satellite that provides (or that is used to derive) a local carrier frequency signal, or IF frequency signal, that is aligned with the L1P carrier phase of a received GNSS signal of the given satellite; (b1) for each aggregate or multi-channel carrier tracking loop for the L1-C/A or L1C channel of a given satellite with secondary correlators (e.g., 724) that accept (samples of) carrier local oscillator signal and (samples of) the received, evaluated GNSS signal of the same satellite to be aligned to provide (candidate) correlations; (c1) for each aggregate or multi-channel carrier phase tracking loop, a (shared) carrier loop discriminator (e.g., 799) for the L1-C/A channel or L1C channel of a given satellite, alone to together with a carrier loop filter (e.g., Kalman filter), for evaluating (e.g., searching for) L1-C/A or L1C carrier phase (plane alignment), which is also applicable to the L1P carrier phase of a given satellite; (d) for each aggregate or multi-channel carrier phase tracking loops, the (shared) carrier loop discriminator configured to provide a carrier error signal for each (shared) carrier NCO signal to maintain such alignment (e.g., to select a phase-aligned L1-C/A or L1C channel from the candidates, or to select phase aligned L2C complex channel from the candidates). Therefore, no direct carrier feedback signal for L1P channel is required as part of the universal, generic or general carrier feedback signal 712 (e.g., aggregate or super local carrier signal) of FIG. 10A, which instead uses universal, generic or general carrier feedback (e.g., by carrier channel proxies) by representative L1-C/A channel or representative L1C channel.

The P code is available to the public; the P code and the W-code are applied to an exclusive OR digital logic (e.g., logic gate or digital signal processing) to cryptographically generate a sequence or word that produces or yields the Y-code. For example, a GPS GNSS transmits the Y-code if the anti-spoofing module of the satellite is set to the "on" state by the U.S. government, or its agencies. The encrypted signal is generally referred to as the P(Y) code.

Because the L1P channel only processes or encodes one PN sequence at any given time consistent with the above coherency with the L1C signal, the first code enable unit 641 is configured to generate a first code enable signal 651 (e.g., first clock signal), or use a common code enable unit for the systems of FIG. 8, FIG. 9A and FIG. 9B, to synchronize with the code enable signal 623 (e.g., in FIG. 8) from the L1-C/A/L1-C channel. The first code enable unit 641 is configured to generate the first code enable signal 651 (e.g., clock signal) to drive the first code phase accumulator 642.

A code numerically controlled oscillator (code NCO) 649 is configured to generate a first code rate signal 649-1, such as a clocked, discrete-time representation of waveform (e.g., generally sinusoidal waveform or square-wave). In some embodiments, each code NCO (e.g., 774) may be dedicated to or configured for a corresponding encoded GNSS channel (e.g., L1-C/A, L1C, L1P (as authorized under applicable law and regulations), L2C, L2P (as authorized under applicable law and regulations), L5 for GPS) on an individual, channel-by-channel basis (for each satellite) based on various publicly available encoding parameters (e.g., code length in bits, data rate, code type (such as Gold, or Weil codes), code frequency or spreading code rate in MHz or modulation type (such as bipolar phase shift keying, BPSK, or binary offset carrier, BOC, and its or their variants) of the PN code sequence. In general, the first code rate signal 649-1, which (in certain embodiments) can comprise a derivative signal from the code rate signal 627 (of FIG. 8, such as from a common code NCO), is used by the first phase accumulator 642 to generate the first code advance signal 652 that drives the first P coder 643 (e.g., first code generator) to generate the PN sequences.

The first P-coder 643 (e.g., first code generator) is configured to generate multiple PN sequences, such as 653-1 to 653-m, where m is the maximum number of possible PN sequences, which are offset in time or phase to provide different code phases (e.g., early, prompt, and late times), are fed into the multiple PN selection units, such as 644-1 to 664-n, where n is the maximum number (e.g., positive integer) of code phases or where n equals m. In one example, the first PN selection 644-1 comprise a multiplexor that selects the prompt or on-time PN sequence 653-3, which may represent 653-nOT (nOT-3 in this implementation or 653-3) or another PN sequence within 653-1 to 653-m, to generate the first code demodulation signal 654-1 through the nth-code demodulation signal 654-n.

Because of the encryption modulation on the L1P (e.g., L1P(Y)) signal, the first W-code accumulator 645-1 (e.g., WAcc[1]) combines the first code demodulation signal 654-1 and the first carrier (demodulated) signal 648-1 or first baseband signal from the respective phase selection module 659-1 to integrate over the encryption chip period to generate the first W-code accumulation signal 655-1. The unknown W-code may be applied to encrypt the unknown P(Y) code at a known frequency (e.g., 500 Kilohertz (KHz)), which is less than the PN-code chip rate and which provides the above corresponding encryption chip period (e.g., inversely proportional to a fixed frequency, to the extent applicable) for integration. The W-code demodulation unit 646 squares or processes the signal 655-1 to wipe off (e.g., blindly wipe off) or remove the unknown W code modulation and to create the first W-code removed signal 656-1. Therefore, the L1P, signal I and Q (vector) components of code phase and carrier phase, can be demodulated or decoded from the modulated L1P signal with the carrier and removed, unknown P(Y) codes (e.g., for purposes code tracking and carrier tracking loops) even though the W-code is not known by the public or commercial end users.

In one embodiment, the first integration and dump module 647-1 further accumulates the W-code removed signal 656-1 to generate the multi-millisecond integration signal 657-1. For example, the first integration-and-dump module 647-1 (e.g., labeled I&D[1] in FIG. 9A) holds, stores and integrates of the first W-code removed signal 656-1, where the time integration sums changes in the inputted signal to yield a time-smoothed digital output signal. As previously noted, the decoded output (e.g., 657-1 through 657-$n$) of each integration-and-dump module (647-1 through 647-$n$) in FIG. 9A, the demodulation of the encoded PN signal provides one or more of the following outputs: (1) a multi-millisecond integration signal (657-1 through 657-$n$, which is used for further digital processing, code-loop discrimination, and/or signal acquisition search for GNSS channels, (2) L1P-code I-components and Q-components of code phase and carrier phase for code loop tracking, code-loop discrimination and/or potential decoding, and (3) L2P I-components and Q-components of code phase and carrier phase for code loop tracking, code-loop-discrimination and/or potential decoding. Further, the digital output signals or multi-millisecond integration signals (657-1 . . . 657-$n$) may support, augment or aid further processing, envelope detection for code loop error estimation, and/or demodulation to determine PN ranging codes and navigation data (e.g., from demodulated course acquisition (C/A) code, L2C code and (if not encrypted with W-code to form P(Y) code or subject to restricted access) possibly precise P-code), such as GPS date, GNSS/GPS time, satellite identifier and satellite status; ephemeris or precise orbital data for a transmitting satellite; and almanac or low resolution orbital data for other (non-transmitting satellites) within the GPS constellation of satellites.

In FIG. 9A, the second to the nth code path is separate from, but similar to the first code path. In general, the nth PN selection module, 644-1 to 644-$n$, (e.g., first multiplexer through an nth multiplexer) selects a PN sequence, from the set of signals 653-1 to 653-$m$, to generate the first code through nth code demodulation signal (654-1 . . . 654-$n$), where P-code (e.g., prompt P-code) could be selected based on correlation process (e.g., code correlator and code loop discriminator/envelope detector) as input to, or an integrated system of, the PN selection module (644-1 . . . 644-$n$).

For example, for the nth code demodulation signal 654-$n$, the nth W-code accumulator 645-$n$ (e.g., labeled WAcc[n] in FIG. 9A) combines the selected nth code demodulation signal 654-$n$ and the nth carrier demodulated signal 648-$n$ (or baseband signal with I and Q components) to integrate over the encryption chip period to generate the nth W-code accumulation signal 655-$n$. Further, in one illustrative configuration, the W-code demodulation unit 646 multiplies the signal 655-$n$ with the signal 655-1 (as a reference, or alternately squares the signal 655-$n$) to wipe off the W-code modulation thus creating the nth W-code removed signal 656-$n$.

In one embodiment, the nth integration and dump module 647-$n$ (e.g., labeled I&D[n] in FIG. 9A) further accumulates the W-code removed signal 656-$n$ to generate the multi-millisecond integration signal 657-$n$, which represents a decoded PN signal (e.g., navigation-related data on the GNSS signal, such as L1P signal or L1P I and Q components for code phase tracking). At the decoded output (e.g., 657-1 through 657-$n$) of each integration-and-dump module (647-2 through 647-$n$) in FIG. 9A, the demodulation of the encoded PN signal provides one or more of the following outputs: (1) a multi-millisecond integration signal (657-2 through 657-$n$, which is used for further digital processing, code-loop discrimination, and/or signal acquisition search for GNSS channels, (2) L1P-code I-components and Q-components of code phase and carrier phase for code loop tracking, code-loop discrimination and/or potential decoding, and (3) L2P I-components and Q-components of code phase and carrier phase for code loop tracking, code-loop-discrimination and/or potential decoding.

The processing of the L2 signals in FIG. 9B is similar to the processing of the L1 signals in FIG. 9A, except the second W-code demodulation unit 666 can be configured with different software instructions or logic. Because of the coherency (e.g., synchronization of the phase of carrier signals) between L2P and L2C, at the phase section module (689-1 through 689-$n$) the carrier demodulated signals 681-1 and 681-2 or baseband signals (or in an alternate embodiment 681-1 through 681-$n$, inclusive) from the first L2C complex channel are fed into the phase selection module 689-1 for the first L2P channel. The first phase selection module 689-1 selects the signal aligning with the L2P phase (plane or reference) to generate the signal 688-1 for the first code demodulation processing. The second phase selection module 689-2 selects the signal aligning with the L2P phase (plane or reference frame) to generate the signal 688-2 for the first code demodulation processing of the corresponding L2) channel. Further, in FIG. 9B the channel baseband tracking loop(s) within the GNSS receiver (e.g., 711 of FIG. 10A) comprise: (a2) for aggregate or multi-channel carrier phase tracking loops, a (shared) carrier NCO (e.g., 771) for the L2C complex channel of a given satellite that provides (or that is used to derive) a local carrier frequency signal, or IF frequency signal, that is aligned with the L2P carrier phase of a received GNSS signal of the given satellite; (b2) for each aggregate or multi-channel carrier tracking loop, the carrier tracking loop comprises an aggregate or multi-channel carrier tracking loop for the complex L2C channel of a given satellite with the secondary correlators (e.g., 724) that accept samples of the carrier local oscillator signal and samples of the received, evaluated GNSS signal of the same satellite to be aligned to provide candidate correlations; (c2) for each aggregate or multi-channel carrier phase tracking loop, a (shared) carrier loop discriminator (e.g., 799) for the L2C complex channel of a given satellite, alone to together with a carrier loop filter (e.g., Kalman filter), for evaluating (e.g., searching for) L2C carrier phase (plane alignment), which is also applicable to the L2P carrier phase of a given satellite; (d) for each aggregate or multichannel carrier phase tracking loop, the (shared) carrier loop discriminator configured to provide a carrier error signal for each (shared) carrier NCO signal to maintain such alignment (e.g., to select a phase-aligned L1-C/A or L1C channel from the candidates, or to select phase aligned L2C complex channel from the candidates). Therefore, no direct carrier feedback signal for L1P or L2P channels is required as part of the universal, generic or general carrier feedback signal 712 (e.g., aggregate or super local carrier signal) of FIG. 10A, which instead uses universal, generic or general carrier feedback (e.g., by carrier channel proxies) by representative L1-C/A channel or representative L1C channel and the representative L2C channel.

Because L2P channel only processes one PN sequence at a given time, the code enable signal 661 (e.g., clock signal) is synchronized with the code enable signal 623 (in FIG. 8) from the L2C channel to generate the second clock signal 671 to drive the second code phase accumulator 662. In some embodiments, each code NCO (e.g., 774) may be dedicated to or configured for a corresponding encoded GNSS channel (e.g., L1-C/A, L1C, L1P (as authorized under applicable law and regulations), L2C, L2P (as authorized under applicable law and regulations), L5 for GPS) on an individual, channel-by-channel basis (for each satellite) based on various publicly available encoding parameters (e.g., code length in bits, data rate, code type (such as Gold, or Weil codes), code frequency or spreading code rate in MHz or modulation type (such as bipolar phase shift keying, BPSK, or binary offset carrier, BOC, and its or their variants) of the PN code sequence. In general, the code numerically controlled oscillator (NCO) 699 provides a second code rate signal 669-1, which in certain embodiments is derived from (or a derivative of) the code rate signal 627 (of FIG. 8) of L2C channel.

The second code rate signal 669-1 is used by the second phase accumulator 662 to generate the second code advance signal 672 which drives the second P coder 663 (e.g., second code generator) to generate the second PN sequence(s) (673-1 through 673-$m$). The multiple PN sequences, such as 673-1 to 673-$m$, inclusive, which are offset in phase (e.g., and in time, such as early, prompt, and late times) with different code phases, are fed into the corresponding multiple PN selection units (e.g., multiplexers), such as 664-1 to 664-$n$, inclusive, where m is the maximum number of PN sequences and n is the respective maximum number of selection units. In one example, the second PN selection model (646-1 through 664-$n$) selects the prompt or on-time PN sequence 673-1 through 673-$m$, such as 673-nOT (nOT=3 in this implementation or 673-3), to generate the second code (demodulation signal) (674-1 through 674-$m$). For instance, the second code (demodulation) signal 674-1 through second code (demodulation) signal 674-$n$ represent P-codes with corresponding I-components and Q-components, where prompt P-code could be selected based on correlation process (e.g., code correlator and code loop discriminator/envelope detector) as input to, or an integrated system of, the PN selection module (664-1).

In FIG. 9B, because of the encryption modulation on the L2P signal, the second W-code accumulator 665-1 processes or combines the second code demodulation signal 674-1 with the second carrier demodulated signal 688-1 to integrate over the encryption chip period to generate the second W-code accumulation signal 675-1. The W-code demodulation module 666 processes or combines the second W-code accumulation signal 675-1 (or first W-code accumulation signal 645-1 of FIG. 9A from L1P channel) with the second W-code accumulation signal 675-1 (of FIG. 9B) of L2P channel to create the second W-code removed signal 676-1.

The second integration-and-dump unit 667-1 (e.g., labeled I&D [1] in FIG. 9B) further accumulates the second W-code removed signal 676-1 to generate the multi-millisecond integration signal 677-1. For example, the first integration-and-dump module 667-1 holds, stores and integrates of the first W-code removed signal 676-1, where the time integration sums changes in the inputted signal to yield a time-smoothed digital output signal. At the decoded output (e.g., 677-1 through 677-$n$), each second integration and dump module (667-1 through 667-$n$) in FIG. 9B stores and makes available the first in-phase (e.g., I component) and quadrature-phase accumulation signal (Q-component) (677-1 through 677-$n$) of the P-code signal (e.g., P-code phase) for later application to a discriminator, envelope detector, or dot product evaluation of correlated signal amplitude or power spectral density to generate an error signal for code phase tracking and/or code NCO adjustment.

The nth PN selection module 664-$n$ selects a PN sequence, from the set of signals (673-1 to 673-$m$, inclusive) to generate the corresponding nth code demodulation signal 674-$n$. For example, if n equals 2, the second PN selection module 664-2 selects a PN sequence, from the set of signals (673-2) to generate the corresponding nth code demodulation signal 674-2.

The nth W-code accumulator 665-$n$ combines the nth code demodulation signal 674-$n$ and the nth carrier demodulated signal 688-$n$ to integrate over the encryption chip period to generate the nth W-code accumulation signal 675-$n$. For example, the second W-code accumulator 665-2 combines the second W-code demodulation signal 674-2 and the second carrier demodulated signal 688-2 to integrate over the encryption chip period to generate the nth W-code accumulation signal 675-2.

In one embodiment, the second W-code demodulation module 666 processes or combines the first W-code accumulation signal 675-1 (of FIG. 9A) from L1P channel with the nth W-code accumulation signal 675-$n$ of L2P channel to create or form the nth W-code removed signal 676-$n$. FIG. 9B is a block diagram of one embodiment of a system for code phase tracking module for a second super channel or second set of channels (e.g., L2P), alone or in conjunction with the system and data available via shared computational resources, such as shared memory, shared data processing (hardware) and data communications (e.g., via operating system, system calls, pipes, sockets or otherwise) between software modules or blocks of FIG. 9A and FIG. 9B.

In alternate embodiments, the second W-code demodulation module 666 may process or combine W-code accumulated signals from the L1P channel or the L2P channel to create a corresponding W-code removed signal (676-1 through 676-$n$, inclusive) in accordance with various techniques that may be applied cumulatively or separately. Under a first technique, the second W-code demodulation module 666 may process or combine the nth W-code accumulation signal 655-$n$ or another W-code accumulation signal (e.g., 655-1 through 655-$n$, inclusive) from L1P channel (of FIG. 9A) with the first W-code accumulation signal 675-1 of L2P channel (of FIG. 9B) to create the first W-code removed signal 676-1. Under a second technique, the W-code demodulation module 666 may process or combine the nth W-code accumulation signal 655-$n$ or another W-code accumulation signal (e.g., 655-1 through 655-$n$, inclusive) from L1P channel (of FIG. 9A) with the nth W-code accumulation signal 675-$n$ of L2P channel (of FIG. 9B) to create the nth W-code removed signal 676-$n$. Under a third technique, the W-code demodulation unit 666 combines or processes the first W-code accumulation signal 675-1 from L2P channel or another W-code accumulation signal (e.g., 675-1 through 655-$n$, inclusive) with the nth W-code accumulation signal 675-*n* of L2P channel to remove the W-code to create the nth W-code removed signal 676-*n*.

The nth integration and dump unit 667-*n* further accumulates the W-code removed signal 676-*n* to generate the multi-millisecond integration signal 677-*n*. As previously noted, the decoded output (e.g., 677-1 through 677-*n*) of each integration-and-dump module (667-1 through 667-*n*) in FIG. 9B, the demodulation of the encoded PN signal provides one or more of the following outputs: (1) a multi-millisecond integration signal (677-1 through 677-*n*, which is used for further digital processing, code-loop discrimination, and/or signal acquisition search for GNSS channels, (2) L1P-code I-components and Q-components for code loop tracking, code-loop discrimination and/or potential decoding, and (3) L2P I-components and Q-components for code loop tracking, code-loop-discrimination and/or potential decoding. Further, the digital output signals or multi-millisecond integration signals (677-1 . . . 677-*n*) may support, augment or aid further processing, envelope detection for code loop error estimation, and/or demodulation to determine PN ranging codes and navigation data (e.g., from demodulated course acquisition (C/A) code, L2C code and (if not encrypted with W-code to form P(Y) code or subject to restricted access) possibly precise P-code), such as GPS date, GNSS/GPS time, satellite identifier and satellite status; ephemeris or precise orbital data for a transmitting satellite; and almanac or low resolution orbital data for other (non-transmitting satellites) within the GPS constellation of satellites.

Figure 10A:
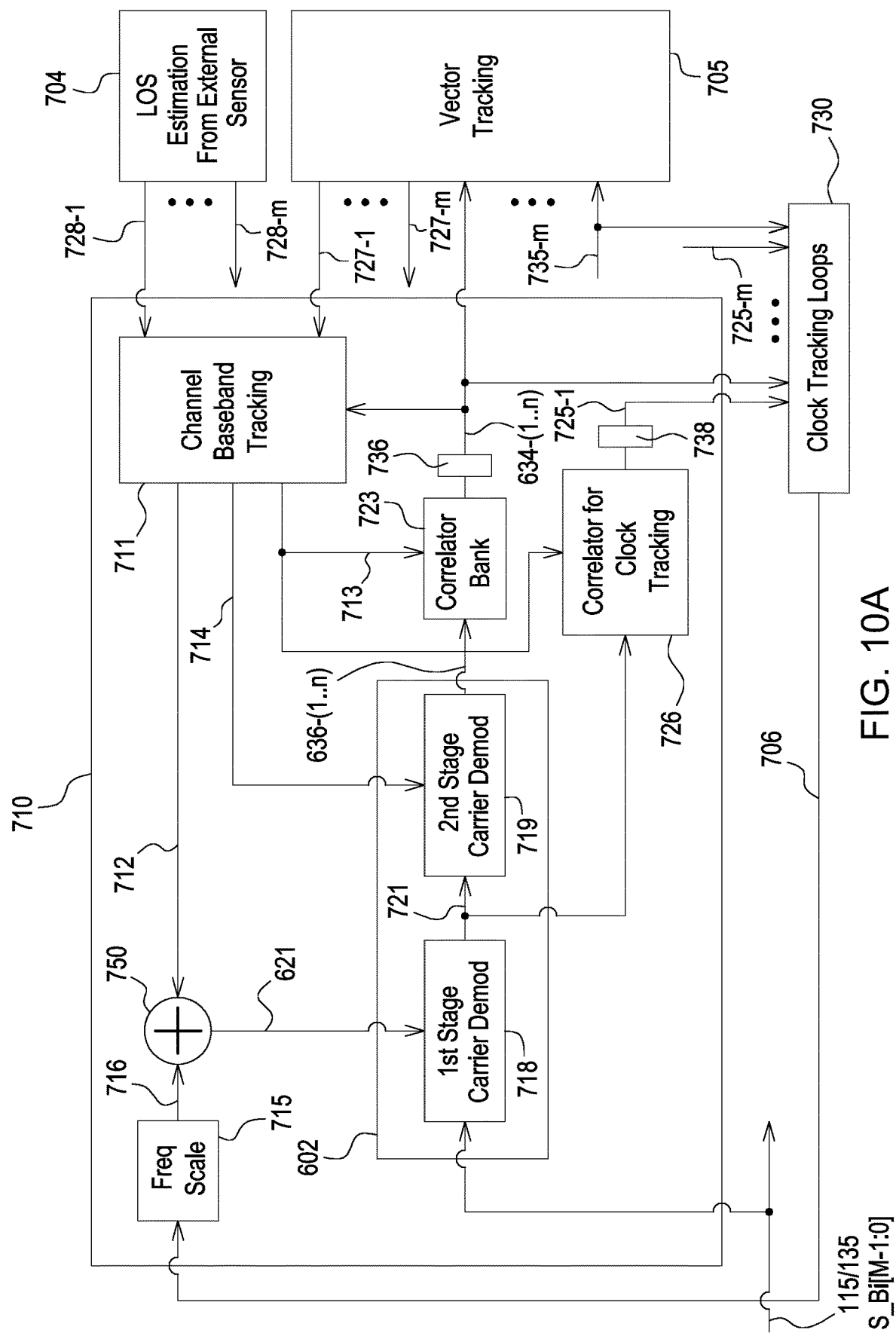
FIG. 10A is a block diagram of one embodiment of a system for integrated vector tracking and multi-satellite tracking.
Figure 10B:
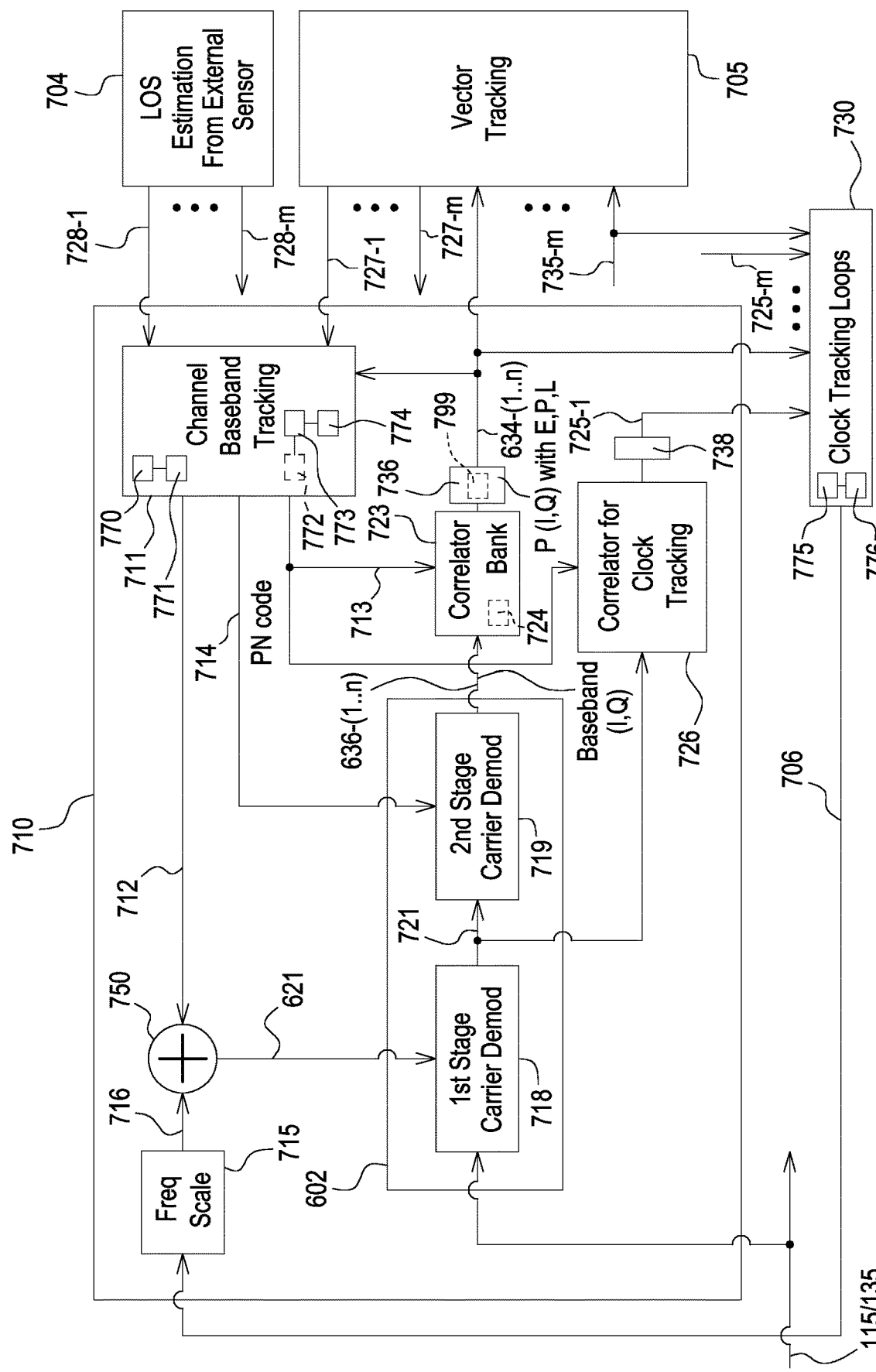
FIG. 10B is a block diagram of one embodiment of a system for integrated vector tracking and multi-satellite tracking in greater detail than FIG. 10A.

FIG. 10A and FIG. 10B, individually and collectively, illustrate a block diagram of a system for tracking of carrier phase, code phase, clock bias and GNSS signal acquisition with the line-of-sight (LOS) data or LOS carrier-aiding data between or among the multiple satellites, where the LOS data estimation is derived from an external sensor (e.g., inertial measurement unit). LOS data may comprise one of more of the following data: measured or estimated pseudorange between a GNSS receiver and a corresponding satellite; measured or estimated pseudoranges between a GNSS receiver and each available satellite within a GNSS constellation; Doppler-effect smoothed pseudoranges, clock frequency estimation of GNSS receiver clock based on Doppler shift, estimated position, attitude, velocity, acceleration, motion data and GNSS time for a corresponding GNSS (mobile, rover or reference) receiver.

FIG. 10B illustrates the system of FIG. 10A in greater detail that comprises channel numerically controlled oscillators (NCOs), such as a dedicated, separate carrier NCO 771, a code NCO 774 and a clock NCO 776 for each channel, set of channels or aggregate set of channels.

In one configuration, each NCO (771, 774, 776) may be used to form a phase-locked-loop controlled oscillator, which can receive phase alignment feedback from one or more of the following: correlators (723, 726), alone, or together with, post-correlation processing of signal strength evaluators; LOS estimation module 704; vector tracking module 705; or receiver data processing system. The system of FIG. 10A and FIG. 10B is configured to address or ameliorate potential opposite drifting problem between the clock NCO 776 and channel NCO (e.g., set of one or more carrier NCOs 771 and set of one or more code NCOs 774) via the tracking error component 621 (e.g., and the carrier demodulator 602). Like reference numbers in FIG. 8 and FIG. 10A indicate like features, elements or processes.

In the carrier tracking loop of the channel baseband tracking module 711, the carrier NCO 771 is coupled to one or more look-up tables 770, such as sine map and cosine map, to create a carrier signal (e.g., 714) for the carrier wipe-off function of the carrier demodulator 602. In one configuration, carrier signals generated by the look-up tables 770 are generally 90 degrees out of phase generally sinusoidal waveforms. Further, the carrier NCO 771 receives a stable clock signal (at a clock frequency or pulse train) from the clock tracking loop(s) 730. In one embodiment, no direct carrier feedback signal for L1P channel or L2P channel is required as part of the universal, general or generic carrier feedback signal 712 of FIG. 10A and FIG. 10B. Instead, the carrier feedback signal 712 (e.g., aggregate or super local carrier signal) uses universal, generic or general carrier feedback (e.g., by carrier channel proxies) by representative L1-C/A channel or representative L1C channel for multiple carriers associated with multiple carrier signals for a corresponding satellite.

In FIG. 10B, in one example, the carrier local oscillator comprises a shared carrier numerically controlled oscillator 771 for the L1-C/A channel or the L1C channel of a given satellite that provides or that is used to derive a local carrier frequency signal, or IF frequency signal, which is aligned with the L1P carrier phase of a received GNSS signal of the given satellite. The carrier tracking loop comprises an aggregate or multi-channel carrier tracking loop for the L1-C/A channel or the L1C channel of a given satellite with optional secondary correlators 724 (indicated as an optional block of dashed lines in correlator 723) that accept samples of the carrier local oscillator signal (771) and samples of the received, evaluated GNSS signal of the same satellite to be aligned to provide candidate correlations. Further, the carrier tracking loop comprises an optional carrier loop discriminator 799 (indicated as optional block of dashed lines in accumulator 736) for the L1-C/A channel or L1C channel of a given satellite, alone to together with a carrier loop filter, for evaluating L1-C/A or L1C carrier phase plane alignment of a given satellite.

Similarly, in another example for FIG. 10B, the carrier local oscillator comprises a shared carrier numerically controlled oscillator 771 for the L2C complex channel of a given satellite that provides, or that is used to derive, a local carrier frequency signal, or IF frequency signal, which is aligned with the L2P carrier phase of a received GNSS signal of the given satellite. The carrier tracking loop comprises an aggregate or multi-channel carrier tracking loop for the complex L2C channel of a given satellite with the secondary correlators 724 (indicated as an optional block of dashed lines in correlator 723) that accept samples of the carrier local oscillator signal and samples of the received, evaluated GNSS signal of the same satellite to be aligned to provide candidate correlations. Further, carrier tracking loop comprises a carrier loop discriminator 799 (indicated as optional block of dashed lines in accumulator 736) for the L2C channel of a given satellite, alone to together with a carrier loop filter, for evaluating L2C carrier phase plane alignment of a given satellite.

The clock signal may be corrected for first clock bias component of a mobile GNSS receiver clock to a respective satellite clock for each satellite, a second bias component of the respective satellite clock to a GNSS clock time for a GNSS constellation, and third bias component of the respective satellite block to a GNSS clock for a different GNSS constellation, among other things.

In the code tracking loop of the channel baseband tracking module 711, the code NCO 774 is coupled to a code generator 773, such as code generator for generating a civilian PN code, an unknown P(Y) code at known data rate, or another PN code based on the inputted local code oscillator signal from the code NCO 774. Each channel has a code NCO 774 to drive a code generator 773. Further, in certain embodiments, the code generator 773 may be associated with one or more shift registers or delay lines (e.g., 772) to generate phase offsets for the generated local code signal. For example, FIG. 8 illustrates a code NCO 607 (e.g., similar to code NCO 774 of FIG. 10B) for a complex GNSS channel. In FIG. 9A, code NCO 649 (e.g., similar to code NCO 774 of FIG. 10B) supports the L1P channel, and the P(Y) code pseudo-range measurements and carrier phase measurements (e.g., L1-L2 differential measurements with blind Y code removal) can be derived, on a codeless or semi-codeless civilian access basis as permitted under applicable law and regulations (e.g., until availability of L5 GPS signals on at least 24 operational satellites, which is currently estimated for 2027), from the L1P channel (FIG. 9A) or L2P channel (FIG. 9B). In FIG. 9B, code NCO 669 (e.g., similar to code NCO 774 of FIG. 10B) supports the L2P channel, and the P(Y) code pseudo-range measurements and carrier phase measurements (e.g., L1-L2 differential measurements with blind Y code removal) can be derived, on a codeless or semi-codeless civilian access basis as permitted under applicable law (e.g., until availability of L5 signals on 24 of more operational satellites, which is currently estimated for 2027), from the L1P channel (FIG. 9A) or L2P channel (FIG. 9B).

In FIG. 10B, the code NCO 774 depends on what type of GNSS channel that FIG. 10B represents (e.g., complex channel, L1P or L2P channel). In one example, the code local oscillator for a respective channel comprises a common code numerically controlled oscillator 774 that provides a derivative signal to another numerically controlled oscillator for the complex L1C channel, such as illustrated in FIG. 9B. For instance, the L1C is multiplexed with L1C/A for backwards compatibility of L1C/A and is modulated or encoded with Alternate BOC (Binary Offset Carrier) or Multiplexed Binary Offset Carrier (MBOC) spread signal that is a complex code.

In the clock tracking loop module 730, the clock NCO 776 drives a waveform look-up table 775 to provide a pulse train, square-wave or other suitable clock signal at a target frequency and target phase based on the second correlators 726 for clock tracking and based on the first set of first correlators 723 for code loop tracking (e.g., code phase loop tracking) and carrier loop tracking (e.g., carrier phase look tracking), which collectively can be referred to as channel baseband tracking.

In some embodiments, an external sensor of FIG. 10A is coupled to the LOS estimation module 704 or integrated into the LOS estimation module 704. For example, the LOS estimation module 704 may comprise one or more of the following devices for providing navigation augmentation data or other data: an inertial measurement unit, an accelerometer, a gyroscope, a skyward-facing or upward-facing imaging device, a monocular camera, a stereo vision camera, a LIDAR system, and previously received or stored satellite almanac and/or satellite ephemeris data (e.g., satellite rising time and setting times for geographic coordinates of a mobile GNSS receiver at particular date and time).

In certain embodiments, a skyward-facing or upward-facing imaging device, a monocular camera, a stereo vision camera, or a LIDAR (Light Detection and Raging) system, a radar (e.g., radio detection and ranging) system provides external data to the LOS estimation module 704. In turn, the LOS estimation module 704 is configured to estimate whether satellite signals from certain satellites (e.g., satellite identifiers based on an almanac of rising and setting times of the corresponding satellites and GNSS time) within the constellation are line-of-sight (LOS) propagation paths between satellite and GNSS receiver, or blocked or materially attenuated by an attenuation threshold with respect to local terrain, ground clutter, obstructions, vegetation (e.g., tree canopy), buildings or other structures.

For one or more epochs or sampling intervals, the LOS data estimation module 704 may do one or more of the following: (a) estimate or determine LOS data, motion-corrected LOS data, or Doppler-corrected LOS data; (b) determine a list of available GNSS satellite channels to be scanned, polled, surveyed or processed for (e.g., aggregate) carrier phase and code phase tracking of the GNSS receiver, such as measurement of pseudorange between the polled or scanned GNSS satellites and the GNSS receiver by eliminating blocked or materially attenuated signals of GNSS satellites that would otherwise be in view or reception range based on observations of a skyward-facing or upward-facing imaging device, a monocular camera, a stereo vision camera, radar system, a LIDAR system; (c) temporarily mask/ignore reception of, or de-weight carrier phase measurements and/or code phase measurements of GNSS satellites that are associated with obstructions that block or severely attenuate LOS GNSS signals traversing sky regions (e.g., semi-spherical zones or arc-bounded regions, such as near the horizon of the Earth or at low elevation angle, such as 20 degrees or less, with respect to the surface of the Earth) estimated by: (1) (previously) received or stored satellite (almanac/ephemeris/navigation) data indicative of excluded/blocked/attenuated satellites at or below a threshold low elevation angle, and/or (e.g., alone, or together with) (2) observed by a skyward-facing or upward-facing imaging device, a monocular camera, a stereo vision camera, radar system, or a LIDAR system that is co-located with the mobile or rover GNSS receiver; (d) temporarily exclude unavailable satellites (e.g., from navigation determinations, position estimates and raw carrier phase measurements and code phase measurements associated with occluded or blocked satellites signals or materially attenuated satellite signals) or de-weight unavailable satellites from navigation solution estimation, such as estimation of position, attitude or motion estimation solutions of the GNSS receiver, the rover/mobile GNSS receiver or reference GNSS receiver, and/or (e) temporarily exclude unavailable satellites from channel baseband processing or de-weight position data or LOS data until the LOS estimation module 704 (or its external sensor) determines that the corresponding satellite with a certain satellite identifier returns to reliable reception of GNSS satellite signal (e.g., of sufficient signal quality, signal strength, or geometric dilution of precision (GDOP), or low bit error rate of encoded data) or LOS for some minimum time period (e.g., hysteresis, transition delay window or transition dwell time).

In another embodiment, the external sensor, which is coupled to or integrated into the LOS estimation module 704, may comprise an inertial measurement unit (IMU) for providing aiding-motion data to the LOS estimation module 704. For example, the aiding-motion data may comprise any of the following: position versus time data, velocity data, and acceleration data associated with a corresponding mobile or rover GNSS receiver. The LOS estimation module 704 can estimate LOS velocity-aiding data or motion-aiding data associated with a corresponding GNSS satellite and respective GNSS rover or mobile receiver. For example, the LOS estimation module 704 may estimate Doppler shift in a pseudorange measurement based on the aiding-motion data from the IMU, or based on the applicable LOS velocity-aiding data to the signal propagation path of the received GNSS signal between a rover GNSS receiver and a corresponding GNSS satellite. Because the satellites orbit and are in constant motion, the Doppler shift may be detectable even if the reference, mobile or rover GNSS receiver is stationary, and the motion of the GNSS receiver, such as via the IMU, or one or more accelerometers or gyroscopes, can be used to estimate Doppler shift from movement of the mobile or rover GNSS receiver relative to any given GNSS satellite within view or reception range.

In an alternate embodiment, the LOS estimation module 704 receives aiding motion data from an IMU of the rover or mobile GNSS receiver; the LOS estimation module 704 estimates a compensating adjustment or time offset to the clock local oscillator (e.g., clock NCO) (e.g., of the clock tracking loop(s) 730), which is applied to the code local oscillator (e.g., code NCO) and/or the carrier local oscillator (e.g., carrier NCO) (e.g., of the channel baseband tracking loop(s) 711) to adjust the generated local code signal or code replica based on a Doppler shift of the received GNSS signal at the rover or mobile GNSS receiver.

In one embodiment, the vector tracking module 705 combines the signal tracking of a set of multiple GNSS satellite channels (e.g. all received GNSS channels) consistent with an estimated position, estimated velocity and estimated time (e.g., epoch) that is provided by a navigation, control and interface module 122 (e.g., in FIG. 1) of the GNSS receiver. For example, the vector tracking module 705 may provide measured or observed pseudoranges (e.g., derived from code-phase measurements, carrier-phase measurements, or both) for corresponding GNSS satellites, where each observed pseudorange represents that distance (e.g., line-of-sight distance or geometric distance) between a GNSS receiver and any available satellite within the constellation of satellites based on GNSS receiver measurements augmented with an external sensor (e.g., imaging device). Further, the vector tracking module estimates (e.g., incremental changes per chip or clock cycle) to a respective carrier frequency and/or respective code frequency/code phase of each corresponding GNSS channel or a set of GNSS channels (e.g., any or all available GNSS channels with reliable signal quality or signal strength) on an aggregate basis (e.g., on a polling basis or serial sequence for each channel) to track precisely the carrier phase, or code phase or both ("channel tracking"), of the corresponding GNSS channels.

In one embodiment, for a code wipe-off configuration of a phased-lock loop (PLL) with code NCO 774 (e.g., and carrier NCO 771) to process encoded data or data modulation (e.g., repeating navigation-related data message for a given satellite, until the message is updated over time) on the received GNSS signal, a bank of first correlators 723 (e.g., first correlators) for baseband carrier tracking may provide accumulations or correlations (e.g., 634-1 to 634-n, inclusive, and 735-1 to 735-m, inclusive) that indicate similarity between samples of the inputted baseband signal and corresponding samples of one or more replica code signals (e.g., prompt code replica signals or early, prompt and late code replica signals of a previously decoded or known repeating navigation data message for a given satellite until the message is updated), such as a primary correlation associated with an in-phase component and a secondary correlation associated with a quadrature-phase component (e.g., demodulated IQ signals) of a set of one or more corresponding GNSS channels (e.g., all polled, scanned or serially surveyed, available GNSS channels with reliable signal quality or signal strength).

The above code loop tracking is based on (e.g., tracking, alignment of time synchronization of) a carrier numerically controlled oscillator (NCO) 771 of the channel baseband processing module 711, where the carrier is modulated with the code for a corresponding satellite, satellite channel, or set of channels. For example, the channel baseband tracking loop 711 may further comprise: (a) a carrier loop discriminator, alone or together with a carrier loop filter, that is configured to select the correlations in which the prompt correlations have the greatest normalized magnitude or greater normalized magnitude (e.g., than associated early and prompt correlations), or (b) the carrier loop discriminator and a code loop discriminator that is configured to select the correlations in which the prompt correlations have the greatest normalized magnitude or greater normalized magnitude (e.g., relatively greater than associated early and prompt correlations for a given sampling interval, clock cycle, or chip). If a particular embodiment of the channel baseband tracking loop 711 only includes the carrier tracking loop discriminator(s), the clock tracking loops 730 may comprise the accompanying code tracking loop discriminators or clock tracking loop discriminators. Here, it is understood that the first correlators 723 may include integrators to average the products of prompt correlations and/or early, prompt, and late correlations for storage in corresponding accumulators 736.

In certain embodiments, the channel baseband tracking loop 711 may comprise a carrier loop discriminator that is configured select correlations from the carrier loop discriminator to adjust the carrier NCO 771 in the channel baseband and the clock NCO 776 within the clock tracking loop 730. Further, in some configurations the carrier NCO 771 will be adjusted, replica signals, based on the selected correlations from the carrier loop discriminator and any of the following: (a) LOS estimation data from the LOS estimation module 704, (b) position versus time data, velocity data or acceleration data (e.g., for Doppler adjustments to estimated pseudoranges between the GNSS receiver and any given GNSS satellite within view/reception range) from an external sensor of the LOS estimation module 704, such as an inertial measurement unit (IMU) or multi-axis accelerometer or gyroscope associated with the GNSS receiver, (c) clock bias data and corresponding clock bias compensating data, and (d) carrier bias data and corresponding carrier bias compensating data. For each received GNSS channel, each GNSS channel with a set of received GNSS channels, or a representative collective GNSS channel (e.g., super GNSS channel), the (Doppler) adjustment of the carrier NCO 771 is configured to adjust the time synchronization and temporal tracking of the samples of locally generated carriers or samples of carrier replicas with respect to the received intermediate frequency signal, received near-baseband signal and/or received baseband signal to produce clean carrier wipe-off accumulations (e.g., IQ accumulations) at digital baseband signal with IQ components (636-1 through 636-n) that are substantially free of unwanted images in the digital frequency domain, artifacts or residual carrier components.

In one configuration, a bank of second correlators 726 (e.g., second correlators), for clock tracking may provide accumulations or correlations (725-1, 725-m) that indicate similarity between samples of the inputted baseband signal and corresponding samples of one or more replica clock signals (e.g., delayed or shifted clock replica signals), of a set of one or more corresponding GNSS channels (e.g., all polled, scanned or serially surveyed, available GNSS channels with reliable signal quality or signal strength) based on (e.g., tracking, alignment of time synchronization of) a clock phase numerically controlled oscillator 776 of the clock tracking loop module 730. The clock tracking loop module 730 can support accurate tracking of the carrier phase and adjustment of the numerically controlled oscillator (NCO) of the clock tracking loop module 730, where the clock tracking loops 730 can provide incremental carrier-phase adjustments to the code NCO 774 related to same GNSS channel or set of channels for given satellite.

Similarly, a bank of first correlators 723 (e.g., first correlators), for code tracking and/or carrier tracking may provide accumulations or correlations (634-1, 634-*m*) accumulations or correlations (e.g., in accumulators 736) that indicate similarity between samples of the inputted baseband signal and corresponding samples of one or more replica code signals (e.g., prompt code replica signals or early, prompt and late code replica signals), such as a primary correlation associated with an in-phase component of carrier signal and a secondary correlation associated with a quadrature-phase component of carrier signal (e.g., IQ signals for certain GNSS signals can be demodulated to decode navigation data). The first correlators 723 support a set of one or more corresponding GNSS channels (e.g., all polled, scanned or serially surveyed, available GNSS channels with reliable signal quality or signal strength) based on (e.g., tracking, alignment of time synchronization of) a clock phase numerically controlled oscillator 776 of the clock tracking loop module 730.

In an alternate embodiment, a channel code loop discriminator is coupled to the accumulators 736, or integrated within the accumulators 736; the channel code loop discriminator is configured to select the correlations in which the samples of prompt correlations have the greatest normalized magnitude or greater normalized magnitude (e.g., relatively greater than the magnitude associated early and prompt correlations). Further, in certain embodiments, the first correlators 736 may include integrators to average the products of prompt correlations and/or early, prompt, and late correlations for storage in corresponding accumulators 736, which are coupled to the output of first correlators 723.

Further, in an alternate embodiment, the clock tracking loop 730 may comprise a clock loop filter coupled to the output to filter the control feedback signal provided to the carrier NCO 771 in the carrier tracking loop. For example, the clock tracking loop 730 with a code loop discriminator is configured to use the selected correlations at the output of the second correlators 726, the accumulators 738, or (a clock loop discriminator associated with the second correlators 726 and the accumulator 738) to adjust the carrier NCO 771. Further, in some configurations the code NCO 774 will be adjusted (e.g., indirectly) based on the samples of selected correlations (e.g., with prompt correlations of maximum magnitude) from the code loop discriminator and any of the following: (a) carrier accumulations and correlations (634-1 through 634-*m*, 735-1 to 735-*m*, or both) from the accumulators 736 for the carrier tracking loop module and/or code tracking loop module to derive carrier aiding data, (b) code accumulations and correlations (725-1 to 735-*m*) from the accumulators 738 for the code tracking loop module to derive a clock tracking error signal, or control feedback signal, and (c) feedback or error data (e.g., 727-1 to 727-*m*) outputted from the vector tracking module 705.

In one embodiment, the vector tracking module 705 may provide feedback or error data to each numerically controlled oscillators (771, 774) of respective channel baseband tracking modules 711 (e.g., one channel baseband tracking loop per received GNSS satellite) to replicate or determine a local estimation of one or more of the following: one or more general carrier phase applicable to a set of corresponding GNSS channels, or a collective representative (e.g., super) GNSS channel that represents a set of corresponding GNSS channels; each code phase of a corresponding encoded GNSS signal or a set of corresponding GNSS channels, or a collective representative (e.g., super) GNSS channel that represents a set of corresponding GNSS channels; and each code frequency of a corresponding encoded GNSS signal or set of corresponding GNSS channels, or a collective representative (e.g., super) GNSS channel that represents a set of corresponding GNSS channels.

In an alternate embodiment, such local replicas or local estimations of carrier phase and/or code phase may be applied to an extended Kalman filter or Kalman filter within navigation, control and interface module 122 and/or the vector tracking module 705 for reduction of errors, such as phase tracking error (e.g., carrier phase tracking error, code phase tracking error), GNSS receiver clock bias, and satellite clock bias.

In some embodiments, at the output of the correlators (723, 726), the decoded or demodulated baseband signal may contain navigation-related data, such as GNSS time, almanac, ephemeris data, satellite status, data, and orbital data, encoded on the corresponding GNSS signal, which can be applied to the navigation control and interface module 122, the vector tracking module 705, or both. For example, the L1C/A is encoded with navigation data that can be fully demodulated by civilian GNSS receivers.

In one configuration, the vector tracking module 705 provides estimated carrier frequency and phase and estimated code frequency and phase (727-1 to 727-*m*) for each received GNSS satellite signal, consistent with input from a navigation, control and interface module 122 that may comprise an extended Kalman filter or Kalman filter that processes one or more demodulated/decoded GNSS channels from correlators (623, 726) or accumulators (736, 738) associated with the output of the correlators (623, 726) to reduce error in the decoded data of the each GNSS output channel.

The channel baseband tracking module 711 and the clock tracking loop(s) 730 may be configured in accordance with various technical approaches (e.g., embodiments) that may be applied cumulatively or separately. In certain embodiments, each GNSS receiver has one respective clock tracking loop. In the GNSS receiver, a clock tracking loop determines a common error (with respect to the reference frame of a particular GNSS satellite or certain GNSS constellation) to all of the corresponding GNSS channels (e.g., based on analysis of I and Q signal components of carrier phase and/or code phase from multiple applicable channels).

Under a first technical approach, in each channel baseband tracking module 711 or each second-stage of the carrier demodulator 719, a local carrier generator, such as carrier NCO 771, for each channel or set of channels, (e.g., or aggregate local carrier generator), alone or in conjunction with a waveform look-up table 770 (e.g., sine and/or cosine look-up table), provide an estimated replica or an estimated (e.g., aggregate) local carrier signal (712 and/or 714) for a set of one or more corresponding GNSS signals to first correlators 723 or the carrier demodulator 602, such as the second-stage carrier demodulator 719). First correlators 723 may comprise one or more mixers, shift registers (e.g., to generate delayed signals), and integration-and-dump modules. Further under the first approach, in each code tracking loop, a local code generator, such as an code NCO 774, for each channel or a set of GNSS signals (e.g., aggregate local code generator) provides an estimated local replica (713) (e.g., P code, or unknown data (PN data) at known data rate (10.23 Megabits per second (Mbs)) of the P(Y) code, or civilian (ranging) PN codes) or an estimated aggregate local code signal for a corresponding set of GNSS signals.

Under a second technical approach, in each channel baseband tracking module 711, a local carrier generator, such as carrier NCO 770, for each channel or set of channels (e.g., a super channel or aggregate local carrier generator) provides an estimated replica or an estimated (e.g., an aggregate or super) local carrier signal (714, 712) for a set of one or more corresponding GNSS signals; further, in the same channel baseband tracking module 711, a local code generator, such as code NCO 774, for each channel or set of channels (e.g., aggregate or super local carrier generator) provides an estimated replica or an estimated code signal (e.g., an aggregate or super local code and local carrier signals 713) for a set of one or more corresponding GNSS signals.

Under a third approach, in the clock tracking loop(s) 730, a local clock generator, such as clock NCO 776, for each channel or set of channels (e.g., aggregate local carrier generator) provides an estimated replica or an estimated (e.g., aggregate) local clock signal (706), or incremental adjustments thereto for each clock cycle or chip, for a set of one or more corresponding GNSS signals, where the local clock signal is associated with any of the following: a corresponding respective received satellite GNSS signal, a corresponding GNSS satellite and respective satellite clock bias, and a particular reference, rover or mobile GNSS receiver and respective receiver clock bias. The local clock generator (e.g., clock NCO 776) can provide the estimated local clock signal to the second correlators 726, which comprise mixers and shift registers, and integration- and dump-modules.

The set of one or more estimated local code signals (713) (e.g., P codes) and estimated local baseband signals (636-1 to 636-n) (e.g., demodulated carrier signals) with I components and Q components are inputted to a corresponding first correlators 723 (or correlator bank) for baseband tracking of the carrier; the correlated output signal (634-1 to 634-n, inclusive), or decoded information signal is provided to each channel baseband tracking module 711 and clock tracking loop module 730 for a corresponding channel or set of channels of any given GNSS satellite. the correlated output signal or demodulated output (e.g., IQ vector signals) is stored in accumulators 736, from which it can be provided to the clock tracking loop module 730. Each clock tracking loop (730) is configured to provide a clock output signal 706 based on outputs of the correlator banks (723 or 726) that can be stored in accumulators (736, 738).

In an alternate embodiment, the carrier and code replicas for the same set of GNSS signals or same set of GNSS channels may share a common correlator bank, such as first correlators 723, while each second correlator 726 within the bank of second correlators 726 is dedicated to clock loop tracking module 730 for a corresponding GNSS satellite.

In one embodiment, the modulated or encoded intermediate frequency signal or modulated, encoded digital baseband signal (e.g., near baseband frequency signal) (e.g., 115, 135) is inputted to the demodulator 602 of FIG. 10A or FIG. 10B. In one embodiment, the demodulator 602 applies the first stage carrier demodulator 718, or first discriminator, to the output of the channel baseband tracking module 711 to remove or compensate for the tracking error component 621 (e.g., aggregate channel tracking error (712) of carrier phase and code phase for the same received (baseband) GNSS satellite channel, relative/differential channel tracking error between coherent, temporally synchronized GNSS satellite channels of the same satellite, and/or (frequency scaled) clock tracking error (716) of a combination of GNSS receiver and/or corresponding GNSS satellite) with respect to the encoded baseband signal; the demodulator 602 applies the second stage carrier demodulator 719, or second discriminator, for any of the following: (a) to remove or strip (e.g., completely remove) the carrier signal component (e.g., without any unwanted image or carrier-related frequency artifacts), (b) to prepare for correlation-based decoding or demodulation of the encoded baseband signal and code signal by the correlators (723, 726), and (c) to facilitate any of the following: (1) carrier tracking, (2) code tracking, (3) clock tracking, (4) demodulation, decoding or extracting of the encoded navigation-related information (634-1 to 634-n, inclusive and 725-1 through 725-m), and (5) removal or compensation for an aggregate channel tracking error (712) of carrier phase and code phase for the same received (baseband) GNSS channel or carrier tracking error component (e.g., associated with signal 636-1 to 636-n, inclusive) that would otherwise appear in the digital baseband signal. In one example, the tracking error component or aggregate feedback error for multiple GNSS channels or a set of GNSS channels may comprise a carrier phase component of the tracking error for a carrier local oscillator for the same respective band, sub-band, channel or set of channels.

In FIG. 10A, the digital intermediate frequency signal, digital near-baseband signal or digital baseband signal (115, 135), which may comprise a tracking error component (621), such as a carrier phase error tracking component, code phase error tracking component, and clock error component (e.g., satellite clock bias, GNSS receiver clock bias, GNSS inter-constellation clock bias) is transmitted or provided to a demodulator 602. In one embodiment, the demodulator 602 comprises a first-stage carrier demodulator 718 coupled to a second stage carrier demodulator 719. For example, a first stage carrier demodulator 718 comprises a digital mixer to mix the tracking error signal component 621 (frequency-scaled aggregate tracking error of code phase and carrier phase signal components of one or more channels that are synchronized or coherent, or clock tracking error) and the baseband signal (115, 135) to provide a partially demodulated baseband signal 721 to remove a tracking error signal component 621 of the carrier phase signal component and/or code phase signal component that applies to a corresponding GNSS channel or set of GNSS channels. The first-stage carrier demodulator 718 is configured to remove or compensate for the tracking error in the baseband signal, where the tracking error comprises aggregate, channel tracking error of: (a) carrier phase, or (b) carrier phase and code phase for the same received band, sub-band, (baseband) GNSS satellite channel, or set GNSS channels.

The second-stage carrier demodulator 719 receives input signals 714 (e.g., P codes of one or more phases, such as early, prompt and late P-codes) and 721 to remove (e.g., completely) a carrier component of the carrier signal to provide the encoded baseband signal (636-1 through 636-n) without a carrier (e.g., and with reduced carrier phase tracking error and/or reduced code phase tracking error arising from potential variance in coherence, or with reduced demodulation phase noise in the process), such as a encoded baseband signal (636-1 to 636-n, inclusive) with a removed/ stripped carrier to the correlator bank of first correlators (723) for channel baseband tracking.

Meanwhile, the frequency scaling module 715 adjusts, translates, or scales the clock signal(s) 706 (e.g., clock estimation signals or incremental changes to the clock signal) from respective output(s) of a clock tracking loop 730 at reference frequency to the clock rate data or clock-related data 716 at a corresponding channel signal frequency or corresponding set of channels (e.g., coherent or time/phase synchronized GNSS channels), consistent with the channel tracking outputs (712, 713, 714) of the channel baseband tracking module 711. In one embodiment, the clock-related data 716, alone or together with carrier frequency data, contributes to carrier-aiding data to the code tracking loop, such as a tracking error signal component 621.

In an alternate embodiment, the frequency scaling module 715 can be coupled between the channel baseband processing module 711 and the summer 750 to scale the carrier phase error component.

The summer 750 adds or processes the scaled clock rate 716, which is derived from one or more clock signals, and the general carrier feedback data 712 (e.g., carrier frequency data, or aggregate carrier phase error component and/or code phase error component) associated with the LOS data (e.g., from the same GNSS satellite) from the coherently or synchronously related channel baseband tracking module 711, alone or together with the LOS estimation module 704, to generate the tracking error signal 621 (e.g., with carrier phase tracking error component, a code phase error tracking component and clock tracking error component), which is provided to a demodulator 602 or digital mixer to remove the tracking error component (e.g., carrier tracking error signal component) from the baseband signal, among other things.

In one embodiment, a correlator bank of first correlators 723 (e.g., first correlator bank) mixes a bank of carrier-removed signals (636-1 to **636-*n*) or rather encoded baseband signals (e.g., modulated with a code), which are derived from the output of the second carrier demodulator 719, with a set of local code replica signals 713 to generate a bank in-phase and quadrature-phase (IQ) accumulation signal 735-1 to 735-*m*, inclusive (also denoted as signal 634-1 to 634-*n*, inclusive), which can be stored in accumulators 736. For example, the first correlators 723 may detect the modulated components or encoded components (e.g., IQ components) of the baseband signal based on product (e.g., a time-averaged, smoothed or integrated) of the inputted, encoded baseband signal and a locally generated signal or local code replica (e.g., or a set phase delayed replicas) that has some of the same characteristics as the encoded baseband signal. First correlators 723** are configured to determine correlations for: (a) code phase tracking loop, or (b) code phase and the carrier phase tracking loop, where the code phase tracking loop is configured to estimate a corresponding code error component of the tracking error for the code local oscillator for a channel on an individual channel-by-channel basis. However, in alternate embodiments, a common code NCO or code tracking may or code tracking may be applied to a complex code channel, a respective band, sub-band channel, or set of channels.

In one configuration, the vector tracking module 705, the LOS data estimation module 704, or both combine the bank of correlations (735-1 to **735-*m*) from the first channel to the mth channel (or 641-1 to 641-*n*, inclusive) to produce the estimated LOS data 727-1 (e.g., for each applicable satellite and corresponding GNSS receiver) for the first channel and up to 727-*m* for the mth channel. Further, the external sensor (e.g., imaging system) of the LOS data estimation module 704 also independently produces the estimated LOS data (728-1 to 728-*m*) for the first channel and up to the mth channel (e.g., for each applicable satellite and corresponding GNSS receiver). The baseband tracking module 711 of the first channel uses correlation signal 735-1 (or 641-1), while the second through mth channel use correlations (735-1 to 735-*m*) to produce the residual frequency 714. For each channel or set of channels, baseband tracking module 711 is configured to use the LOS data signal (727-1 to 727-*m*), (728-1 to 728-*m*) and the derived satellite LOS to produce the LOS-affiliated carrier frequency 712** (e.g., LOS frequency or carrier frequency associated with LOS data).

The LOS carrier removed signal or local code replica signal 713, which can be generated by an matched filter with an impulse response that is reversed in time, is also used by the second correlator(s) 726 to generate the in-phase and quadrature-phase correlation 725-1 for the first channel. The clock tracking loop 730 takes, the clock correlation 725-1 and the channel correlation 735-1 of the first channel, up to the clock correlation **725-*m* and channel correlation 735-*m* of the mth channel to produce the clock frequency 706** at the reference frequency.

Figure 11:
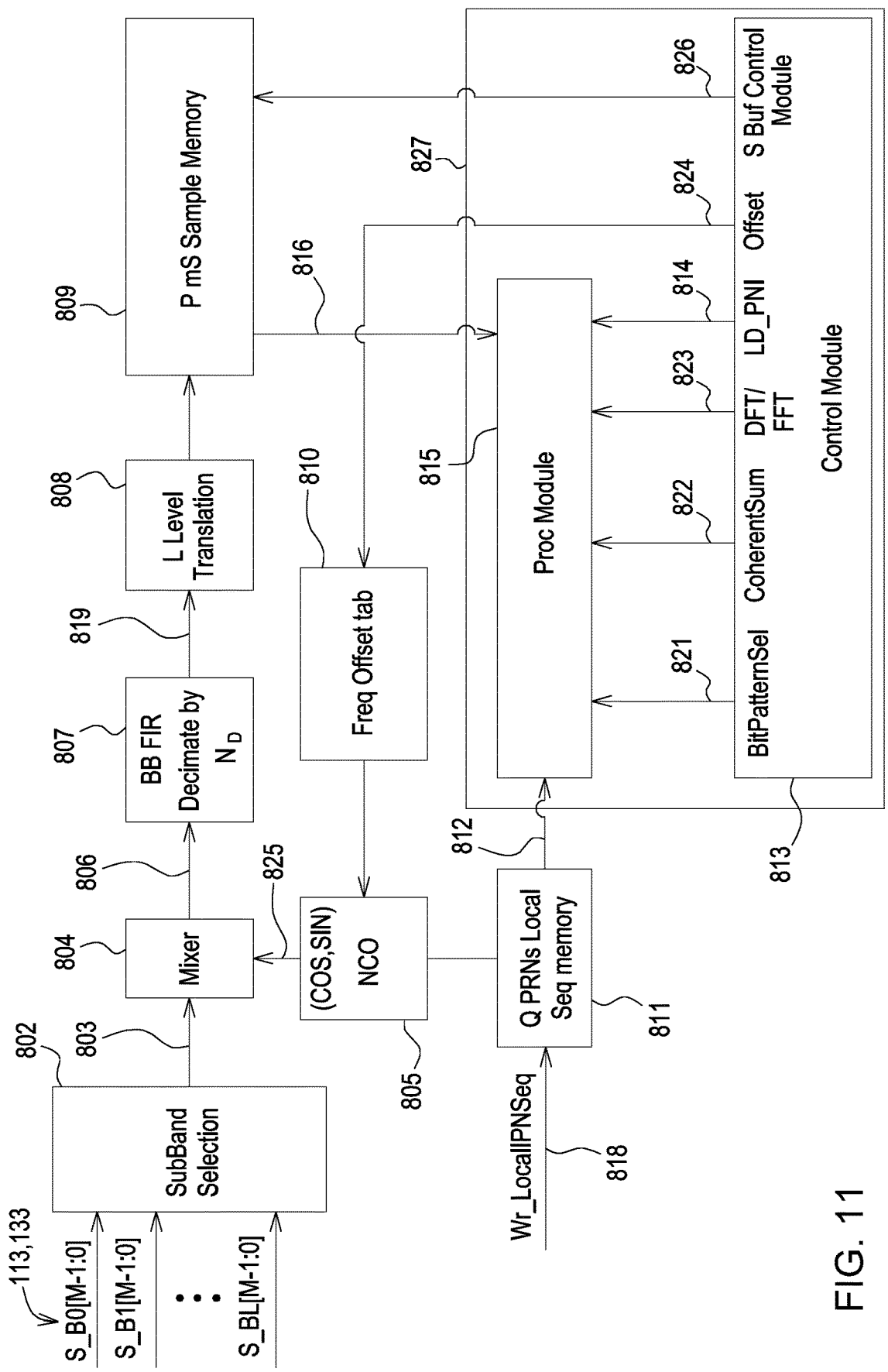
FIG. 11 is a block diagram of one embodiment of a dedicated acquisition engine that includes a second downconverter (e.g., digital downconverter).

FIG. 11 illustrates a block diagram of a system for a dedicated engine to decrease the time for GNSS signal acquisition, such as determining an estimated arrival time for a given received GNSS satellite signal, or convergence upon an integer ambiguity resolution of carrier phase for precise carrier phase measurements of pseudorange (e.g., delta pseudorange), alone or in conjunction with (after), estimation coarse pseudorange measurements of code phase for a position solution, consistent with reliable centimeter level position accuracy. The multi-constellation satellite systems provide more available measurements and make it possible to achieve fast navigation solution pull-in once the stable tracking is obtained. Thus the fast acquisition and re-acquisition becomes necessary to achieve the goal. The universal acquisition engine is designed to acquire one selected signal for each constellation. It can also handle multiple types of overlay codes appropriately.

In FIG. 11, acquisition is only used for the coarse alignment of the code phase and carrier phase of a received GNSS signal for each GNSS constellation. The high precision GNSS product normally adopts the multi-bit analog-to-digital converter (ADC) and associated high sampling rate. Accordingly the data storage and processing load for data processing tend to make the logic size too large or larger than ideal for prompt signal acquisition, pull-in and integer level ambiguity resolution of carrier phase. Further, high precision GNSS receiver may require acquisition of multiple channels that tends to contribute to or be susceptible to decrease in data throughput and latency.

To reduce the data storage size, one narrow bandwidth signal is selected for each GMSS constellation. The multiplexer (MUX) 802 selects one of the GNSS constellation signals at digital baseband (115, 135) or an intermediate frequency to acquire and outputs selected signal 803. Because selected signal 803 may comprise the intermediate frequency component, the mixer 804 or digital mixer is used to translate the signal 803 into the digital baseband signal 806 (e.g., mixed signal).

In one embodiment, the low pass filter (LPF) 807 reduces the bandwidth of the selected signal 803 by filtering digital baseband signal 806, where the decimation of the LPF 807 is viable or capable to reduce the rate of the filtered signal 819. For example, the LPF 807 comprises a digital baseband finite impulse response (FIR) filter that decimates by ND, which tends to reduce images or unwanted artifacts in signal 819 from the digital mixer 804 that can potentially appear in the resultant signal 806.

In one embodiment, the level translation unit 808 further reduces the number of bits of each sample of the code (e.g., P(Y) encoded baseband) because the coarse acquisition doesn't need multi-bit precision as tracking requires. By the LPF 807 and the level translation unit 808 applying two successive decimations, the size of storage memory 809 can be significantly reduced.

FIG. 12 is a flow chart of one embodiment of a method for acquiring received GNSS signals by the GNSS receiver system of FIG. 11. For example, in FIG. 12, the acquisition process relates to the time period after activating, initialization, turning on, or powering up the GNSS receiver until the receiver acquires reception of one or more received GNSS satellite signals by first achieving one or more the following for at least four GNSS satellites: (a) carrier phase locking of carrier tracking loop and the code phase locking of the phase code tracking loop (e.g., by one or more lock loop discriminators) for one or more respective received GNSS satellite signal(s), or (b) carrier phase locking of the channel baseband tracking module 711 and phase code locking based on the clock tracking loop(s) 730 (e.g., by one or more lock loop discriminators) for one or more respective received GNSS satellite signals, (c) determining (e.g., precise or near integer) floating ambiguities in carrier phase of respective carrier signals of one or more received GNSS satellite signals and generating a corresponding position, motion or attitude estimate based on the determined floating phase ambiguities, (d) determining integer (e.g., approximate, near-integer, or exact rounded integer) ambiguities in carrier phase of carrier signals of one or more received GNSS satellite signals and generating a corresponding position, motion or attitude estimate based on the determined floating phase ambiguities, (e) decoding or demodulation of encoded navigation-related information on a received GNSS signal.

A cold start of the GNSS receiver means initialization or turning on the GPS receiver without stored (e.g., locally stored) prior data to assist or reduce the pull-in or ambiguity resolution of carrier phase or acquisition period to attain a precise position solution (e.g., based on precise carrier delta pseudorange and code pseudo range solutions). A warm start of the GNSS receiver means initialization or turning on the GPS receiver with stored (e.g., locally stored) prior data to assist or reduce the pull-in or ambiguity resolution of carrier phase or acquisition period. The method of the acquisition process of a GNSS signal FIG. 12 begins in step 858.

In step S858, in preparation for or prior to starting the acquisition process of each GNSS signal (e.g., at least one GNSS signal per GNSS constellation), the pseudo-noise (PN) sequences (e.g., replica, local, pilot or training PN or pseudo-random noise (PRN) sequences) from the received GNSS channel, set of GNSS channels, or aggregate GNSS channel (e.g., super channel) representative of the set of GNSS channels, are acquired are recorded, stored in, or written into, data storage 811 through the interface register 818. For example, the data storage 811 may comprise registers of an electronic data processor 827 (e.g., of the control module or GNSS receiver), nonvolatile random access electronic memory, electronic memory, magnetic storage device, a disk drive, or an optical storage device.

Further, in accordance with step S858, each GNSS channel, set of channels or aggregate channel (e.g., at least one GNSS signal per GNSS constellation) is: (a) down-converted to an intermediate frequency, baseband frequency (e.g., down-conversion with carrier wipe-off) or near-baseband frequency signal that comprises: (a) an in-phase component (I component), or (b) a quadrature component (Q-component), or both I and Q components with the encoded PN sequence (e.g., pilot or training PN sequence); (b) a correlation and code-wipe-off process is applied to the I component, the Q component, or both with the encoded PN sequence (e.g., to identify leading edges, trailing edges, pulses, or pulse transitions of the PN sequence for proper initial/preliminary alignment of carrier tracking loop and/or code tracking loop); (c) such PN sequence, which can comprise an I component, a Q component or both may represent a pilot PN sequence, or a training PN sequency for the signal acquisition process. The I and Q components of the received samples are stored in data storage 809.

In step S859, a sub-band or band selection module 802 (e.g., multiplexer), GNSS receiver or data processor 827 selects the GNSS signal 803 (e.g., channel, set of channels, or aggregate channel representative of a set) for acquisition or decoding from a bank of candidates, associated with the received GNSS signal(s) or (IF) digital signals (113, 133), consistent with the recorded or stored pilot PN sequences (e.g., associated with digital baseband frequency), where the GNSS signal may be associated with a GNSS channel, a set of GNSS channels, or an aggregate channel representative of the set of GNSS channels. Accordingly, consistent with the block diagram of FIG. 11 the common data processing hardware (e.g., electronic data processor 827, ASIC or PLA or FPGA) with common hardware bias (and latency) and common software modules with common software bias can be shared between or among different GNSS channels or sets of GNSS channels to reduce intra-channel bias.

In step S860, based on the characteristics of the selected GNSS signal 803, the control module 813, GNSS receiver, or electronic data processor 827 is configured for the acquisition parameters, such as the coherent integration period (e.g., associated with control signal, such as enable coherent integration signal 822) and data/overlay code pattern or code specifications (e.g. associated with the bit pattern selection signal 821). The coherent integration period may vary between: (a) a lower limit of a tracking integration rate after acquisition, pull-in, or convergence of the carrier phase ambiguity solution of GNSS channel, where the tracking integration rate may depend upon the digital IF sampling rate, and (b) an upper limit during an acquisition or search for proper data integration boundaries for corresponding encoded baseband signals. The data/overlay code pattern or code specifications (e.g., PN code specifications) may include the modulation frequency of the encoded information, such as the code chipping period or chipping rate of the P-code, reference power spectrum of the PN code plus data at baseband frequency, and autocorrelation period and autocorrelation interval of the P-code. Similarly, the code specifications for C/A (coarse-acquisition-code), publicly available specifications for encryption W-code; and autocorrelation period and autocorrelation interval for C/A code may supplement the PN code data for acquisition purposes.

In step S861, to manage the signal acquisition process, the control module 813, GNSS receiver or electronic data processor 827 generates or controls the state of the GNSS receiver to control one or more of the following control signals or commands: the bit pattern selection signal 821, coherent integration signal 822, Discrete Fourier Transform (DFT)/fast Fourier Transform (FFT) selection signal 823, LD_PNI signal 814, carrier frequency offset signal 824, and buffer memory control signal 826. The coherent integration signal 822 may support any of the following: enable integration, disable integration and integration period, lower limit of integration period and upper limit of integration period, acquisition mode and tracking mode. The DFT/FFT selection signal supports selection of a particular form of Fourier transform to simplify calculations of the dot product or evaluation of the signal power or energy of various I and Q components of the encoded baseband PN code. To provide accurate analysis, Fourier transforms may be based on an assumption that the amplifier and filter components are generally linear in a phase response versus frequency for any passband of an amplifier, filter, or both, for example.

The carrier frequency offset may support: enable, disable, and change/adjustments in the carrier frequency, intermediate frequency, frequency scaling, and associated phase of the carrier frequency or intermediate frequency. LD_PNI signal 814 (e.g., load PN sequence signal) may represent the enable, disable, load next PN sequence (or next I component and/or Q component, without or without integration or averaging, in the register, stack, memory queue or data storage. The LD-PNI or load next PN sequence also include code frequency, code phase, or code phase adjustment of output of local oscillator, such as code NCO that pertains to a corresponding or next PN sequence.

In step S862, the control module 813 is configured to provide the carrier frequency offset signal 824: (a) that selects the carrier frequency or intermediate frequency (IF) from the frequency offset lookup table(s) 810 (or look-up table 301); (b) where the look-up table(s) (810 or 301) drive or is driven by the carrier numerically controlled oscillator (NCO) (e.g., 805 or another NCO) which generates the local carrier signal 825 or local IF signal; and (c) where the mixer 804 combines the digital intermediate frequency signal or selected digital baseband signal 803 and local carrier 825 to generate the (encoded) digital baseband signal 806.

In step S863 in one embodiment, the LPF 807, which comprises a decimation module, reduces the rate of the baseband signal 806. The resultant filtered signal 819 is further quantized by the level translation unit 808 to reduce the quantization level, which is then stored in the buffer data storage device 809. For example, the buffer data storage device 809 may comprise electronic buffer memory for storing filtered baseband signal samples that are sampled at rate of a suitable sampling interval (e.g., millisecond(s) duration samples or chip-rate sampling duration of corresponding baseband modulated by P-code, precision code, encoded navigation-related data, encoded message or pseudo-noise code or pseudo random noise code (PRN)). A chip is a unit of clock cycle in a spread spectrum modulated GNSS received signal, such as GPS received signal that is encoded or modulated with a PN signal or PRN signal associated with navigation-related information, where the bandwidth of the modulated GNSS received signal is generally proportional to the chipping rate.

In step S864, the control module 813, GNSS receiver or data processor 827 is configured to generate buffer memory control signal 826 to align the first sample of the PN sequence (e.g., pilot or training PN sequence) in the buffer data storage 809 with the GNSS receiver (millisecond or chip-rate) clock edge or symbol transition of the clock signal or local replica of the phase code signal, such as the civilian-accessible encoded GNSS signal. In one embodiment, the LOS estimation module 704, alone or together with the external data source (e.g., IMU) may provide a Doppler shift, motion aiding data, or LOS data to adjust the clock frequency and/or phase of a clock oscillator (e.g., clock NCO) in a clock tracking loop 730, which in turn, in some configurations, may drive or reduce tracking error a carrier NCO and a corresponding code NCO, of the respective carrier tracking loop, code tracking loop, or channel tracking loop for one or more GNSS channels.

In step S865, the control module 813, GNSS receiver or data processor 827 is configured to generate (e.g., via one or more shift registers or digital delay units) the PN local signal 818 with one or more phase offsets (e.g., early, prompt and late phase offsets or one or more chips proportional to the chipping rate of the modulation on the encoded GNSS signal channel) in data storage 811 and to transfer the scheduled PN sequence 812 into the data processing module 815 an electronic data processor 827 that communicates to associated data storage device via a data bus, where the electronic data processor 827 is configured with software instructions to provide one or more of the following: correlators, mixers, accumulators, and integrators.

In step S866, the data processing module 815, GNSS receiver or data processor 827 combines, integrates and/or correlates the PN code sequence (e.g., pilot or training PN code sequence in the buffer data storage) with the time-aligned GNSS receiver generated replica or local PN code sequences (with one or more corresponding phase offsets in the data processing module 815): (a) to generate multiple sub-millisecond integrations (e.g., from correlations or accumulations) to search for bit or word transitions in the PN sequence (e.g., pilot or training PN sequence for a corresponding GNSS channel or set of GNSS channels); (b) to evaluate the signal energy of the integrations, such as FFT/DFT signal products represent dot product power (e.g., substantially coherent dot product power) of various in-phase (I) components, and quadrature components (Q) with different time/phase offsets; and (c) based on signal energy analysis, to generate a carrier offset signal 824 or tracking error for aligning the carrier frequency/carrier phase, or change in carrier phase, with respect to the code phase of the local PN sequence or PN code replica in accordance with the carrier tracking loop, code tracking loop, and/or channel tracking loop and any accompanying tracking error signal.

For example, in accordance with control data from the control module 813, the data processing module 815, GNSS receiver, or data processor 827 can apply a Fourier transform, such as fast Fourier Transform (FFT) and Discrete Fourier Transform (DFT) to the integrations (e.g., sub-millisecond integrations or integrations over an encoding or encryption chip period). In particular, the control module 813 is configured to generate the FFT/DFT selection signal 823 to conduct the spectrum analysis (e.g., frequency versus magnitude response in the frequency domain) on the integrations (e.g., sub-millisecond integrations).

Step S866 may be accomplished by applying various techniques, cumulatively or separately. Under a first technique for executing step S866, the processing module 815, GNSS receiver or data processor 827 is configured to linearly combine, integrate, or otherwise manipulate or process selected FFT/DFT signal products, such as in-phase components and quadrature phase components, of the local replica PN code sequence and the received PN code sequence encoded on the baseband signal, in the frequency domain (e.g., based on the data bit pattern selection signal 825). For example, for an integration time (e.g., one or more chips, epochs or successive sampling intervals at a higher acquisition integration rate, rather than a lower steady-state tracking rate for carrier, code and/or clock loops), the FFT/DFT signal products may represent dot product power (e.g., substantially coherent dot product power) of various in-phase (I) components, and quadrature components (Q)

with different time offsets (e.g., early, prompt and late time offsets) from processing the output of one or more correlators of carrier loop discriminators and/or code loop discriminators (e.g., delay lock loop discriminators).

Under a second technique for executing step S866, for an integration time (e.g., one or more chips, epochs or successive sampling intervals at a higher acquisition integration rate, rather than a lower steady-state tracking rate for carrier, code and/or clock loops), the control module 813 can provide a data bit pattern selection signal 821 or a control signal for the data processing module 815 to make and store (and optionally rank) various combinations (e.g., products or dot products) of DFTs or FFTs with greatest signal power (e.g., maximum power density or maximum signal magnitude over a frequency range of interest) at the current code shift, where combination comprises a product or integrated product of a sample or time-shifted sample (e.g., early, prompt or late sample) of local replica PN code sequence and sample of received PN code sequence encoded on the baseband signal. Further, to the extent that the local PN code sequence is temporally coherent, synchronized with or aligned to track the received PN code sequence on the baseband, the correlations between the local PN code sequence and the received PN sequence correspond to combinations of DFTs or FFTs with greatest signal power (e.g., maximum power density or maximum signal magnitude over a frequency range of interest) at the current code shift, such as prompt correlation, as opposed to an early (e.g., earlier) correlation or a late (e.g., later) correlation with a lower power density, or lower signal magnitude over a frequency range of interest.

Under a third technique, the control module 813 instructs the processing module 815 to remove or wipe-off codes, such as unknown P(Y) codes, encryption, and/or encoded unknown W-codes of the baseband signal (e.g., L1P or L2P signal with removed P(Y) codes) to detect, decode, or promote detection or decoding navigation-related data, along with bit error rate (BER), symbol error rate (SER) and other digital signal metrics to verify/confirm proper acquisition of one or more GNSS channels, or to continue searching for signal acquisition in accordance with the method of FIG. 12.

Under a fourth technique, the control module 813 instructs that processing module 815 to remove the encryption or encoded W-codes of the baseband signal (e.g., L1P or L2P signal with removed P(Y) codes) by generating a corresponding a W-code accumulation signal that can be multiplied/mixed with the W-code encoded baseband signal.

Under a fifth technique, a GNSS channel, set of GNSS channels, or aggregate GNSS channel is acquired or acquisition is confirmed if the signal strength or signal-to-noise, or signal quality exceeds a threshold or if received energy (e.g., for reception, decoding or demodulation) associated with the I and Q components and dot products thereof of the Fourier transform analysis exceeds a received energy threshold.

In step S867, after making and evaluating (e.g., and optionally ranking) the combinations (e.g., products, averaged products or time-integrated products) of DFTs and FFT, the GNSS receiver, processing module 815, or data processor 827 increments or shifts by one sample (e.g., offset time or delay unit) the PN sequence (e.g., training or pilot sequence) in the process module 815, and the process or step S866 is repeated (e.g., by correlation with a prompt, early or late local code replica of the PN sequence) until a sufficient number (or all) the code phases (e.g., in the PN or PRN local sequence memory 811) have been evaluated or tried (e.g., exhaustively, completely or at least once). Then, the PN load signal 814 transfers the next PN sequence 812 into the process module 815. Process S866 to S867 repeats until all the PN sequence (e.g., pilot or training PN sequences) in the memory buffer 811 has been evaluated and iterated for a particular GNSS signal, such as a respective representative GNSS satellite signal per each constellation.

In step S868, if a sufficient threshold number of stored samples of pilot PN sequences are responsive to pull-in, initialize or establish preliminary, substantially coherent tracking of carrier phase and code phase in step S866 on a GNSS channel (e.g., that conforms to a reference substantially coherent dot product power of Fourier transforms, reference spectral energy density, minimum signal quality or minimum signal-to-noise ratio), the code search for a PN or PRN on a GNSS channel, set of GNSS channels, or aggregate GNSS channel representative of the set of the GNSS channels, is completed. Accordingly, once the data processing module 815, the GNSS receiver or the data processor 827 processes a sufficient number of stored samples of PN sequences (e.g., pilot or training PN sequences) for a corresponding GNSS channel, set of GNSS channels, or aggregate GNSS channel representative of the set of the GNSS channels, the next channel or set of channels is evaluated in according with step S869.

In step S869, if a sufficient threshold number of PN sequences (e.g., pilot PN sequences) is analyzed, evaluated or reviewed at a carrier frequency, GNSS channel, set of channels, or aggregate channel for a corresponding satellite in a constellation, the offset signal 824 can be changed or controlled for the next GNSS channel, or set of GNSS channels, or aggregate GNSS channel with a certain GNSS carrier frequency for a different GNSS satellite signal on the same GNSS constellation or a satellite of a different satellite GNSS constellation and repeats the steps S862 though S868.

FIG. 13A is a flow chart of a first embodiment of method for acquiring one or more GNSS signals. The like terms in FIG. 12 and FIG. 13A have like definitions. The method of FIG. 13A begins in step S870.

In step S870, a GNSS receiver, a channel selector (e.g., sub-band selection module or multiplexer) 802, or an electronic data processor 827 selects a received GNSS signal (115, 135 in FIG. 11) as a channel, set of channels, or aggregate channel representative of the set, for acquisition or decoding from a bank of candidates consistent with a recorded or stored pilot PN sequences associated with digital baseband frequency.

In step 872, a control module 813 or electronic data processor 827 of the GNSS receiver is configured for signal acquisition and correlation, wherein the signal acquisition parameters comprise any of the following: a coherent integration period and data/overlay code pattern or code specifications based on the selected GNSS signal.

In step S874, a control module 813, a channel baseband tracking module 711 or carrier tracking loop module is configured to provide a carrier frequency offset signal that selects the carrier frequency or intermediate frequency (IF) from the frequency offset lookup table(s) that supports a carrier numerically controlled oscillator (NCO) 805 (e.g., carrier NCO) to generate the local carrier signal or local IF signal (e.g., with associated I and Q components as vectors), or change to the local carrier signal the local IF signal for carrier phase loop tracking; and mixing the digital intermediate frequency signal and local carrier to generate or translate a frequency of the (encoded) digital baseband signal.

In step S876, a mixer 804 or electronic data processor 827 mixes the digital intermediate frequency (IF) 803 and local IF signal 825 to generate or translated a frequency of the encoded digital baseband signal. Alternately, a mixer 804 or electronic data processor 827 mixes the received signal (e.g., 803') and the local carrier frequency signal (e.g., 825') to generate or translate a frequency of the (encoded) digital baseband signal.

In step S878, a low-pass filter (807, 203, 213 or 114, 134) or bandpass filter is configured to filter, or filter and decimate the digital baseband signal to reduce or eliminate aliasing or analog-to-digital conversion artifacts.

In step S880, a control module 813 or electronic processor generates a buffer memory control signal to align the first sample of the pilot PN sequence in the buffer data storage device 809 with a clock edge or symbol transition of the clock signal or local replica of the phase code signal.

In step S882, the PN coder or code generator, alone or together with one or more shift registers or digital delay units, generates the PN local signal with one or more phase offsets of one or more chips proportional to the chipping rate of the modulation on the encoded GNSS signal channel in data storage device 811 and transfers each scheduled PN sequence of the PN local signal into a data processing module 815.

In step S884, the data processing module 815 or one or more correlators (e.g., 723 in FIG. 10A) are configured to correlate the PN code sequence of the pilot PN code sequence in the buffer data storage 809 with the time-aligned GNSS receiver generated replica or local PN code sequences in data storage 811 (e.g., electronic memory, registers or accumulators), with one or more corresponding phase offsets in the data processing module 815 to acquire the signal.

FIG. 13B is a flow chart of a second embodiment of a method for acquiring one or more GNSS signals. The method of FIG. 13B is similar to the method of FIG. 13A, except the method of FIG. 13B further includes step S886. Like reference numbers in FIG. 13A and FIG. 13B represent like procedures, steps or features.

In step S886, data processing module 815 or electronic data processor 827 generates multiple sub-millisecond integrations from correlations or accumulations in the data storage device, or the data processing module 815, or both to search for bit or word transitions in the pilot PN sequence for a corresponding GNSS channel or set of GNSS channels.

FIG. 13C is a flow chart of a third embodiment of a method for acquiring one or more GNSS signals. The method of FIG. 13C is similar to the method of FIG. 13A, except the method of FIG. 13B further includes step S888. Like reference numbers in FIG. 13A and FIG. 13C represent like procedures, steps or features.

In step S888, data processing module 815 or electronic data processor 827 evaluates the signal energy of the integrations of the correlations or accumulations based on Fourier transform signal products that represent dot product power or substantially coherent dot product power of various in-phase (I) components (e.g., I vectors) and corresponding quadrature components (Q) (e.g., Q vectors) with different time/phase offsets (e.g., early, prompt (e.g., on-time) and late offsets, expressed in chips or phase).

FIG. 13D is a flow chart of a fourth embodiment of a method for acquiring one or more GNSS signals. The method of FIG. 13C is similar to the method of FIG. 13A, except the method of FIG. 13B further includes step S888. Like reference numbers in FIG. 13A and FIG. 13C represent like procedures, steps or features.

In step S890, the data processing module 815 or electronic data processor 827 generates a tracking error (e.g., with a carrier phase error component, a code phase error component, and/or clock bias component) based on signal energy analysis where tracking error is configured to align the carrier frequency/carrier phase, or change in carrier phase, with respect to the code phase of the local PN sequence or PN code replica in accordance with the carrier tracking loop, the code tracking loop, and/or collective channel tracking loop. For example, the data processing module 815 or electronic data processor 827 generates a tracking error (e.g., with a carrier phase error component, a code phase error component, and/or clock bias component) based on signal energy analysis where tracking error is configured to align the carrier frequency/carrier phase, or change in carrier phase, with respect to the code phase of the local PN sequence or PN code replica in accordance with the carrier tracking loop, the code tracking loop, and/or collective channel tracking loop in conjunction with (or corrected for) clock bias (e.g., satellite clock bias, rover GNSS receiver bias, inter-constellation GNSS bias) incremental updates to the clock signal inputted to the carrier NCO and code NCO.

In certain configurations, the code tracking loop or code NCO can be updated (e.g., indirectly for clock bias) in the form of incremental code-phase updates that include a clock bias component or clock bias update at an update rate that is based on, at least partially, a real-time, ionosphere-propagation-corrected, pseudo-range estimate, which is susceptible to dithering reception of certain satellite signals, between a rover or mobile GNSS receiver and a corresponding satellite. Similarly, the carrier tracking loop or carrier NCO can be updated (e.g., indirectly for clock bias) in the form of incremental carrier-phase updates that include a clock bias component or clock bias update at an update rate that is based on, at least partially, a real-time, ionosphere-propagation-corrected, pseudo-range estimate, which is susceptible to dithering reception of certain satellite signals, between a rover or mobile GNSS receiver and a corresponding satellite.

FIG. 14, which comprises FIG. 14-1 and FIG. 14-2 collectively, discloses a flow chart of one embodiment of a method for acquiring a satellite signal or receiving a satellite signal with interference rejection. The method of FIG. 14 may be executed in conjunction with the block diagram of the acquisition-related modules in FIG. 11, where any of the modules are configured to execute the steps of FIG. 14 as described below, where the module may comprise software instructions or logic that can be executed by an electronic data processor of GNSS receiver or the data processing module 815 or other electronic hardware, or electronic components. For example, any of the following modules may be configured to execute one or more steps of FIG. 14: selection module 802, frequency offset module 810, mixer 804, control module 813, filter or low-pass filter 807, decimator (e.g., decimator integral with the filter 807 or in a secondary stage with respect to the filter 807), a frequency offset module 810 or frequency offset look-up table, a control module 813, a numerically controlled oscillator 805, shift registers, data storage device, and electronic memory (e.g., 809, 811). The method of FIG. 14 begins in step S900.

In step S900, a selection module 802 selects a received GNSS signal (e.g., 102) as a channel, set of channels, or aggregate channel representative of the set, for acquisition to acquire the received GNSS (102) signal that is susceptible to Doppler frequency shifts or propagation-related frequency shifts.

In step S902, a frequency offset module 810 provides a carrier frequency offset signal to generate one or more candidates of the local carrier frequency signal or local intermediate frequency (IF) signal based on evaluation of signal energy associated with correlations. For example, each of the candidates of the local carrier frequency signal generally has relative phase offsets with respect to others of the candidates. Further, the frequency offset module 810 is configured to provide a carrier frequency offset signal to generate one or more candidates of the local carrier frequency signal or local intermediate frequency (IF) signal based on feedback. The feedback comprises evaluation of signal energy associated with correlations and a frequency hypothesis (for the true or synchronized local carrier frequency signal relative to the carrier of the GNSS received signal), where each of the candidates having relative phase offsets with respect to others of the candidates. For example, the frequency hypothesis is configured to depend upon factors such as the GNSS system, the GNSS satellite, the GNSS received signal and encoding/modulation, relative movement of the rover GNSS receiver and satellite transmitting the received GNSS signal.

In step S904, a mixer 804 mixes the received GNSS signal and the local carrier frequency signal or local carrier intermediate frequency signal to provide a baseband signal in which a carrier of the received GNSS signal is removed (e.g., wiped-off).

In step S906, a low-pass filter 807 filters (e.g., or filters and decimates) the received samples of digital baseband signal that is encoded by a received pseudo random noise code (PN) sequence. For example, the low-pass filter 807 is configured to low-pass filter 807 and decimate of the digital baseband signal to reduce a sampling rate of the baseband signal. Further, an electronic data processor or translation module 808 (e.g., L level translation module) quantizes the filtered signal to reduce possible quantization levels for (reduced or efficient) storage in a buffer data storage device or electronic memory of the GNSS receiver.

In step S908, a control module 813 generates a buffer memory control signal to attempt to align temporally one or more received samples of the received PN sequence, or a portion thereof, in a buffer data storage device with a clock edge or symbol transition of the clock signal of a set of local samples of corresponding PN local sequence, or portion thereof, of a local signal or PN replica signal. In practice, the signals can be aligned by adjusting, by a chip or fractional chip, the clock edge or symbol transition of the block signal or a set of local samples of the corresponding PN local sequence, or portion thereof, of a local signal or PN replica signal. If the PN local sequence has a data size that exceeds the respective size of registers within an electronic data processor or data processing module 815, a portion of the PN local sequence, which is commensurate with the available respective size of the registers, is processed with respect to a corresponding portion of the received PN sequence; such that the alignment of the PN local sequence to the received PN sequence may take multiple iterations of evaluations of portions of PN sequences in accordance with correlations and integrations of the signal acquisition process of FIG. 14.

In step S910, one or more shift registers or digital delay units configured to generate the set of the local samples of the local PN sequence or local PN signal with respective one or more phase offsets. For example, the set of local samples of the local PN sequence, or portion thereof, with one or more phase offsets is stored in memory 8111.

In step S912, one or more memory devices (809, 811) transfer the received samples of each scheduled received PN sequence, or portion thereof, and the corresponding local samples of the local PN sequence, or portion thereof, into a data processing module 815 or a set of correlators.

In step S914, a set of correlators or the data processing module 815 correlates the received samples of the received PN code sequence, or portion thereof, in a buffer data storage (e.g., 809) with the respective set of local samples of the local PN sequence, or portion thereof, in memory (e.g., 811) to pursue identification of a temporally aligned (e.g., aligned integration and dump phase for code-loop discrimination/detection in signal acquisition mode), local PN code sample associated with the corresponding selected, received GNSS signal.

In step S916, a plurality of integrators or the data processing module 815 generates integrations of the correlations at millisecond or sub-millisecond intervals to identify clock edge or symbol transitions in the received PN code sequence, or portions thereof. Step S916 may be carried out in accordance with various techniques, which may be applied separately and cumulatively. In accordance with a first technique, the integrators or the data processing module 815 generates multiple sub-millisecond integrations from the correlations or accumulations in the data storage device, the data processing module 815, or both to search for bit or word transitions, as identifiable symbol transitions, in the received PN sequence, or portion thereof, for a corresponding GNSS channel or set of GNSS channels based on a data hypothesis (e.g., of the PN code or encoded information on the respective GNSS channel) consistent with publicly available specifications of the received PN code sequence. For example, the data hypothesis may comprise any of the following (e.g., publicly available technical information): the modulation type (e.g., Bipolar Phase Shift Keying (BPSK) or Binary Offset Carrier (BOC)), carrier frequency, modulation frequency or rate, PN code rate (e.g., Megachips/second), length or size of the PN code, navigation message data modulation rate (e.g., bits per second), code overly, code pattern, pilot PN code sequence, portion of pilot PN code sequence, selection of bit pattern from bit pattern library, symbol duration, duration of period or full cycle of the PN code before it is repeated, among other things.

In accordance with a second technique, the integrators or data processing module 815 generates multiple sub-millisecond integrations from the correlations or accumulations in the data storage device, the data processing module 815, or both to search for bit or word transitions, as identifiable symbol transitions, in the received PN sequence, or portion thereof, for a corresponding GNSS channel or set of GNSS channels based on one or more of the following associated with the selected received GNSS signal: a recorded pilot PN sequence, a stored pilot PN sequence, a coherent integration period, a data/overlay code pattern, code specifications, or specifications related to the data hypothesis, frequency hypothesis or both.

In accordance with a third technique, the GNSS received signal comprises a L1 C/A (coarse-acquisition signal) or a L2C signal that is modulated with a navigation data message.

In accordance with a fourth technique, a control module 813, an electronic data processor, or the data processing module 815 of the GNSS receiver is configured for signal acquisition and correlation, wherein the signal acquisition parameters comprise any of the following: a coherent integration period and data/overlay code pattern or code specifications based on the selected GNSS signal, or specifications related to the data hypothesis, frequency hypothesis or both.

In accordance with a fifth technique, a control module 813, an electronic data processor or the data processing module 815 is configured to manage one or more of the following control signals or commands of the control module 813 or the electronic data processor to facilitate step S916, alone or together with step S918: a bit pattern selection signal, a coherent integration signal, a Fourier transform (e.g., Fourier transform type or parameter) selection signal, a load stored PN sequence signal, a carrier frequency offset signal, and buffer memory control signal, or specifications related to the data hypothesis, frequency hypothesis or both.

In step S918, a data processing module 815 or an evaluator (e.g., discriminator) evaluates the signal energy of the integrations of the correlations between received samples and local samples for each sampling interval or epoch, where the candidate local carrier frequency or candidate local IF corresponding to the correlations with the greatest signal energy or magnitude with identifiable symbol transitions is generally indicative of acquisition of or the identification of the proper temporally aligned carrier frequency offset of the GNSS signal among the generated candidates to compensate for the Doppler frequency shifts or propagation-related frequency shifts.

Step S918 may be carried out in accordance with various examples, which may be applied separately and cumulatively. In accordance with a first example, the integrators, evaluators, discriminators or data processing module 815 evaluates the signal energy of the integrations of the correlations or accumulations based on Fourier transform signal products that represent dot product power or substantially coherent dot product power of various in-phase (I) components, and quadrature components (Q) with different time/phase offsets of the received GNSS signal.

In accordance with a second example, during or after identifying the proper temporally aligned carrier frequency offset, the integrators, evaluators, discriminators or data processing module 815 determine the Fourier transform signal products, which comprise fast Fourier transform signa products, discrete Fourier transform signal products, representative of dot product power of various in-phase (I) components, and quadrature components (Q) with different time offsets comprising early, prompt and late time offsets arising from processing the output of one or more correlators of the acquisition engine, and carrier loop discriminators and/or code loop discriminators.

In accordance with a third example, after the proper temporally aligned carrier frequency offset is identified, the evaluators, channel tracking module, or data processing module 815 tracks an error based on signal energy analysis, of the integrations of the correlations. For example, the carrier offset signal or tracking error is configured to align the carrier frequency/carrier phase, or change in carrier phase, with respect to the code phase of the local PN sequence or PN code replica in accordance with the carrier tracking loop, code tracking loop, and/or channel tracking loop and any accompanying tracking error signal.

In accordance with a fourth example, during a signal acquisition mode for an integration time at a higher acquisition integration rate than a lower steady-state tracking rate for carrier, code and/or clock loops, the evaluators, channel tracking module or data tracking module providing a data bit pattern selection signal or a control signal for the data processing module 815 to make and store various ranked combinations of products or dot products of Fourier transforms with greatest signal power, where the signal power comprises maximum power density or maximum signal magnitude over a frequency range of interest at the current code shift associated with the correlating.

In accordance with a fifth example, after making and evaluating and ranking combinations of products, or time-integrated products of discrete Fourier transforms and/or fast Fourier transforms, the GNSS receiver, shift registers, delay lines or data processing module 815 shifting by one sample the PN pilot sequence in one or more registers of the processing module 815 or data storage device. Further, in accordance with the fifth example, in conjunction with one or more of the steps S912, S914 and S916, repeating a correlation process by correlating the shifted pilot PN sequence with the local code replica of the PN sequence until a sufficient number of the code phases in the data storage device or registers have been evaluated to acquire or pull-in the carrier frequency of the selected, received GNSS signal that is compensated for Doppler frequency shift or propagation-related frequency shift.

In accordance with a sixth example, if the maximum integration (e.g., maximum magnitude of integrations), at the selected carrier frequency, is sufficiently above a threshold (e.g., signal or channel threshold), the evaluators, discriminators or data processing module 815 determines that the code search (e.g., and associated code shift) is complete for a PN on a GNSS channel, set of GNSS channels, or aggregate GNSS channel representative of the set of the GNSS channels; further, the GNSS receiver or its data processing module 815 uses the selected carrier frequency and the code shift to pull-in, initialize or establish preliminary, substantially coherent tracking of carrier phase and code phase on a GNSS channel that conforms to the threshold (e.g., signal or channel threshold), such as a reference spectral energy density, minimum signal quality or minimum signal-to-noise ratio.

FIG. 15 discloses a flow chart of another embodiment of a method for acquiring a satellite signal or receiving a satellite signal with interference rejection. The method of FIG. 15 is similar to the method of FIG. 14, except FIG. 15 further comprises step S920. Like reference numbers in FIG. 14 and FIG. 15 indicate like steps, procedures or features.

In step S920, the integrators or the data processing module 815 generate multiple sub-millisecond integrations from the correlations or accumulations in the data storage device (e.g., 809. 811), the data processing module 815, or both to search for bit or word transitions, as identifiable symbol transitions, in the received PN sequence, or portion thereof, for a corresponding GNSS channel or set of GNSS channels based on a data hypothesis consistent with publicly available specifications of the received PN code sequence. In one embodiment, a data hypothesis means a data pattern, data overlay, data structure, chip rate, data modulation rate, modulation parameters, and/or data technical specifications that provide timing or other information about the encoded data or PN code(s) on the corresponding GNSS channel or set of GNSS channels, or bit or word transitions, or symbol transitions in the received PN sequence. For example, the data hypothesis may comprise any of the following (e.g., publicly available technical information): the modulation type (e.g., Bipolar Phase Shift Keying (BPSK) or Binary Offset Carrier (BOC)), carrier frequency, modulation frequency or rate, PN code rate (e.g., Mega-chips/second), length or size of the PN code, navigation message data modulation rate (e.g., bits per second), code overly, code pattern, pilot PN code sequence, portion of pilot PN code sequence, selection of bit pattern from bit pattern library, symbol duration, duration of period or full cycle of the PN code before it is repeated, among other things.

The chip rate may represent the unit of a clock cycle in the receiver or spread spectrum receiver that uses a PN sequence.

FIG. 16 discloses a flow chart of another embodiment of a method for acquiring a satellite signal or receiving a satellite signal with interference rejection. The method of FIG. 16 is similar to the method of FIG. 14, except FIG. 16 further comprises step S922. Like reference numbers in FIG. 14 and FIG. 16 indicate like steps, procedures or features.

In step S922, an evaluator, discriminator, or the data processing module 815 evaluates the signal energy of the integrations of the correlations or accumulations. For example, an evaluator, discriminator, or the data processing module 815 evaluates the signal energy of the integrations of the correlations or accumulations (e.g., integration and dump processing) based on Fourier transform signal products that represent dot product power or substantially coherent dot product power of various in-phase (I) components, and quadrature components (Q) with different time/phase offsets of the received GNSS signal.

FIG. 17 discloses a flow chart of another embodiment of a method for acquiring a satellite signal or receiving a satellite signal with interference rejection. The method of FIG. 17 is similar to the method of FIG. 14, except FIG. 17 further comprises step S924, step S926 and step S928. Like reference numbers in FIG. 14 and FIG. 17 indicate like steps, procedures or features.

In step S924 for integration time at a higher acquisition integration rate than a lower steady-state tracking rate for carrier, code and/or clock loops, an integrator or data processing module 815 provides a data bit pattern selection signal or a control signal for the data processing module 815 to make and store various ranked combinations of received signal energy evaluations or products (e.g., dot products of Fourier transforms) with greatest signal power, where the signal power comprises maximum power density or maximum signal magnitude over a frequency range of interest at the current code shift associated with the correlating.

In step S926, after making and evaluating and ranking combinations of products, or time-integrated products of discrete Fourier transforms and/or fast Fourier transforms, the GNSS receiver or data processing module 815, shifts by one sample the PN pilot sequence (e.g., data overlay or data code pattern) in one or more registers of the processing module 815 or data storage device (e.g., 809, 811).

In step S928, the data processing module 815 repeats a correlation process by correlating the shifted pilot PN sequence (e.g., shifted data overlay or data code pattern) by a chip or fraction of a chip with the local code replica of the PN sequence until a sufficient number of the code phases in the data storage device (e.g., 809, 811) or registers have been evaluated to acquire or pull-in the carrier frequency of the selected, received GNSS signal that is compensated for Doppler frequency shift or propagation-related frequency shift.

FIG. 18 discloses a flow chart of another embodiment of a method for acquiring a satellite signal or receiving a satellite signal with interference rejection. The method of FIG. 18 is similar to the method of FIG. 14, except FIG. 18 further comprises step S930. Like reference numbers in FIG. 14 and FIG. 19 indicate like steps, procedures or features.

In step S930, if the maximum integration (e.g., maximum magnitude of the integration), at the selected carrier frequency, is sufficiently above a threshold, the selected carrier frequency and the code shift is used to pull-in, initialize or establish preliminary, substantially coherent tracking of carrier phase and code phase on a GNSS channel that conforms to a reference spectral energy density, minimum signal quality or minimum signal-to-noise ratio, the code search for a PN on a GNSS channel, set of GNSS channels, or aggregate GNSS channel representative of the set of the GNSS channels, is completed.

FIG. 19 discloses a flow chart of another embodiment of a method for acquiring a satellite signal or receiving a satellite signal with interference rejection. The method of FIG. 19 is similar to the method of FIG. 14, except FIG. 19 further comprises step S932. Like reference numbers in FIG. 14 and FIG. 19 indicate like steps, procedures or features.

In step S932, a frequency offset module 810, such as frequency offset look-up table, provides a carrier frequency offset signal to generate one or more candidates of the local carrier frequency signal or local intermediate frequency (IF) signal based on evaluation of signal energy associated with correlations and a frequency hypothesis, each of the candidates having relative phase offsets with respect to others of the candidates, wherein frequency hypothesis is configured to depend upon factors such as the GNSS system, the GNSS satellite, the GNSS received signal and encoding/modulation, relative movement of the rover GNSS receiver and satellite transmitting the received GNSS signal. For example, a frequency offset module 810 or frequency offset look-up table is associated with or drives a numerically controlled oscillator 805 (NCO) to generate a precise local oscillator 805 signal (e.g., cosine signal, sine signal, or both to product I and Q components at the received digital baseband sign) for input to the mixer 804.

The Global Navigation Satellite System (GNSS) receiver architecture is well-suited to mitigate multiple forms of electromagnetic (EM) interference, such as interfering microwave or radio frequency signals. To address and mitigate electromagnetic interference, the GNSS receiver is susceptible to minimal EM interference in realization of a practical digital filter configuration of reasonable logic complexity because of the inherent technical limits of finite quantization. For example, the dual-stage digital down-conversion sufficiently suppresses the harmonic-related signal components arising from the inherent technical limits of finite quantization, where the dual-stage, down-conversion design can facilitate reduced, reasonable logic complexity. In particular, the dual-stage down-conversion design, which comprises an analog primary downconverter and a digital secondary downconverter alone, or in conjunction with, analog low pass filter and digital low pass filter facilitate aliasing suppression to suppress or attenuate harmonics arising from quantization that would otherwise occur in conjunction with a direct, single stage downconverter that a digital-to-analog converter that converts an analog baseband signal to a digital baseband signal.

The GNSS receiver is well-suited to reduce, ameliorate, or mitigate integrated or combined wideband interference (WBI) and narrowband interference (NBI), such that the interference mitigation system supports improvement the GNSS receiver performance when exposed to various EM interference sources. For example, the GNSS receiver features a digital automatic gain control (DAGC) to adjust the magnitude of the samples, outputted from a filter or other interference-rejection module, to a desired level in a reduced precision system.

The GNSS receiver supports a flexible, configurable channel structure to support various carrier phase or pseudorange measurements based on the individual or combined signal tracking. For example, the GNSS receiver facilitates digital data processing of an aggregate channel, such as a super-channel bundle, to synchronize the shared parameters between different GNSS signals, such as the civil signal and the encrypted signal, while dealing with the technical differences in the GNSS signal components separately. For potentially enhanced efficiency, the signal acquisition engine can be based on batch processing to speed up the initial signal detection with a cold-receiver start and signal recovery/reacquisition associated with a warm-receiver start, where the warm-receiver can use previously stored data on a position solution, resolved integer ambiguities, or bias values to promote reacquiring time of arrival data for one or more GNSS satellite signals, or for reconvergence and establishing carrier phase lock on one or more GNSS satellite signals.

In certain configurations, the LOS estimation module interfaces with an external sensor, such as an IMU, to enable the signal tacking aiding across the tracked satellites.

In some configurations, a clock tracking loop is configured to address opposite drifting between the clock estimation numerically controlled oscillator (NCO) and the channel carrier NCO, such as the carrier NCO, the code NCO, or both.

Having described one or more preferred embodiments, it will become apparent that various modifications can be made without departing from the scope of the invention as defined in the accompanying claims.

The following is claimed:

1. A receiver system having a digital baseband data processing system, the receiver system comprising:
    a receiver front-end module comprising an analog-to-digital converter for providing a baseband signal derived from a received satellite GNSS signal;
    a baseband tracking loop module for tracking carrier phase and code phase of a band, a sub-band, a channel or a set of channels, the baseband tracking loop module being configured to derive correction or control signals to control one or more local oscillators and to provide an aggregate code and carrier component, of the channel tracking error of the respective band, sub-band, channel or set of channels;
    a clock tracking loop for tracking clock error, the clock error having a clock error component comprising a clock bias between a GNSS receiver clock and a respective satellite clock associated with the baseband signal of the band, the sub-band, the channel, or the set of channels;
    a frequency scaler for adjusting the frequency of the clock error component with respect to the frequency of channel tracking error of the carrier phase, code phase or both of the baseband signal based on the band, the sub-band, the channel or the set of channels;
    a summer for determining a tracking error based on the aggregate, channel code and carrier component and the clock error component;
    a demodulator comprising a first-stage carrier demodulator and a second-stage carrier demodulator;
    the first-stage carrier demodulator configured to (i) receive the baseband signal from the baseband tracking loop module, (ii) remove or compensate for the tracking error in the baseband signal, where the tracking error comprises aggregate, channel tracking error of carrier phase and code phase for the same received band, sub-band, GNSS satellite channel, or set of GNSS channels, and (iii) output a partially demodulated baseband signal;
    the second stage carrier demodulator configured to (i) receive the partially demodulated baseband signal from the first stage carrier demodulator and (ii) remove or strip a carrier signal component without any unwanted image or carrier-related frequency artifacts and to prepare for correlation-based decoding or demodulation of the encoded baseband signal by the correlators;
    a first plurality of first correlators configured to determine correlations for code phase tracking loop and the carrier phase tracking loop, the code phase tracking loop configured to estimate a corresponding code error component of the tracking error for the code local oscillator for a respective band, sub-band, channel or set of channels, the carrier tracking loop configured to estimate a carrier phase error component of the tracking error for a carrier local oscillator for the same respective band, sub-band, channel or set of channels; and
    a second plurality of correlators configured to determine correlations for clock tracking loop and the clock error component of the tracking error.

2. The receiver according to claim 1 wherein for the clock tracking loop, the receiver further comprises a navigation, control and interface module configured to estimate a pseudo-range measurements and carrier phase measurements and other related information from satellites that transmit the received GNSS signals to generate the positioning solution, which is used as a feedback to estimate clock error component to align the receiver crystal-grade clock that provides a reference clock input to the code local oscillator and the carrier local oscillator for a corresponding satellite and a selected band, sub-band, channel or set of channels of the baseband signal.

3. The receiver according to claim 1 further comprising:
    a Line-of-Sight (LOS) estimation module is coupled to provide input to the baseband tracking module, the LOS estimation module configured to estimate pseudo-range measurements and carrier phase measurements from satellites that transmit the received GNSS signals;
    an external sensor configured to provide navigation augmentation data to the LOS module, the external sensor comprising one or more of the following: an inertial measurement unit, an accelerometer, a gyroscope, a skyward-facing or upward-facing imaging device, a monocular camera, a stereo vision camera, radar system, a LIDAR system, received or stored satellite almanac and/or satellite ephemeris data of the GNSS receiver, and received or stored satellite rising time and setting times for geographic coordinates of a mobile GNSS receiver at particular date and time.

4. The receiver according to claim 3 wherein the LOS estimation module is configured to determine blocked or materially attenuated signals of GNSS satellites that would otherwise be in view or reception range based on observations of a skyward-facing or upward-facing imaging device, a monocular camera, a stereo vision camera, radar system, a LIDAR system, or based on stored satellite data indicative of excluded/blocked/attenuated satellites at or below a threshold low elevation angle.

5. The receiver according to claim 3 wherein the LOS estimation module is configured to estimate: (a) LOS data comprising pseudo-range measurements and carrier phase measurements from satellites that transmit the received GNSS signals, and (b) motion-corrected LOS data, or Doppler-corrected LOS data based on observations of an inertial measurement unit, an accelerometer, or a gyroscope applied to the LOS data.

6. The receiver according to claim 5 wherein the Doppler-corrected LOS data comprises Doppler-effect smoothed pseudoranges, clock frequency estimation of GNSS receiver clock based on Doppler shift, estimated position, attitude, velocity, acceleration, motion data and GNSS time for a corresponding GNSS receiver.

7. The receiver according to claim 3 wherein the LOS estimation module is configured to estimate a compensating adjustment or time offset to the clock local oscillator of the clock tracking loop for application to the carrier local oscillator of the channel baseband tracking loop to adjust the generated local code signal or code replica based on a Doppler shift of the received GNSS signal at the rover or mobile GNSS receiver.

8. The receiver according to claim 3 further comprising:
a vector tracking module configured to communicate with the channel baseband tracking loop module and the clock tracking loop module, the vector tracking module and the LOS estimation module combine a bank of correlations from a first channel with the signal from a mth channel to produce the estimated LOS data for the first channel and up to the mth channel;
the LOS estimation module, alone or in combination with the external data sensor, is configured to produce the estimated LOS data for the first channel and up the mth channel for each applicable satellite and corresponding GNSS receiver; and
a baseband tracking loop of the first channel uses a correlation signal to produce the residual frequency for input to the second-stage carrier demodulator.

9. The receiver according to claim 3 wherein:
a baseband tracking loop of a first channel is configured to use a correlation signal to produce the residual frequency for input to the second-stage demodulator; and the baseband tracking loop module is configured to receive the derived satellite LOS or other data signals from the LOS estimation module and a vector tracking module to produce the LOS-affiliated carrier frequency that comprises an LOS frequency or carrier frequency associated with LOS data.

10. The receiver according to claim 3 wherein:
the LOS estimation module is configured for communication to the channel baseband module;
the channel baseband module is configured to determine the LOS carrier-removed signal or local code replica signal based on the LOS data from the LOS estimation module; the local code replica being generated by a matched filter with an impulse response that is reversed in time.

11. The receiver according to claim 1 further comprising:
the local code oscillator comprising a code numerically controlled oscillator (NCO) of the baseband tracking loop module for the band, sub-band, channel, or set of channels, the code NCO being configured to provides an estimated replica or an estimated local code signal for the first plurality of correlators;
the local carrier oscillator comprising a carrier NCO of the baseband tracking loop module for the band, sub-band, channel, or set of channels, the carrier NCO being configured to provide an estimated local replica or an estimated aggregate local code signal for a corresponding set of GNSS signals for the second-stage carrier demodulator;
the clock local oscillator comprising a clock NCO of the clock tracking loop module for the band, sub-band, channel, or set of channels for the to provide an estimated local replica or an estimated aggregate local clock signal for the second plurality of correlators for clock tracking.

12. The receiver according to claim 11 wherein the carrier NCO of the channel baseband tracking loop is configured to provide an estimated local replica or an estimated aggregate local code signal for a corresponding set of GNSS signals for the second-stage carrier demodulator and the channel baseband tracking loop to maintain the synchronization between the received signal in the channel and the local replica of that channel with respect to code phase, carrier phase, or both based on accumulations or correlations associated with the first plurality of the correlators and the second plurality of correlators.

13. The receiver according to claim 1 further comprising:
a vector tracking module configured to communicate with the channel baseband tracking loop module and the clock tracking loop module, the vector tracking module configured to provides estimated carrier frequency and phase and estimated code frequency and phase, consistent with input from a navigation module that may comprise an extended Kalman filter or Kalman filter that processes one or more demodulated/decoded GNSS channels from correlators or accumulators associated with the output of the first correlators and second correlators, for clock tracking, to reduce tracking error in the decoded data of the each GNSS output channel.

14. The receiver according to claim 3 wherein the second correlators are configured to generate in-phase and quadrature-phase correlation for one or more channels based on a local code replica being generated by a matched filter with an impulse response that is reversed in time.

15. The receiver according to claim 1 further comprising:
a vector tracking module configured to communicate with the channel baseband tracking loop module and the clock tracking loop module, the vector tracking module configured to provide feedback or tracking error data to numerically controlled oscillators of the channel baseband tracking loop module and the clock tracking loops to replicate or determine a local estimation of one or more of the following: each carrier phase of corresponding GNSS channel, or set of corresponding GNSS channels, or a collective representative aggregate or super GNSS channel that represents a set of corresponding GNSS channels; each code phase of a corresponding encoded GNSS signal or a set of corresponding GNSS channels, or a collective representative aggregate or super GNSS channel that represents a set of corresponding GNSS channels; and each clock phase and clock frequency of a corresponding encoded GNSS signal or set of corresponding GNSS channels, or a collective representative GNSS channel that represents a set of corresponding GNSS channels.

16. A receiver system having a digital baseband data processing system, the receiver system comprising:
a receiver front-end module comprising an analog-to-digital converter for providing baseband signal derived from a received satellite GNSS signal;
a baseband tracking loop module for tracking carrier phase and code phase of a band, a sub-band, a channel or a set of channels, the baseband tracking loop module being configured to derive correction or control signals to control one or more local oscillators and to provide an aggregate code and carrier component, of the channel tracking error of the respective band, sub-band, channel or set of channels;

a clock tracking loop for tracking clock error for the receiver system, the clock error having a clock error component comprising a clock bias between a GNSS receiver clock and a respective satellite clock associated with the baseband signal of the band, the sub-band, the channel, or the set of channels;

a frequency scaler for adjusting the frequency of the clock error component with respect to the frequency of channel tracking error of the carrier phase, code phase or both of the baseband signal based on the band, the sub-band, the channel or the set of channels;

a summer for determining a tracking error based on the aggregate, channel code and carrier component and the clock error component;

a demodulator comprising a first-stage carrier demodulator and a second-stage carrier demodulator;

the first-stage carrier demodulator configured to (i) receive the baseband signal from the baseband tracking loop module, (ii) remove or compensate for the tracking error in the baseband signal, where the tracking error comprises aggregate, channel tracking error of carrier phase for the received band, sub-band, GNSS satellite channel, or set of GNSS channels, and (iii) output a partially demodulated baseband signal;

the second stage carrier demodulator configured to (i) receive the partially demodulated baseband signal from the first stage carrier demodulator and (ii) remove or strip a carrier signal component without any unwanted image or carrier-related frequency artifacts and to prepare for correlation-based decoding or demodulation of the encoded baseband signal by the correlators;

a first plurality of first correlators configured to determine correlations for code phase tracking loop, the code phase tracking loop configured to estimate a corresponding code error component of the tracking error for the code local oscillator for a respective channel;

a plurality of secondary correlators configured to determine correlations for carrier phase tracking loop, the carrier phase tracking loop configured to estimate a corresponding aggregate feedback error for multiple channels or a set of channels, where the aggregate feedback error comprises a carrier phase error component of the tracking error for a carrier local oscillator for the same respective band, sub-band, channel or set of channels; and a second plurality of correlators configured to determine correlations for clock tracking loop and the clock error component of the tracking error.

17. The receiver system according to claim 16 wherein the carrier local oscillator comprises a numerically controlled oscillator for the L1-C/A channel or the L1C channel of a given satellite that provides or that is used to derive a local carrier frequency signal, or IF frequency signal, which is aligned with the L1P carrier phase of a received GNSS signal of the given satellite.

18. The receiver system according to claim 17 wherein the carrier tracking loop comprises an aggregate or multi-channel carrier tracking loop for channels of a given satellite with the secondary correlators that accept samples of the carrier local oscillator signal and samples of the received GNSS signal of the same satellite to be aligned to provide candidate correlations.

19. The receiver system according to claim 18 wherein the carrier tracking loop comprises a carrier loop discriminator for the L1-C/A channel or L1C channel of a given satellite, together with a carrier loop filter, for evaluating L1-C/A or L1C carrier phase plane alignment of a given satellite.

20. The receiver system according to claim 16 wherein the carrier local oscillator comprises a shared numerically controlled oscillator for an L2C complex channel of a given satellite that provides, or that is used to derive, a local carrier frequency signal, or IF frequency signal, which is aligned with the L2P carrier phase of a received GNSS signal of the given satellite.

21. The receiver system according to claim 20 wherein the carrier tracking loop comprises an aggregate or multi-channel carrier tracking loop for the L2C complex channel of a given satellite with the secondary correlators that accept samples of the carrier local oscillator signal and samples of the received, evaluated GNSS signal of the same satellite to be aligned to provide candidate correlations.

22. The receiver system according to claim 21 wherein the carrier tracking loop comprises a carrier loop discriminator for the L2C channel of a given satellite, together with a carrier loop filter, for evaluating L2C carrier phase plane alignment of a given satellite.

23. The receiver system according to claim 16 wherein the code local oscillator for a respective channel comprises a common numerically controlled oscillator that provides a derivative signal to another numerically controlled oscillator for a complex L1C channel.

24. The receiver system according to claim 23 wherein L1C is multiplexed with L1C/A for backwards compatibility of L1C/A and is modulated or encoded with Alternate BOC (Binary Offset Carrier) or Multiplexed Binary Offset Carrier (MBOC) spread signal to form a complex encoded channel.

* * * * *